US011370913B2

(12) United States Patent
Chino et al.

(10) Patent No.: US 11,370,913 B2
(45) Date of Patent: Jun. 28, 2022

(54) THERMOPLASTIC ELASTOMER COMPOSITION, METHOD FOR PRODUCING THE SAME, AND ELASTOMER MOLDED BODY

(71) Applicant: ENEOS CORPORATION, Tokyo (JP)

(72) Inventors: Keisuke Chino, Tokyo (JP); Hiroaki Suzuki, Tokyo (JP); Zhengzhe Jin, Tokyo (JP); Yusuke Matsuo, Tokyo (JP)

(73) Assignee: ENEOS CORPORATION, Tokyo (JP)

( * ) Notice: Subject to any disclaimer, the term of this patent is extended or adjusted under 35 U.S.C. 154(b) by 827 days.

(21) Appl. No.: 16/096,586

(22) PCT Filed: Apr. 25, 2017

(86) PCT No.: PCT/JP2017/016420
§ 371 (c)(1),
(2) Date: Oct. 25, 2018

(87) PCT Pub. No.: WO2017/188270
PCT Pub. Date: Nov. 2, 2017

(65) Prior Publication Data
US 2019/0136052 A1    May 9, 2019

(30) Foreign Application Priority Data
Apr. 26, 2016 (JP) .............. JP2016-088525

(51) Int. Cl.
| *C08L 77/02* | (2006.01) |
| *C08K 9/04* | (2006.01) |
| *C08L 23/00* | (2006.01) |
| *C08L 9/00* | (2006.01) |
| *C08K 3/34* | (2006.01) |
| *C08L 101/02* | (2006.01) |
| *C08L 9/06* | (2006.01) |
| *C08J 3/20* | (2006.01) |
| *C08L 91/00* | (2006.01) |
| *B29C 43/00* | (2006.01) |
| *B29K 77/00* | (2006.01) |
| *B29K 91/00* | (2006.01) |

(52) U.S. Cl.
CPC .............. *C08L 77/02* (2013.01); *C08J 3/203* (2013.01); *C08K 3/34* (2013.01); *C08K 9/04* (2013.01); *C08L 9/00* (2013.01); *C08L 9/06* (2013.01); *C08L 23/00* (2013.01); *C08L 91/00* (2013.01); *C08L 101/02* (2013.01); *B29C 43/003* (2013.01); *B29K 2077/00* (2013.01); *B29K 2091/00* (2013.01); *C08L 2203/202* (2013.01); *C08L 2205/035* (2013.01); *C08L 2207/04* (2013.01)

(58) Field of Classification Search
CPC ........ C08L 101/02; C08L 91/06; C08L 91/00; C08L 9/00; C08L 9/06; C08L 23/00; C08L 77/02; C08L 53/02; C08L 53/025; C08J 3/203; C08J 3/005; C08J 3/24; C08K 3/34; C08K 9/04
See application file for complete search history.

(56) References Cited

U.S. PATENT DOCUMENTS

| 2006/0094829 A1 | 5/2006 | Chino et al. | |
| 2017/0232684 A1* | 8/2017 | Yoshimura | C08L 33/12 264/308 |
| 2018/0079887 A1* | 3/2018 | Chino | C08J 3/005 |

FOREIGN PATENT DOCUMENTS

| JP | 2004-307576 A | 11/2004 |
| JP | 2006-131663 A | 5/2006 |
| JP | 2011-144364 A | 7/2011 |
| JP | 2016-193970 A | 11/2016 |

OTHER PUBLICATIONS

Jul. 11, 2017 International Search Report issued in International Patent Application No. PCT/JP2017/016420.

* cited by examiner

Primary Examiner — Peter D. Mulcahy
(74) Attorney, Agent, or Firm — Oliff PLC

(57) ABSTRACT

A thermoplastic elastomer composition having: at least one elastomer component selected from the group made of elastomeric polymers (A) each of which has a side chain containing a hydrogen-bond cross-linkable moiety having a carbonyl-containing group and/or a nitrogen-containing heterocycle and has a glass-transition point of 25° C. or below, and elastomeric polymers (B) each of which contains a hydrogen-bond cross-linkable moiety and a covalent-bond cross-linking moiety in a side chain and has a glass-transition point of 25° C. or below; an organically modified clay, a content ratio of which is 20 parts by mass or less relative to 100 parts by mass of the elastomer component; and a polymer (Z) which is a polymer other than the elastomeric polymers (A) and (B), and an SP value of which is 9.0 or more and is greater by 0.5 or more than an SP value of the elastomer component.

16 Claims, No Drawings

THERMOPLASTIC ELASTOMER COMPOSITION, METHOD FOR PRODUCING THE SAME, AND ELASTOMER MOLDED BODY

TECHNICAL FIELD

The present invention relates to a thermoplastic elastomer composition, a method for producing the same, and an elastomer molded body.

BACKGROUND ART

Thermoplastic elastomers are materials which are industrially very useful because they can be melted at molding temperature during a molding process and can be shaped by a known resin molding technique. As an example of such thermoplastic elastomers, Japanese Unexamined Patent Application Publication No. 2006-131663 (PTL 1) discloses a thermoplastic elastomer comprising an elastomeric polymer which has a side chain containing a hydrogen-bond cross-linkable moiety having a carbonyl-containing group and a nitrogen-containing heterocycle and has another side chain containing a covalent-bond cross-linking moiety, and which has a glass-transition point of 25° C. or below. Such thermoplastic elastomers as described in PTL 1, however, are not necessarily sufficient in terms of tensile strength and oil resistance. For those reasons, it is difficult to use the thermoplastic elastomer described in PTL 1 in applications which require oil resistance (for example, materials for automobile components and the like) because the thermoplastic elastomer is highly likely to come into contact with oil.

CITATION LIST

Patent Literature

[PTL 1] Japanese Unexamined Patent Application Publication No. 2006-131663

SUMMARY OF INVENTION

Technical Problem

The present invention has been made in view of the problems in the conventional techniques, and an object of the present invention is to provide a thermoplastic elastomer composition which can have sufficiently high levels of tensile strength and excellent oil resistance, and a method for producing the same. Moreover, the present invention aims to provide an elastomer molded body which is formed by molding the thermoplastic elastomer composition.

Solution to Problem

The present inventors have conducted intensive study to achieve the above-described object, and consequently have found that a thermoplastic elastomer composition can have sufficiently high levels of tensile strength and excellent oil resistance when the thermoplastic elastomer composition comprises: at least one elastomer component selected from the group consisting of elastomeric polymers (A) each of which has a side chain containing a hydrogen-bond cross-linkable moiety having a carbonyl-containing group and/or a nitrogen-containing heterocycle and has a glass-transition point of 25° C. or below, and elastomeric polymers (B) each of which contains a hydrogen-bond cross-linkable moiety and a covalent-bond cross-linking moiety in a side chain and has a glass-transition point of 25° C. or below; an organically modified clay, a content ratio of which is 20 parts by mass or less relative to 100 parts by mass of the elastomer component; and a polymer (Z) which is a polymer other than the elastomeric polymers (A) and (B), and an SP value of which is 9.0 or more and is greater by 0.5 or more than an SP value of the elastomer component. This finding has led to the completion of the present invention.

Specifically, a thermoplastic elastomer composition of the present invention comprises:

at least one elastomer component selected from the group consisting of elastomeric polymers (A) each of which has a side chain containing a hydrogen-bond cross-linkable moiety having a carbonyl-containing group and/or a nitrogen-containing heterocycle and has a glass-transition point of 25° C. or below, and elastomeric polymers (B) each of which contains a hydrogen-bond cross-linkable moiety and a covalent-bond cross-linking moiety in a side chain and has a glass-transition point of 25° C. or below;

an organically modified clay, a content ratio of which is 20 parts by mass or less relative to 100 parts by mass of the elastomer component; and a polymer (Z) which is a polymer other than the elastomeric polymers (A) and (B), and an SP value of which is 9.0 or more and is greater by 0.5 or more than an SP value of the elastomer component.

In the thermoplastic elastomer composition of the present invention described above, the SP value of the polymer (Z) is preferably 9.0 to 16.0 and more preferably 10.0 to 15.0.

In addition, in the thermoplastic elastomer composition of the present invention described above, the polymer (Z) preferably has a reactive functional group for the elastomer component, and the reactive functional group is more preferably at least one of a hydroxyl group, an amino group, an imino group, an ester group, an acid anhydride group, and a carboxy group.

Moreover, in the thermoplastic elastomer composition of the present invention described above, a main chain of a polymer contained as the elastomer component is preferably at least one selected from diene-based rubbers, hydrogenated products of diene-based rubbers, olefin-based rubbers, optionally hydrogenated polystyrene-based elastomeric polymers, polyolefin-based elastomeric polymers, polyvinyl chloride-based elastomeric polymers, polyurethane-based elastomeric polymers, polyester-based elastomeric polymers, and polyamide-based elastomeric polymers.

Additionally, in the thermoplastic elastomer composition of the present invention described above, the elastomer component is preferably at least one selected from the group consisting of reaction products of a maleic anhydride-modified elastomeric polymer with at least one compound selected from triazoles optionally having at least one substituent selected from hydroxy groups, thiol groups, and amino groups, pyridines optionally having at least one substituent selected from hydroxy groups, thiol groups, and amino groups, thiadiazoles optionally having at least one substituent selected from hydroxy groups, thiol groups, and amino groups, imidazoles optionally having at least one substituent selected from hydroxy groups, thiol groups, and amino groups, isocyanurates optionally having at least one substituent selected from hydroxy groups, thiol groups, and amino groups, triazines optionally having at least one substituent selected from hydroxy groups, thiol groups, and amino groups, hydantoins optionally having at least one substituent selected from hydroxy groups, thiol groups, and amino groups, tris(hydroxyethyl) isocyanurate, sulfamides, pentaerythritol, 2,4-diamino-6-phenyl-1,3,5-triazine, and polyether polyols.

A method for producing a thermoplastic elastomer composition of the present invention comprises:

a first step of obtaining a mixture by mixing together
an elastomeric polymer (D) having a cyclic acid anhydride group in a side chain,
an organically modified clay, and
a polymer (Z), an SP value of which is 9.0 or more, and is greater by 0.5 or more than an SP value of the elastomeric polymer (D); and
a second step of adding, to the mixture, at least one raw material compound of a compound (I) that forms a hydrogen-bond cross-linkable moiety upon a reaction with the cyclic acid anhydride group, and a mixed raw material of the compound (I) with a compound (II) that forms a covalent-bond cross-linking moiety upon a reaction with the cyclic acid anhydride group in a ratio of 0.1 to 10 parts by mass relative to 100 parts by mass of the elastomeric polymer (D) having the cyclic acid anhydride group in the side chain, to allow a reaction to proceed between the elastomeric polymer (D) and the raw material compound, thereby obtaining the thermoplastic elastomer composition, wherein the thermoplastic elastomer composition obtained in the second step is a composition comprising:
at least one elastomer component selected from the group consisting of elastomeric polymers (A) each of which has a side chain containing a hydrogen-bond cross-linkable moiety having a carbonyl-containing group and/or a nitrogen-containing heterocycle and has a glass-transition point of 25° C. or below, and elastomeric polymers (B) each of which contains a hydrogen-bond cross-linkable moiety and a covalent-bond cross-linking moiety in a side chain and has a glass-transition point of 25° C. or below;
the organically modified clay, a content ratio of which is 20 parts by mass or less relative to 100 parts by mass of the elastomer component; and
the polymer (Z) which is a polymer other than the elastomeric polymers (A) and (B), and an SP value of which is 9.0 or more and is greater by 0.5 or more than an SP value of the elastomer component, and
in the first step, the elastomeric polymer (D), the organically modified clay, and the polymer (Z) are mixed by using the organically modified clay at such a ratio that the amount of the organically modified clay contained in the thermoplastic elastomer composition is 20 parts by mass or less relative to 100 parts by mass of the elastomer component.

In the method for producing a thermoplastic elastomer composition of the present invention described above, the elastomeric polymer (D) is preferably a maleic anhydride-modified elastomeric polymer, and the elastomer component is preferably at least one selected from the group consisting of reaction products of the maleic anhydride-modified elastomeric polymer with at least one compound selected from triazoles optionally having at least one substituent selected from hydroxy groups, thiol groups, and amino groups, pyridines optionally having at least one substituent selected from hydroxy groups, thiol groups, and amino groups, thiadiazoles optionally having at least one substituent selected from hydroxy groups, thiol groups, and amino groups, imidazoles optionally having at least one substituent selected from hydroxy groups, thiol groups, and amino groups, isocyanurates optionally having at least one substituent selected from hydroxy groups, thiol groups, and amino groups, triazines optionally having at least one substituent selected from hydroxy groups, thiol groups, and amino groups, hydantoins optionally having at least one substituent selected from hydroxy groups, thiol groups, and amino groups, tris(hydroxyethyl) isocyanurate, sulfamides, pentaerythritol, 2,4-diamino-6-phenyl-1,3,5-triazine, and polyether polyols.

An elastomer molded body of the present invention is formed by molding the thermoplastic elastomer composition of the present invention described above. Such an elastomer molded body of the present invention is preferably a molded body for use in any application selected from the group consisting of civil engineering and building materials, industrial parts, electric and electronic components, and daily necessities, and more preferably a molded body for use in one application selected from the group consisting of automotive parts, gap filling materials, sealing materials for buildings, sealing materials for pipe joints, piping protection materials, wiring protection materials, heat insulating materials, packing materials, cushioning materials, electrical insulating materials, contact rubber sheets, sports and leisure articles, and miscellaneous goods. Moreover, such an elastomer molded body of the present invention is preferably a molded body for use in one application selected from the group consisting of packing for automobile engines, constant velocity joint boots, weather strips, dampers, wiper blades, insulating covers, and hood seal rubbers.

Advantageous Effects of Invention

According to the present invention, it is possible to provide a thermoplastic elastomer composition which can have sufficiently high levels of tensile strength and excellent oil resistance, and a method for producing the same. Moreover, according to the present invention, it is possible to provide an elastomer molded body which is formed by molding the thermoplastic elastomer composition.

DESCRIPTION OF EMBODIMENTS

Hereinafter, the present invention will be described in detail based on preferred embodiments thereof.

[Thermoplastic Elastomer Composition]

A thermoplastic elastomer composition of the present invention comprises:

at least one elastomer component selected from the group consisting of elastomeric polymers (A) each of which has a side chain containing a hydrogen-bond cross-linkable moiety having a carbonyl-containing group and/or a nitrogen-containing heterocycle and has a glass-transition point of 25° C. or below, and elastomeric polymers (B) each of which contains a hydrogen-bond cross-linkable moiety and a covalent-bond cross-linking moiety in a side chain and has a glass-transition point of 25° C. or below;

an organically modified clay, a content ratio of which is 20 parts by mass or less relative to 100 parts by mass of the elastomer component; and a polymer (Z) which is a polymer other than the elastomeric polymers (A) and (B), and an SP value of which is 9.0 or more and is greater by 0.5 or more than an SP value of the elastomer component.

(Elastomer Component)

The elastomer component is at least one selected from the group consisting of the above-described elastomeric polymers (A) and (B). In each of the elastomeric polymers (A) and (B), the "side chain" refers to a side chain and a terminal of the elastomeric polymer. In addition, "a side chain containing a hydrogen-bond cross-linkable moiety having a carbonyl-containing group and/or a nitrogen-containing heterocycle (hereinafter, sometimes referred to as 'side chain (a)' for convenience)" means that a carbonyl-containing group and/or a nitrogen-containing heterocycle (more preferably a carbonyl-containing group and a nitrogen-containing heterocycle) serving as a hydrogen-bond cross-linkable moiety is chemically stably bonded (covalently bonded) to an atom (generally, a carbon atom) forming a main chain of the elastomeric polymer (the main chain of the polymer contained as the elastomer component). In addition, the "containing a hydrogen-bond cross-linkable moiety and a covalent-bond cross-linking moiety in a side chain" is a concept including a case where side chains of both a side chain having a hydrogen-bond cross-linkable moiety (hereinafter, sometimes referred to as "side chain (a')" for convenience) and a side chain having a covalent-bond cross-linking moiety (hereinafter, sometimes referred to as "side chain (b)" for convenience) are contained, so that the side chains of the polymer contain both a hydrogen-bond cross-linkable moiety and a covalent-bond cross-linking moiety, as well as a case where a side chain having both a hydrogen-bond cross-linkable moiety and a covalent-bond cross-linking moiety (a single side chain containing both a hydrogen-bond cross-linkable moiety and a covalent-bond cross-linking moiety therein: hereinafter, such a side chain is sometimes referred to as "side chain (c)" for convenience) is contained, so that the side chain of the polymer contain both a hydrogen-bond cross-linkable moiety and a covalent-bond cross-linking moiety.

The main chain (the main chain of the polymer contained as the elastomer component: polymer forming a main chain portion of it) of each of the elastomeric polymers (A) and (B) may be generally a known natural polymer or a synthetic polymer, wherein the polymer has a glass-transition point of room temperature (25° C.) or lower (the main chain may be a so-called elastomer), and is not particularly limited. Accordingly, the elastomeric polymers (A) and (B) may be, for example, those which have an elastomeric polymer being a natural polymer, a synthetic polymer, or the like and having a glass-transition point of room temperature (25° C.) or lower as a main chain, and which contain a side chain (a) containing a hydrogen-bond cross-linkable moiety having a carbonyl-containing group and/or a nitrogen-containing heterocycle; those which have an elastomeric polymer being a natural polymer, a synthetic polymer, or the like and having a glass-transition point of room temperature (25° C.) or lower as a main chain, and which contain a side chain (a') having a hydrogen-bond cross-linkable moiety and a side chain (b) having a covalent-bond cross-linking moiety as side chains; those which have an elastomeric polymer being a natural polymer, a synthetic polymer, or the like and having a glass-transition point of room temperature (25° C.) or lower as a main chain, and which contain a side chain (c) containing both a hydrogen-bond cross-linkable moiety and a covalent-bond cross-linking moiety; or the like.

Examples of the main chains (the main chains of the polymers contained as the elastomer component: polymers forming main chain portions thereof) of these elastomeric polymers (A) and (B) include diene-based rubbers such as natural rubber (NR), isoprene rubber (IR), butadiene rubber (BR), 1,2-butadiene rubber, styrene-butadiene rubber (SBR), acrylonitrile-butadiene rubber (NBR), chloroprene rubber (CR), butyl rubber (IIR), and ethylene-propylene-diene rubber (EPDM), as well as hydrogenated products thereof; olefin-based rubbers such as ethylene-propylene rubber (EPM), ethylene-acrylic rubber (AEM), ethylene-butene rubber (EBM), chlorosulfonated polyethylene, acrylic rubber, fluororubber, polyethylene rubber, and polypropylene rubber; epichlorohydrin rubber; polysulfide rubbers; silicone rubbers; urethane rubbers; and the like.

The main chains of the elastomeric polymers (A) and (B) (the main chains of the polymers contained as the elastomer component: polymers forming main chain portions thereof) may also be those formed of an elastomeric polymer containing a resin component, and examples thereof include optionally hydrogenated polystyrene-based elastomeric polymers (for example, SBS, SIS, SEBS, and the like), polyolefin-based elastomeric polymers, polyvinyl chloride-based elastomeric polymers, polyurethane-based elastomeric polymers, polyester-based elastomeric polymers, polyamide-based elastomeric polymers, and the like.

The main chains of the elastomeric polymers (A) and (B) (the main chains of the polymers contained as the elastomer component) are each preferably at least one selected from diene-based rubbers, hydrogenated products of diene-based rubbers, olefin-based rubbers, optionally hydrogenated polystyrene-based elastomeric polymers, polyolefin-based elastomeric polymers, polyvinyl chloride-based elastomeric polymers, polyurethane-based elastomeric polymers, polyester-based elastomeric polymers, and polyamide-based elastomeric polymers. In addition, the main chains of the elastomeric polymers (A) and (B) (the main chains of the polymers contained as the elastomer component) are each preferably a hydrogenated product of a diene-based rubber or an olefin-based rubber from the viewpoint of the absence of a double bond susceptible to aging, and preferably a diene-based rubber from the viewpoints of the low cost and the high reactivity (the presence of many double bonds capable of an ene reaction with a compound such as maleic anhydride).

Moreover, the elastomeric polymers (A) and (B) may be liquid or solid, and the molecular weights thereof are not particularly limited. The molecular weights may be selected, as appropriate, according to the application for which the thermoplastic elastomer composition of the present invention is used, a required physical property, or the like.

When the flowability upon heating (de-cross-linking, or the like) of the thermoplastic elastomer composition of the present invention is important, the above-described elastomeric polymers (A) and (B) are preferably liquid. For example, when the main chain portion is a diene-based rubber such as isoprene rubber or butadiene rubber, the weight average molecular weight of the main chain portion is preferably 1,000 to 100,000 and is particularly preferably about 1,000 to 50,000 to make the elastomeric polymers (A) and (B) liquid.

On the other hand, when the strength of the thermoplastic elastomer composition of the present invention is important, the elastomeric polymers (A) and (B) are preferably solid. For example, when the main chain portion is a diene-based rubber such as isoprene rubber or butadiene rubber, the weight average molecular weight of the main chain portion is preferably 100,000 or higher, and particularly preferably about 500,000 to U.S. Pat. No. 1,500,000 to make the elastomeric polymers (A) and (B) solid.

The weight average molecular weight is a weight average molecular weight (in terms of polystyrene) measured by gel permeation chromatography (GPC). It is preferable to use tetrahydrofuran (THF) as a solvent for the measurement.

In the thermoplastic elastomer composition of the present invention, a mixture of two or more of the elastomeric polymers (A) and (B) can be used. In this case, the mixing ratio of the elastomeric polymers can be any according to the application for which the thermoplastic elastomer composition of the present invention is used, a required physical property, or the like.

In addition, the glass-transition points of the elastomeric polymers (A) and (B) are 25° C. or below as mentioned above. This is because when the glass-transition points of the elastomeric polymers are within this range, the thermoplastic elastomer composition of the present invention exhibits rubber-like elasticity at room temperature. Meanwhile, the "glass-transition point" in the present invention is a glass-transition point measured by differential scanning calorimetry (DSC). For the measurement, the rate of temperature rise is preferably 10° C./min.

The main chains of the elastomeric polymers (A) and (B) (the main chains of the polymers contained as the elastomer component) are preferably diene-based rubbers such as natural rubber (NR), isoprene rubber (IR), butadiene rubber (BR), 1,2-butadiene rubber, styrene-butadiene rubber (SBR), ethylene-propylene-diene rubber (EPDM), or butyl rubber (IIR); or olefin-based rubbers such as ethylene-propylene rubber (EPM), ethylene-acrylic rubber (AEM), or ethylene-butene rubber (EBM), because the resultant elastomeric polymers (A) and (B) have glass-transition points of 25° C. or below, and a formed article made of the obtained thermoplastic elastomer composition shows rubber-like elasticity at room temperature (25° C.). In addition, when an olefin-based rubber is used as the main chain of each of the elastomeric polymers (A) and (B), the obtained thermoplastic elastomer composition tends to have an improved tensile strength, and degradation of the composition tends to be suppressed more sufficiently because of the absence of double bonds.

The bound styrene content of the styrene-butadiene rubber (SBR) which can be used as the elastomeric polymers (A) and (B), the hydrogenation ratio of the hydrogenated elastomeric polymer which can be used as the elastomeric polymers (A) and (B), and the like are not particularly limited, and can be adjusted to any ratio according to the application for which the thermoplastic elastomer composition of the present invention is used, a physical property required for the composition, or the like.

In addition, when ethylene-propylene-diene rubber (EPDM), ethylene-acrylic rubber (AEM), ethylene-propylene rubber (EPM), or ethylene-butene rubber (EBM) is used as the main chain of the above-described elastomeric polymer (A) or (B) (the main chain of the polymer contained as the elastomer component), the degree of crystallinity therein is preferably less than 10% (more preferably 5 to 0%) especially from the viewpoint of expression of favorable rubber-like elasticity at room temperature. Moreover, when ethylene-propylene-diene rubber (EPDM), ethylene-acrylic rubber (AEM), ethylene-propylene rubber (EPM), or ethylene-butene rubber (EBM) is used as the main chain of the above-described elastomeric polymer (A) or (B), the ethylene content therein is preferably 10 to 90% by mole, and more preferably 30 to 90% by mole. The ethylene content within this range is preferable, because a thermoplastic elastomer (composition) formed therefrom is excellent in compression set and mechanical strengths, especially, tensile strength.

Further, the above-described elastomeric polymer (A) or (B) is preferably amorphous from the viewpoint of expression of favorable rubber-like elasticity at room temperature. Moreover, such elastomeric polymer (A) or (B) may be an elastomer partially having crystallinity (crystal structure), but even in this case, the degree of crystallinity is preferably less than 10% (particularly preferably 5 to 0%). Here, such a degree of crystallinity can be obtained in such a way that diffraction peaks are measured by using an X-ray diffraction instrument (for example, one manufactured by Rigaku Corporation under the trade name "MiniFlex 300") as a measurement instrument and an integral ratio between the scattering peaks derived from the crystalline and amorphous structures is calculated.

In addition, the SP value of the elastomer component (the elastomeric polymer (A) and/or (B)) is preferably 6.0 to 13.0, more preferably 7.0 to 12.0, particularly preferably 7.0 to 9.0, and most preferably 7.0 to 8.5. If the SP value is less than the lower limit, the mixing property with other resins tends to be low due to excessively low polarity. On the other hand, if the upper limit is exceeded, the mixing property with other resins also tends to be low in this case due to excessively high polarity. The method for measuring the SP value and the like are described later.

In addition, as described above, the above-described elastomeric polymers (A) and (B) have, as a side chain, at least one of a side chain (a) containing a hydrogen-bond cross-linkable moiety having a carbonyl-containing group and/or a nitrogen-containing heterocycle; a side chain (a') containing a hydrogen-bond cross-linkable moiety and a side chain (b) containing a covalent-bond cross-linking moiety; and a side chain (c) containing a hydrogen-bond cross-linkable moiety and a covalent-bond cross-linking moiety. Note that, in the present invention, the side chain (c) can also be regarded as a side chain functioning as a side chain (a') and also as a side chain (b). Each of the side chains is described below.

<Side Chain (a'): Side Chain Containing Hydrogen-Bond Cross-Linkable Moiety>

The side chain (a') containing a hydrogen-bond cross-linkable moiety may be any, and the structure thereof is not particularly limited, as long as the side chain has a group that can form a cross-linkage by a hydrogen bond (for example, a hydroxy group, a hydrogen-bond cross-linkable moiety contained in the side chain (a) described later, or the like), and forms a hydrogen bond on the basis of the group. Here, the hydrogen-bond cross-linkable moiety is a moiety through which polymer molecules (elastomer molecules) are cross-linked by a hydrogen bond. Note that the cross-linkage by a hydrogen bond is formed only when there are a hydrogen acceptor (a group containing an atom containing lone pair electrons, or the like) and a hydrogen donor (a group having a hydrogen atom covalently bonded to an atom having a high electronegativity, or the like). Hence, when both a hydrogen acceptor and a hydrogen donor are not present in side chains of elastomer molecules, no cross-linkage by a hydrogen bond is formed. For this reason, only when both a hydrogen acceptor and a hydrogen donor are present in side chains of elastomer molecules, a hydrogen-bond cross-linkable moiety can be considered to be present in the system. Note that, in the present invention, if both a portion that can functions as a hydrogen acceptor (for example, a carbonyl group or the like) and a portion that can functions as a hydrogen donor (for example, a hydroxy group or the like) are present in side chains of elastomer molecules, the portion that can functions as a hydrogen acceptor and the portion that can functions as a donor of the side chains are considered to be hydrogen-bond cross-linkable moieties.

The hydrogen-bond cross-linkable moiety in such a side chain (a') is preferably a hydrogen-bond cross-linkable moiety having a carbonyl-containing group and/or a nitrogen-containing heterocycle (a hydrogen-bond cross-linkable moiety contained in the side chain (a)), which will be described below, from the viewpoints of the formation of a stronger hydrogen bond and the like. Specifically, the side chain (a') is more preferably the side chain (a) described later. Moreover, from the same viewpoints, the hydrogen-bond cross-linkable moiety in the side chain (a') is more preferably a hydrogen-bond cross-linkable moiety having a carbonyl-containing group and a nitrogen-containing heterocycle.

<Side Chain (a): Side Chain Containing Hydrogen-Bond Cross-Linkable Moiety Having Carbonyl-Containing Group and/or Nitrogen-Containing Heterocycle>

The side chain (a) containing a hydrogen-bond cross-linkable moiety having a carbonyl-containing group and/or a nitrogen-containing heterocycle may be any, as long as the side chain (a) has a carbonyl-containing group and/or a nitrogen-containing heterocycle, and the other aspect of the structure are not particularly limited. The hydrogen-bond cross-linkable moiety more preferably has a carbonyl-containing group and a nitrogen-containing heterocycle.

The carbonyl-containing group is not particularly limited, as long as the group contains a carbonyl group. Specific examples thereof include amide, ester, imide, carboxy group, carbonyl group, and the like. The carbonyl-containing group may be a group introduced to the main chain (the polymer of the main chain portion) by using a compound capable of introducing a carbonyl-containing group to a main chain. The compound capable of introducing a carbonyl-containing group to a main chain is not particularly limited, and specific examples thereof include ketones, carboxylic acids, derivatives thereof, and the like.

Examples of the carboxylic acids include organic acids having saturated or unsaturated hydrocarbon groups, and the hydrocarbon groups may be any of aliphatic, alicyclic, or aromatic ones, and the like. Specific examples of the carboxylic acid derivatives include carboxylic anhydrides, amino acids, thiocarboxylic acids (mercapto group-containing carboxylic acids), esters, amino acids, ketones, amides, imides, dicarboxylic acids and their monoesters, and the like.

In addition, specific examples of the carboxylic acids, the derivatives thereof, and the like include carboxylic acids such as malonic acid, maleic acid, succinic acid, glutaric acid, phthalic acid, isophthalic acid, terephthalic acid, p-phenylenediacetic acid, p-hydroxybenzoic acid, p-aminobenzoic acid, and mercaptoacetic acid, as well as these carboxylic acids containing substituents; acid anhydrides such as succinic anhydride, maleic anhydride, glutaric anhydride, phthalic anhydride, propionic anhydride, and benzoic anhydride; aliphatic esters such as maleic acid esters, malonic acid esters, succinic acid esters, glutaric acid esters, and ethyl acetate; aromatic esters such as phthalic acid esters, isophthalic acid esters, terephthalic acid esters, ethyl-m-aminobenzoate, and methyl-p-hydroxybenzoate; ketones such as quinone, anthraquinone, and naphthoquinone; amino acids such as glycine, tyrosine, bicine, alanine, valine, leucine, serine, threonine, lysine, aspartic acid, glutamic acid, cysteine, methionine, proline, and N-(p-aminobenzoyl)-β-alanine; amides such as maleamide, maleamidic acid (maleic monoamide), succinic monoamide, 5-hydroxyvaleramide, N-acetylethanolamine, N,N'-hexamethylene bis (acetamide), malonamide, cycloserine, 4-acetamidophenol, and p-acetamidebenzoic acid; imides such as maleimide and succinimide; and the like.

Of these examples, the compound capable of introducing a carbonyl group (carbonyl-containing group) is preferably a cyclic acid anhydride such as succinic anhydride, maleic anhydride, glutaric anhydride, or phthalic anhydride, and is particularly preferably maleic anhydride.

In addition, when the side chain (a) has a nitrogen-containing heterocycle, the structure or the like of the nitrogen-containing heterocycle is not particularly limited, as long as the nitrogen-containing heterocycle is introduced to the main chain directly or through an organic group. It is also possible to use, as the nitrogen-containing heterocycle, one containing a heteroatom other than a nitrogen atom, such as a sulfur atom, an oxygen atom, or a phosphorus atom, in the heterocycle, as long as a nitrogen atom is contained in the heterocycle. Here, the use of the nitrogen-containing heterocycle in the side chain (a) is preferable because the presence of the heterocycle structure results in a stronger hydrogen bond forming the cross-linkage, so that the obtained thermoplastic elastomer composition of the present invention has an improved tensile strength.

In addition, the above-described nitrogen-containing heterocycle may have a substituent, and examples of the substituent include alkyl groups such as a methyl group, an ethyl group, an (iso)propyl group, and a hexyl group; alkoxy groups such as a methoxy group, an ethoxy group, and an (iso)propoxy group; groups consisting of a halogen atom such as a fluorine atom, a chlorine atom, a bromine atom, or an iodine atom; a cyano group; an amino group; an aromatic hydrocarbon group; an ester group; an ether group; an acyl group; a thioether group; and the like, any ones of which can also be used in combination. The position of substitution of such a substituent is not particularly limited, and the number of such substituents is not limited.

Moreover, the above-described nitrogen-containing heterocycle may have aromatic properties, but does not necessarily have to have aromatic properties. A nitrogen-containing heterocycle having aromatic properties is preferable, because the obtained thermoplastic elastomer composition of the present invention is further improved in compression set and mechanical strength.

In addition, such a nitrogen-containing heterocycle is preferably, but not particularly limited to, a 5-membered ring or a 6-membered ring, from the viewpoints that the hydrogen bond becomes more strongly, and the compression set and the mechanical strength are further improved. Specific examples of the nitrogen-containing heterocycle include pyrrololine, pyrrolidone, oxindole (2-oxindole), indoxyl (3-oxindole), dioxindole, isatin, indolyl, phthalimidine, β-isoindigo, monoporphyrin, diporphyrin, triporphyrin, azaporphyrin, phthalocyanine, hemoglobin, uroporphyrin, chlorophyll, phylloerythrin, imidazole, pyrazole, triazole, tetrazole, benzimidazole, benzopyrazole, benzotriazole, imidazoline, imidazolone, imidazolidone, hydantoin, pyrazoline, pyrazolone, pyrazolidone, indazole, pyridoindole, purine, cinnoline, pyrrole, pyrroline, indole, indoline, oxylindole, carbazole, phenothiazine, indolenine, isoindole, oxazole, thiazole, isoxazole, isothiazole, oxadiazole, thiadiazole, oxatriazole, thiatriazole, phenanthroline, oxazine, benzoxazine, phthalazine, pteridine, pyrazine, phenazine, tetrazine, benzoxazole, benzoisoxazole, anthranyl, benzothiazole, benzofurazan, pyridine, quinoline, isoquinoline, acridine, phenanthridine, anthrazoline, naphthyridine, thiazine, pyridazine, pyrimidine, quinazoline, quinoxaline, triazine, histidine, triazolidine, melamine, adenine, guanine, thymine, cytosine, hydroxyethyl isocyanurate, derivatives thereof, and the like. Of these examples, preferred examples of particularly the 5-membered nitrogen-containing rings include the compounds described below (cyclic structures represented by the chemical formulae), triazole derivatives represented by the following general formula (10), and imidazole derivatives represented by the following general formula (11). In addition, these may have the above-described various substituents, and may be subjected to hydrogen addition or elimination.

[Chem. 1]

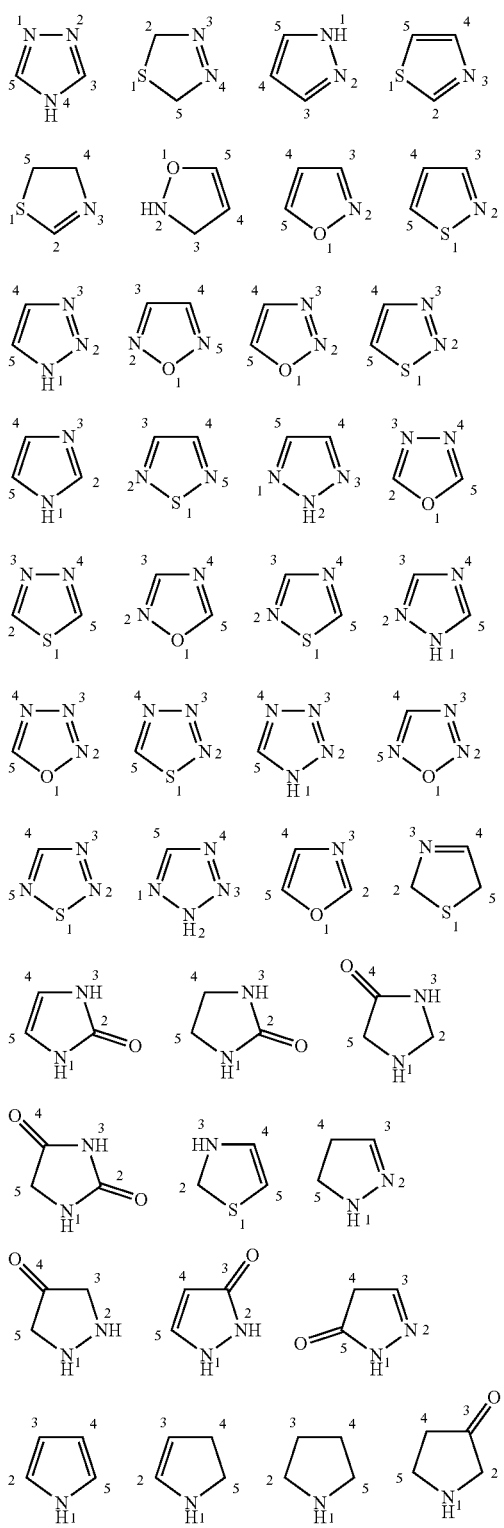

[Chem. 2]

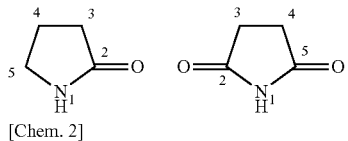

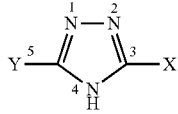

(10)

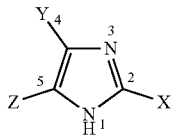

(11)

The substituents X, Y, and Z in the general formulae (10) and (11) are each independently a hydrogen atom, an alkyl group having 1 to 30 carbon atoms, an aralkyl group having 7 to 20 carbon atoms, an aryl group having 6 to 20 carbon atoms, or an amino group. Note that one of X and Y in the above-described general formula (10) is not a hydrogen atom, and similarly at least one of X, Y, and Z in the above-described general formula (11) is not a hydrogen atom.

In addition to a hydrogen atom and an amino group, specific examples of the substituents X, Y, and Z include, linear-chain alkyl groups such as a methyl group, an ethyl group, a propyl group, a butyl group, a pentyl group, an octyl group, a dodecyl group, and a stearyl group; branched alkyl groups such as an isopropyl group, an isobutyl group, a s-butyl group, a t-butyl group, an isopentyl group, a neopentyl group, a t-pentyl group, a 1-methylbutyl group, a 1-methylheptyl group, and a 2-ethylhexyl group; aralkyl groups such as a benzyl group and a phenethyl group; aryl groups such as a phenyl group, tolyl groups (o-, m-, and p-), a dimethylphenyl group, and a mesityl group; and the like.

Of these examples, the substituents X, Y, and Z are each preferably an alkyl group, especially, a butyl group, an octyl group, a dodecyl group, an isopropyl group, or a 2-ethylhexyl group, because the obtained thermoplastic elastomer composition of the present invention has good processability.

Meanwhile, preferred examples of the nitrogen-containing 6-membered rings include the compounds described below. These compounds may also have the above-described various substituents (for example, the substituents which may be possessed by the above-described nitrogen-containing heterocycles), or may also be subjected to hydrogen addition or hydrogen elimination.

[Chem. 3]

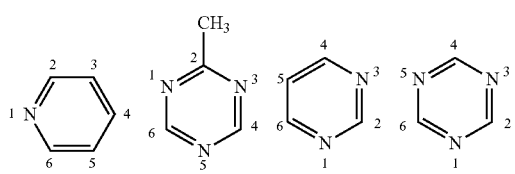

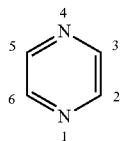

In addition, it is also possible to use condensation products of any one of the above-described nitrogen-containing heterocycles with a benzene ring or condensation products of any ones of the nitrogen-containing heterocycles, and specific preferred examples thereof include condensed rings shown below. These condensed rings may also have the above-described various substituents, and may also be subjected to addition or elimination of hydrogen atoms.

[Chem. 4]

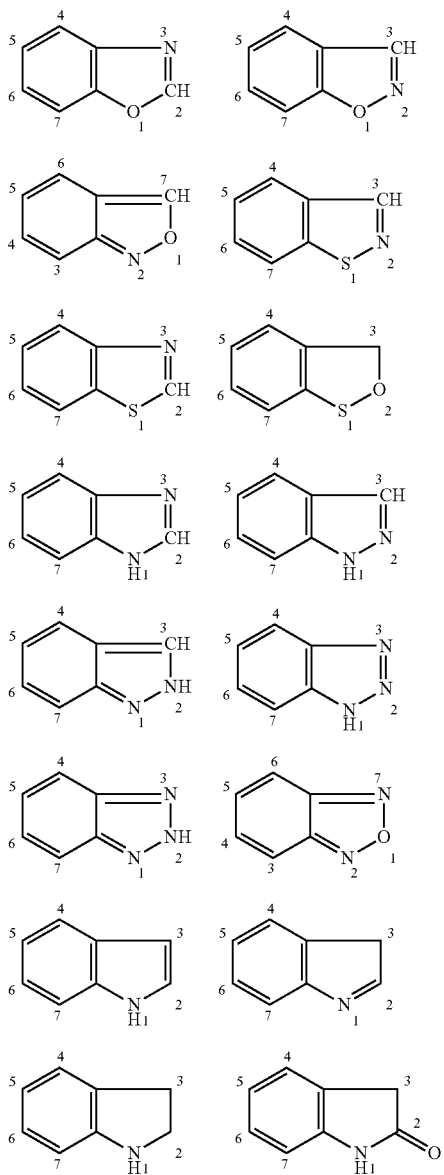

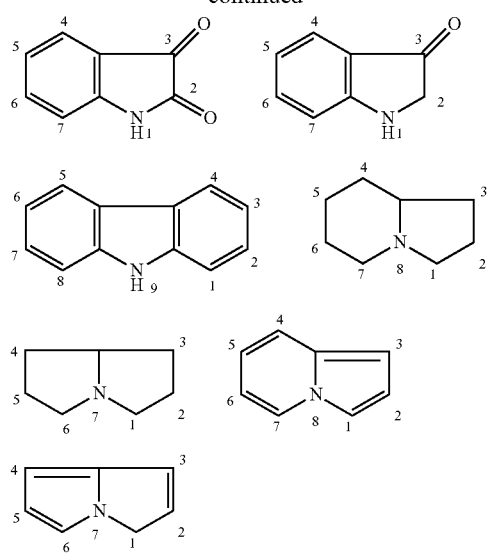

Among others, the nitrogen-containing heterocycle is preferably at least one selected from a triazole ring, an isocyanurate ring, a thiadiazole ring, a pyridine ring, an imidazole ring, a triazine ring, and a hydantoin ring, and is preferably at least one selected from a triazole ring, a thiadiazole ring, a pyridine ring, an imidazole ring, and a hydantoin ring, because the obtained thermoplastic elastomer composition of the present invention is excellent in recyclability, compression set, hardness, and mechanical strengths, especially, tensile strength.

In addition, when the side chain (a) contains both the above-described carbonyl-containing group and the above-described nitrogen-containing heterocycle, the above-described carbonyl-containing group and the above-described nitrogen-containing heterocycle may be introduced to the main chain as side chains independent from each other, and are preferably introduced to the main chain as a single side chain in which the above-described carbonyl-containing group and the above-described nitrogen-containing heterocycle are linked to each other through another group. Accordingly, as the side chain (a), it is preferable that a side chain containing a hydrogen-bond cross-linkable moiety having the above-described carbonyl-containing group and the above-described nitrogen-containing heterocycle be introduced to the main chain as a single side chain, and it is more preferable that a side chain containing a structural portion represented by the following general formula (1):

[Chem. 5]

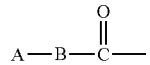

(1)

[in the formula (1), A is a nitrogen-containing heterocycle, and B is a single bond; an oxygen atom, an amino group represented by a formula NR' (R' is a hydrogen atom or an alkyl group having 1 to 10 carbon atoms), or a sulfur atom; or an organic group optionally containing any of the atoms or groups] be introduced to the main chain as a single side chain. Accordingly, the hydrogen-bond cross-linkable moiety of the side chain (a) preferably contains a structural portion represented by the above-described general formula (1).

Here, a specific example of the nitrogen-containing heterocycle A in the above-described formula (1) is any of the nitrogen-containing heterocycles listed above as the examples. In addition, a specific example of the substituent B in the above-described formula (1) is a single bond; an oxygen atom, a sulfur atom, or an amino group represented by the formula NR' (where R' is a hydrogen atom or an alkyl group having 1 to 10 carbon atoms) (hereinafter, an amino group represented by the formula NR' is simply referred to as "amino group NR'" for convenience); an alkylene or aralkylene group having 1 to 20 carbon atoms and optionally containing any of the atoms or groups; an alkylene ether group (an alkyleneoxy group, for example, —O—CH$_2$CH$_2$— group), an alkyleneamino group (for example, —NH—CH$_2$CH$_2$— group or the like), or an alkylene thioether group (an alkylenethio group, for example, —S—CH$_2$CH$_2$— group) having 1 to 20 carbon atoms and having any of the atoms or groups at a terminal; an aralkylene ether group (an aralkyleneoxy group), an aralkyleneamino group, or an aralkylene thioether group having 1 to 20 carbon atoms and having any of them at a terminal; or the like.

Here, examples of the alkyl group having 1 to 10 carbon atoms selectable as R' in the above amino group NR' include a methyl group, an ethyl group, a propyl group, a butyl group, a pentyl group, a hexyl group, a heptyl group, an octyl group, a nonyl group, a decyl group, isomers thereof, and the like. One serving as the substituent B in the above-described formula (1), i.e., any of the oxygen atom, the sulfur atom, and the amino group NR'; as well as the oxygen atoms, amino groups NR', and sulfur atoms in the alkylene ether group, alkyleneamino group, alkylene thioether group, aralkylene ether group, aralkyleneamino group, aralkylene thioether group having 1 to 20 carbon atoms and having any of the atoms or groups at a terminal, preferably forms a conjugated system, such as an ester group, an amide group, an imide group, or a thioester group, in combination with the adjacent carbonyl group.

Of these examples, the substituent B is preferably an oxygen atom, sulfur atom, or amino group forming a conjugated system; or an alkylene ether group, an alkyleneamino group, or an alkylene thioether group having 1 to 20 carbon atoms, having any of the atoms or groups at a terminal, and forming a conjugated system, and particularly preferably an amino group (NH), an alkyleneamino group (—NH—CH$_2$-group, —NH—CH$_2$CH$_2$-group, or —NH—CH$_2$CH$_2$CH$_2$-group), an alkylene ether group (—O—CH$_2$-group, —O—CH$_2$CH$_2$-group, or —O—CH$_2$CH$_2$CH$_2$-group).

In addition, when the side chain (a) is a side chain containing a hydrogen-bond cross-linkable moiety having the above-described carbonyl-containing group and the above-described nitrogen-containing heterocycle, the hydrogen-bond cross-linkable moiety having the above-described carbonyl-containing group and the above-described nitrogen-containing heterocycle is more preferably a single side chain represented by the following formula (2) or (3), which is introduced to the main chain of the above-described polymer at the α position or β position of the side chain.

[Chem. 6]

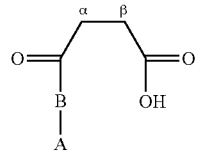

(2)

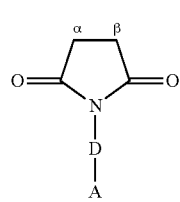

(3)

[In the formula, A is a nitrogen-containing heterocycle, B and D are each independently a single bond; an oxygen atom, an amino group NR' (where R' is a hydrogen atom or an alkyl group having 1 to 10 carbon atoms), or a sulfur atom; or an organic group optionally containing any of the atoms or groups.]

Here, the nitrogen-containing heterocycle A is basically the same as the nitrogen-containing heterocycle A of the above-described formula (1), and the substituents B and D are each independently basically the same as the substituent B in the above-described formula (1). Note that, among the examples listed for the substituent B in the above-described formula (1), the substituent D in the above-described formula (3) is preferably a single bond; an alkylene or aralkylene group having 1 to 20 carbon atoms, optionally containing an oxygen atom, a nitrogen atom, or a sulfur atom, and forming a conjugated system, and is particularly preferably a single bond. Specifically, it is preferable to form an alkyleneamino group or an aralkyleneamino group having 1 to 20 carbon atoms and optionally containing an oxygen atom, a nitrogen atom, or a sulfur atom, together with the imide nitrogen of the above-described formula (3), and it is particularly preferable that the nitrogen-containing heterocycle be directly bonded (through a single bond) to the imide nitrogen of the above-described formula (3). Specific examples of the above-described substituent D include a single bond; the above-described alkylene ether, aralkylene ether group, or the like having 1 to 20 carbon atoms and having an oxygen atom, a sulfur atom, or an amino group at a terminal; a methylene group, an ethylene group, a propylene group, a butylene group, a hexylene group, a phenylene group, and a xylylene group, isomers thereof, and the like.

In addition, when the side chain (a) is a side chain containing a hydrogen-bond cross-linkable moiety having the above-described carbonyl-containing group and the above-described nitrogen-containing heterocycle, the hydrogen-bond cross-linkable moiety of the side chain (a) preferably contains a structural portion represented by the following general formula (101):

[Chem. 7]

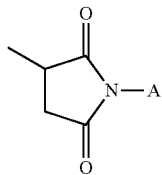

(101)

[in the formula (101), A is a nitrogen-containing heterocycle]. The nitrogen-containing heterocycle A in the formula (101) is basically the same as the nitrogen-containing heterocycle A of the above-described formula (1). In addition, from the viewpoints of high modulus and high strength at break, the hydrogen-bond cross-linkable moiety of the side chain (a) is more preferably one having the structure represented by the following general formula (102):

[Chem. 8]

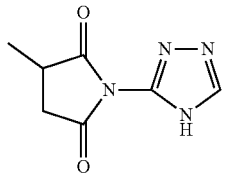

(102)

Moreover, the side chain (a) is particularly preferably a group represented by the above-described general formula (102).

The ratio of the above-described carbonyl-containing group to the above-described nitrogen-containing heterocycle of the above-described thermoplastic elastomer is preferably, but not particularly limited to, within a range of 1:1 to 3:1 (more preferably 1:1, 2:1, or 3:1), because complementary interaction is more likely to be created, and because such a thermoplastic elastomer is easy to produce.

The side chain (a) containing a hydrogen-bond cross-linkable moiety having a carbonyl-containing group and/or a nitrogen-containing heterocycle is preferably introduced at a ratio (introduction ratio) of 0.1 to 50% by mole, and more preferably introduced at a ratio of 1 to 30% by mole, relative to 100% by mole of the main chain portion. If the introduction ratio of the side chain (a) is lower than 0.1% by mole, the tensile strength upon the cross-linking may be insufficient in some cases. Meanwhile, if the introduction ratio exceeds 50% by mole, the cross-linking density increases, so that the rubber elasticity may be lost in some cases. Specifically, it is preferable that the introduction ratio be within the above-described range, because the interaction between side chains of the above-described thermoplastic elastomer leads to efficient formation of cross-linkages between molecules, so that the tensile strength is high upon cross-linking, and the recyclability is excellent.

When a side chain (a-i) containing a hydrogen-bond cross-linkable moiety having the above-described carbonyl-containing group and a side chain (a-ii) containing a hydrogen-bond cross-linkable moiety having the above-described nitrogen-containing heterocycle are each independently introduced as the side chain (a), the above-described introduction ratio is calculated by taking a set of the side chain (a-i) containing a carbonyl-containing group and the side chain (a-ii) containing a nitrogen-containing heterocycle as a single side chain (a) based on the ratio between these side chains. Note that when any one of the side chains (a-i) and (a-ii) is in excess, the above-described introduction ratio can be obtained based on the excessive side chain.

In addition, for example, when the main chain portion is ethylene-propylene rubber (EPM), the above-described introduction ratio is such that the amount of monomers to which the side chain portion is introduced is about 0.1 to 50 units per 100 ethylene and propylene monomer units.

In addition, the side chain (a) is preferably a side chain (a) introduced as a side chain of a polymer by using, as a polymer (elastomeric polymer-forming material) which forms the main chain after reaction, a polymer (an elastomeric polymer having a cyclic acid anhydride group in a side chain) having a cyclic acid anhydride group (more preferably a maleic anhydride group) as a functional group, and reacting the functional group (cyclic acid anhydride group) with a compound (a compound capable of introducing a nitrogen-containing heterocycle) that forms a hydrogen-bond cross-linkable moiety upon a reaction with the cyclic acid anhydride group, to form a hydrogen-bond cross-linkable moiety. The compound capable of introducing a nitrogen-containing heterocycle may be one of the nitrogen-containing heterocycles listed as examples above itself, or may be a nitrogen-containing heterocycle having a substituent (for example, a hydroxy group, a thiol group, an amino group, or the like) that reacts with a cyclic acid anhydride group such as maleic anhydride.

Here, the position at which the nitrogen-containing heterocycle is bonded in the side chain (a) is described. Note that the nitrogen heterocycle is referred to as a "nitrogen-containing n-membered ring compound (n≥3)" for convenience.

The bonding positions ("positions 1 to n") described below are based on the IUPAC nomenclature. For example, in a case of a compound having three nitrogen atoms having unshared electron pairs, the bonding position is determined according to the order based on the IUPAC nomenclature. Specifically, the bonding positions are shown in the 5-membered, 6-membered, and condensed nitrogen-containing heterocycles listed as examples above.

In the side chain (a), the bonding position of the nitrogen-containing n-membered ring compound which is bonded to the copolymer directly or through an organic group is not particularly limited, and may be any bonding position (position 1 to position n). Preferably, the bonding position is position 1 or position 3 to position n of the nitrogen-containing n-membered ring compound.

When the nitrogen-containing n-membered ring compound contains one nitrogen atom (for example, a pyridine ring or the like), position 3 to position (n–1) are preferable, because intramolecular chelate formation easily occurs, and the composition formed therefrom is excellent in physical properties such as tensile strength. By the selection of the bonding position of the nitrogen-containing n-membered ring compound, the elastomeric polymer tends to easily undergo cross-linking among molecules of the elastomeric polymer by hydrogen bonds, ionic bonding, coordinate bonds, or the like, and tends to be excellent in recyclability and excellent in mechanical properties, especially, tensile strength.

<Side Chain (b): Side Chain Containing Covalent-Bond Cross-Linking Moiety>

In the present description, the "side chain (b) containing a covalent-bond cross-linking moiety" means that a covalent-bond cross-linking moiety (a functional group or the like capable of forming at least one bond selected from the group consisting of amide, ester, lactone, urethane, ether, thiourethane, and thioether upon a reaction with "a compound that forms a covalent bond" such as an amino group-containing compound described later) is chemically stably bonded (covalently bonded) to an atom (generally, a carbon atom) forming the main chain of an elastomeric polymer. Here, the side chain (b) is one containing a covalent-bond cross-linking moiety. Note that when the side chain (b) further has a group capable of forming a hydrogen bond to form a cross-linkage by a hydrogen bond between side chains, while having the covalent-bonding moiety, such a side chain (b) is used as a side chain (c) described later (note that, when both a hydrogen donor and a hydrogen acceptor, which allow the formation of a hydrogen bond between side chains of the elastomer, are not contained, for example, when only a side chain simply containing an ester group (—COO—) is present in the system, such a group does not function as the hydrogen-bond cross-linkable moiety, because two ester groups (—COO—) do not form a hydrogen bond. Meanwhile, for example, when each side chain of the elastomer contains a structure having both a moiety serving as a hydrogen donor and a moiety serving as a hydrogen acceptor in a hydrogen bond, such as a carboxy group or a triazole ring, a hydrogen bond is formed between the side chains of the elastomer, and hence a hydrogen-bond cross-linkable moiety is considered to be contained. In addition, for example, when an ester group and a hydroxy group are coexistent in side chains of an elastomer, and these groups form a hydrogen bond between the side chains, the moiety forming the hydrogen bond serves as a hydrogen-bond cross-linkable moiety. For this reason, the side chain (b) may be used as the side chain (c) in some cases depending on the structure of the side chain (b) itself, the structure of the side chain (b) and the type of the substituent of another side chain, or the like). In addition, the "covalent-bond cross-linking moiety" used herein is a moiety which cross-links polymer molecules (elastomer molecules) to each other by a covalent bond.

The side chain (b) containing a covalent-bond cross-linking moiety is not particularly limited, and is preferably, for example, one containing a covalent-bond cross-linking moiety formed by a reaction of an elastomeric polymer having a functional group in a side chain (the polymer for forming a main chain portion) with a compound that forms a covalent-bond cross-linking moiety upon a reaction with the functional group (a compound that forms a covalent bond). The cross-linkage at the covalent-bond cross-linking moiety of the side chain (b) is preferably formed by at least one bond selected from the group consisting of amide, ester, lactone, urethane, ether, thiourethane, and thioether. For this reason, the functional group of the polymer constituting the main chain is preferably a functional group capable of forming at least one bond selected from the group consisting of amide, ester, lactone, urethane, ether, thiourethane, and thioether.

Examples of the "compound that forms a covalent-bond cross-linking moiety (the compound that forms a covalent bond)" include polyamine compounds having two or more amino and/or imino groups in one molecule (when both amino and imino groups are present, the total number of these groups is two or more); polyol compounds having two or more hydroxy groups in one molecule; polyisocyanate compounds having two or more isocyanate (NCO) groups in one molecule; polythiol compounds having two or more thiol groups (mercapto groups) in one molecule; and the like. The "compound that forms a covalent-bond cross-linking moiety (the compound that forms a covalent bond)" herein can be a compound capable of introducing both the hydrogen-bond cross-linkable moiety and the covalent-bond cross-linking moiety depending on the type of the substituent contained in the compound, the degree of the progress of a reaction in a case where the reaction is carried out by using such compound, or the like (for example, when a covalent bond cross-linking moiety is formed by using a compound having three or more hydroxy groups, two of the hydroxy groups react with a functional group of an elastomeric polymer having the functional group in side chains, and the remaining one hydroxy group is left as a hydroxy group in some cases depending on the degree of the progress of the reaction, and in this case, a moiety that can form a hydrogen-bond cross-linking can also be introduced). For this reason, "compounds that each form a covalent-bond cross-linking moiety (compounds that each forms a covalent bond)" listed as examples herein also include "compounds that each form both a hydrogen-bond cross-linkable moiety and a covalent-bond cross-linking moiety." From such a viewpoint, in the case of forming the side chain (b), the side chain (b) may be formed by selecting a compound from the "compounds that each form a covalent-bond cross-linking moiety (compounds that each form a covalent bond)" according to a target design, as appropriate, controlling the degree of the progress of the reaction, as appropriate, or doing the like. Note that when the compound that forms a covalent-bond cross-linking moiety has a heterocycle, it is possible to also simultaneously produce a hydrogen-bond cross-linkable moiety more efficiently, and it is possible to efficiently form a side chain having a covalent-bond cross-linking moiety as the side chain (c) described later. For this reason, specific examples of such compounds each having a heterocycle are described especially together with the side chain (c) as preferred compounds for producing the side chain (c). Note that because of its structure, the side chain (c) can also be regarded as a preferred mode of side chains such as the side chain (a) and the side chain (b).

Examples of the polyamine compound usable as the "compound that forms a covalent-bond cross-linking moiety (the compound that forms a covalent bond)" include alicyclic amines, aliphatic polyamines, aromatic polyamines, nitrogen-containing heterocyclic amines, and the like shown below.

Specific examples of the alicyclic amines include 1-amino-3-aminomethyl-3,5,5-trimethylcyclohexane, bis-(4-aminocyclohexyl)methane, diaminocyclohexane, di-(aminomethyl)cyclohexane, and the like.

In addition, examples of the aliphatic polyamines include, but are not particularly limited to, methylenediamine, ethylenediamine, propylenediamine, 1,2-diaminopropane, 1,3-diaminopentane, hexamethylenediamine, diaminoheptane, diaminododecane, diethylenetriamine, diethylaminopropylamine, N-aminoethylpiperazine, triethylenetetramine, N,N'-dimethylethylenediamine, N,N'-diethylethylenediamine, N,N'-diisopropylethylenediamine, N,N'-dimethyl-1,3-propanediamine, N,N'-diethyl-1,3-propanediamine, N,N'-diisopropyl-1,3-propanediamine, N,N'-dimethyl-1,6-hexanediamine, N,N'-diethyl-1,6-hexanediamine, N,N',N"-trimethylbis(hexamethylene)triamine, and the like.

Examples of the aromatic polyamines and the nitrogen-containing heterocyclic amines include, but are not particularly limited to, diaminotoluene, diaminoxylene, tetramethylxylylenediamine, tris(dimethylaminomethyl)phenol, m-phenylenediamine, diaminodiphenylmethane, diaminodiphenyl sulfone, 3-amino-1,2,4-triazole, and the like.

In addition, one or more hydrogen atoms in each of the polyamine compounds may be substituted by an alkyl group, an alkylene group, an aralkylene group, an oxy group, an acyl group, a halogen atom, or the like, or the skeleton of each polyamine compound may contain a heteroatom such as an oxygen atom or a sulfur atom.

In addition, one of the polyamine compounds may be used alone, or two or more thereof may be used in combination. When two or more thereof are used in combination, the mixing ratio can be adjusted to any ratio according to the application for which the thermoplastic elastomer (composition) of the present invention is used, or physical properties required for the thermoplastic elastomer (composition) of the present invention, and the like.

Among the polyamine compounds listed as examples above, hexamethylenediamine, N,N'-dimethyl-1,6-hexanediamine, diaminodiphenyl sulfone, and the like are preferable, because they provide high effects of improvement in compression set and mechanical strengths, especially, tensile strength.

The molecular weights or skeletons of the polyol compounds are not particularly limited, as long as the polyol compounds have two or more hydroxy groups. Examples of the polyol compounds include polyether polyols, polyester polyols, and other polyols shown below, mixed polyols thereof, and the like.

Specific examples of the polyether polyols include polyols each obtained by addition of at least one selected from ethylene oxide, propylene oxide, butylene oxide, and styrene oxide to at least one selected from polyols such as ethylene glycol, diethylene glycol, propylene glycol, dipropylene glycol, glycerin, 1,1,1-trimethylolpropane, 1,2,5-hexanetriol, 1,3-butanediol, 1,4-butanediol, 4,4'-dihydroxyphenylpropane, 4,4'-dihydroxyphenylmethane, and pentaerythritol; polyoxytetramethylene oxide; and the like. One of these polyether polyols may be used alone, or two or more thereof may be used in combination.

Specific examples of the polyester polyols include condensation polymers of one, two, or more low-molecular weight polyols such as ethylene glycol, propylene glycol, butanediol, pentanediol, hexanediol, cyclohexanedimethanol, glycerin, 1,1,1-trimethylolpropane, and others with one, two, or more low-molecular weight carboxylic acids or oligomeric acids such as glutaric acid, adipic acid, pimelic acid, suberic acid, sebacic acid, terephthalic acid, isophthalic acid, dimer acids, and others; ring-opening polymers of propiolactone, valerolactone, and the like; and the like. One of these polyester polyols may be used alone, or two or more thereof may be used in combination.

Specific examples of the other polyols include polymer polyols, polycarbonate polyols; polybutadiene polyols; hydrogenated polybutadiene polyols; acrylic polyols; low-molecular weight polyols such as ethylene glycol, diethylene glycol, propylene glycol, dipropylene glycol, butanediol, pentanediol, hexanediol, polyethylene glycol laurylamine (for example, N,N-bis(2-hydroxyethyl)laurylamine), polypropylene glycol laurylamine (for example, N,N-bis(2-methyl-2-hydroxyethyl)laurylamine), polyethylene glycol octylamine (for example, N,N-bis(2-hydroxyethyl)octylamine), polypropylene glycol octylamine (for example, N,N-bis(2-methyl-2-hydroxyethyl)octylamine), polyethylene glycol stearylamine (for example, N,N-bis(2-hydroxyethyl)stearylamine), and polypropylene glycol stearylamine (for example, N,N-bis(2-methyl-2-hydroxyethyl)stearylamine); and the like. One of these polyols may be used alone, or two or more thereof may be used in combination.

Examples of the polyisocyanate compounds include diisocyanate compounds including aromatic polyisocyanates such as 2,4-tolylene diisocyanate (2,4-TDI), 2,6-tolylene diisocyanate (2,6-TDI), 4,4'-diphenylmethane diisocyanate (4,4'-MDI), 2,4'-diphenylmethane diisocyanate (2,4'-MDI), 1,4-phenylene diisocyanate, xylylene diisocyanate (XDI), tetramethylxylylene diisocyanate (TMXDI), tolidine diisocyanate (TODI), and 1,5-naphthalene diisocyanate (NDI), aliphatic polyisocyanates such as hexamethylene diisocyanate (HDI), trimethylhexamethylene diisocyanate (TMHDI), lysine diisocyanate, and norbornane diisocyanatomethyl (NBDI), alicyclic polyisocyanates such as trans-cyclohexane-1,4-diisocyanate, isophorone diisocyanate (IPDI), $H_6$XDI (hydrogenated XDI), $H_{12}$MDI (hydrogenated MDI), and $H_6$TDI (hydrogenated TDI), and the like; polyisocyanate compounds such as polymethylene polyphenylene polyisocyanate; carbodiimide-modified polyisocyanates of these isocyanate compounds; isocyanurate-modified polyisocyanate of these isocyanate compounds; urethane prepolymers obtained by reactions of these isocyanate compounds with the polyol compounds listed as examples above; and the like. One of these polyisocyanate compounds may be used alone, or two or more thereof may be used in combination.

The molecular weight, the skeleton, or the like of each of the polythiol compounds is not particularly limited, as long as the polythiol compounds have two or more thiol groups. Specific examples of the polythiol compounds include methanedithiol, 1,3-butanedithiol, 1,4-butanedithiol, 2,3-butanedithiol, 1,2-benzenedithiol, 1,3-benzenedithiol, 1,4-benzenedithiol, 1,10-decanedithiol, 1,2-ethanedithiol, 1,6-hexanedithiol, 1,9-nonanedithiol, 1,8-octanedithiol, 1,5-pentanedithiol, 1,2-propanedithiol, 1,3-propadithiol, toluene-3,4-dithiol, 3,6-dichloro-1,2-benzenedithiol, 1,5-naphthalenedithiol, 1,2-benzenedimethanethiol, 1,3-benzenedimethanethiol, 1,4-benzenedimethanethiol, 4,4'-thiobisbenzenethiol, 2,5-dimercapto-1,3,4-thiadiazole, 1,8-dimercapto-3,6-dioxaoctane, 1,5-dimercapto-3-thiapentane, 1,3,5-triazine-2,4,6-trithiol (trimercapto-triazine), 2-di-n-butylamino-4,6-dimercapto-s-triazine, trimethylolpropane tris($\beta$-thiopropionate), trimethylolpropane tris(thioglycollate), polythiols (THIOKOL or thiol-modified polymers (resins, rubbers, and the like)), and the like. One of these polythiol compounds may be used alone, or two or more thereof may be used in combination.

A functional group which is contained in the polymer constituting the main chain, and which reacts with the "compound that forms a covalent-bond cross-linking moiety (compound that forms a covalent bond)" is preferably a functional group which can create (generate: form) at least one bond selected from the group consisting of amide, ester, lactone, urethane, thiourethane, and thioether. Preferred examples of such functional group include cyclic acid anhydride groups, hydroxy groups, amino groups, carboxy groups, isocyanate groups, thiol groups, and the like.

Note that the elastomeric polymer (B) having the side chain (b) has, in a portion of the side chain (b), at least one cross-linkage at the covalent-bond cross-linking moiety, specifically, at least one cross-linkage by a covalent bond formed by a reaction of the functional group with the above-described "compound that forms a covalent-bond cross-linking moiety (compound that forms a covalent bond)" in one molecule. Particularly when the cross-linking is formed by at least one bond selected from the group consisting of lactone, urethane, ether, thiourethane, and thioether, the elastomeric polymer (B) preferably has two or more cross-linkages, more preferably 2 to 20 cross-linkages, and further preferably 2 to 10 cross-linkages.

In addition, the cross-linkage at the covalent-bond cross-linking moiety of the side chain (b) preferably contains a tertiary amino bond (—N═) or an ester bond (—COO—), because the compression set and the mechanical strengths (elongation at break and strength at break) of the obtained thermoplastic elastomer (composition) can be improved more easily. Note that, in this case, when an elastomer having a side chain containing a group capable of forming a hydrogen bond with the tertiary amino bond (—N═) or the ester bond (—COO—) is contained (for example, in a case where another elastomer having a side chain containing a hydroxy group or the like is present, or other cases), the covalent-bond cross-linking moiety can function as a side chain (c) described later. For example, in a case of an elastomeric polymer (B) having the side chain (a) as the side chain (a') (i.e., in a case where the elastomeric polymer (B) is an elastomeric polymer having both the side chains (a) and (b)), when the cross-linkage at the covalent-bond cross-linking moiety has the tertiary amino bond and/or the ester bond, these groups and groups in the side chain (a) (side chain having a carbonyl-containing group and/or a nitrogen-containing heterocycle) presumably form hydrogen bonds (interact with each other), making it possible to further improve the cross-linking density. Note that from the viewpoint of forming the side chain (b) having a structure containing a tertiary amino bond (—N═) or an ester bond (—COO—), the "compound that forms a covalent-bond cross-linking moiety (compound that forms a covalent bond)" is preferably polyethylene glycol laurylamine (for example, N,N-bis(2-hydroxyethyl)laurylamine), polypropylene glycol laurylamine (for example, N,N-bis(2-methyl-2-hydroxyethyl)laurylamine), polyethylene glycol octylamine (for example, N,N-bis(2-hydroxyethyl)octylamine), polypropylene glycol octylamine (for example, N,N-bis(2-methyl-2-hydroxyethyl)octylamine), polyethylene glycol stearylamine (for example, N,N-bis(2-hydroxyethyl) stearylamine), or polypropylene glycol stearylamine (for example, N,N-bis(2-methyl-2-hydroxyethyl)stearylamine), among those listed as examples above.

Note that even when the above-described compound that forms a covalent-bond cross-linking moiety (compound that forms a covalent bond) is used, a hydrogen-bond cross-linkable moiety is also introduced in some cases, depending on the degree of the progress of the reaction, the type of substituent, the stoichiometric ratio of the raw materials used, and the like. Hence, preferred structures of the covalent-bond cross-linking moiety are described together with preferred structures of a covalent-bond cross-linking moiety in the side chain (c).

<Side Chain (c): Side Chain Containing Both Hydrogen-Bond Cross-Linkable Moiety and Covalent-Bond Cross-Linking Moiety>

The side chain (c) contains both a hydrogen-bond cross-linkable moiety and a covalent-bond cross-linking moiety in a single side chain. The hydrogen-bond cross-linkable moiety contained in the side chain (c) is the same as the hydrogen-bond cross-linkable moiety described for the side chain (a'), and preferred ones thereof are the same as those for the hydrogen-bond cross-linkable moiety in the side chain (a). In addition, as the covalent-bond cross-linking moiety contained in the side chain (c), the same covalent-bond cross-linking moiety as that in the side chain (b) can be used (the same cross-linkages can be used as preferred cross-linkage thereof).

The side chain (c) is preferably one formed by a reaction of an elastomeric polymer having a functional group in a side chain (the polymer for forming a main chain portion) with a compound that forms both a hydrogen-bond cross-linkable moiety and a covalent-bond cross-linking moiety upon a reaction with the functional group (a compound that introduces both a hydrogen-bond cross-linkable moiety and a covalent-bond cross-linking moiety). The compound that forms both a hydrogen-bond cross-linkable moiety and a covalent-bond cross-linking moiety (compound that introduces both a hydrogen-bond cross-linkable moiety and a covalent-bond cross-linking moiety) is preferably a compound that has a heterocycle (particularly preferably a nitrogen-containing heterocycle) and is capable of forming a covalent-bond cross-linking moiety (a compound that forms a covalent bond), and, especially, the compound is more preferably a heterocycle-containing polyol, a heterocycle-containing polyamine, a heterocycle-containing polythiol, or the like.

Note that, as the heterocycle-containing polyols, polyamines, and polythiols, it is possible to use, as appropriate, the same polyols, polyamines, and polythiols described for the above-described "compound capable of forming a covalent-bond cross-linking moiety (compound that forms a covalent bond)," except that a heterocycle (particularly preferably a nitrogen-containing heterocycle) is present. In addition, examples of the heterocycle-containing polyols include, but are not particularly limited to, bis or tris(2-hydroxyethyl)isocyanurate, Kojic acid, dihydroxy-dithiane, and tris(hydroxyethyl)triazine. Meanwhile, examples of the heterocycle-containing polyamines include, but are not particularly limited to, acetoguanamine, piperazine, bis(aminopropyl)piperazine, benzoguanamine, and melamine. Moreover, examples of the heterocycle-containing polythiols include dimercaptothiadiazole, and tris-[(3-mercaptopropionyloxy)-ethyl] isocyanurate. Accordingly, the side chain (c) is preferably one obtained by a reaction of an elastomeric polymer having a functional group in a side chain (the polymer for forming a main chain portion) with a heterocyclic-containing polyol, polyamine, or polythiol, or the like.

Note that the functional group of the polymer constituting a main chain that reacts with the "compound that forms both a hydrogen-bond cross-linkable moiety and a covalent-bond cross-linking moiety (the compound that introduces both a hydrogen-bond cross-linkable moiety and a covalent-bond cross-linking moiety)" is preferably a functional group capable of forming at least one bond selected from the group consisting of amide, ester, lactone, urethane, thiourethane, and thioether. Preferred examples of such a functional group include a cyclic acid anhydride group, a hydroxy group, an amino group, a carboxy group, an isocyanate group, a thiol group, and the like.

In addition, the elastomeric polymer (B) having the side chain (c) has at least one cross-linkage at the covalent-bond cross-linking moiety in a portion of the side chain (c) in one molecule. Especially when the cross-linking is formed by at least one bond selected from the group consisting of lactone, urethane, ether, thiourethane, and thioether, the elastomeric polymer (B) has preferably two or more cross-linkages, more preferably 2 to 20 cross-linkages, and further preferably 2 to 10 cross-linkages. In addition it is preferable that the cross-linkage at the covalent-bond cross-linking moiety of the side chain (c) contain a tertiary amino bond (—N═) or an ester bond (—COO—), because the compression set and the mechanical strengths (elongation at break and strength at break) of the obtained thermoplastic elastomer (composition) are further improved.

(Regarding Structures Preferred as Covalent-Bond Cross-Linking Moieties in Side Chains (b) and (c))

Regarding the side chains (b) and/or (c), suppose a case where the cross-linkage at the covalent-bond cross-linking moiety contains a tertiary amino bond (—N═) or an ester bond (—COO—), and the binding site of such a bond also functions as a hydrogen-bond cross-linkable moiety. Such a case is preferable because the compression set and the mechanical strengths (elongation at break and strength at break) of the obtained thermoplastic elastomer (composition) are improved to higher levels. When a tertiary amino bond (—N═) or an ester bond (—COO—) in a side chain having a covalent-bond cross-linking moiety forms a hydrogen bond with another side chain as described above, the covalent-bond cross-linking moiety containing a tertiary amino bond (—N═) or an ester bond (—COO—) also comprises a hydrogen-bond cross-linkable moiety, and can function as the side chain (c).

Suppose, for example, a case where the elastomeric polymer (B) has the side chain (a) as the side chain (a'), and has a covalent-bond cross-linking moiety containing the tertiary amino bond and/or the ester bond. In such a case, when the tertiary amino bond and/or the ester bond forms a hydrogen bond (interacts) with a group in the side chain (a), the cross-linking density can be further improved, presumably. Here, preferred examples of the compound that can form a covalent-bond cross-linking moiety containing the tertiary amino bond and/or the ester bond upon a reaction with a functional group of the polymer constituting a main chain (compound capable of forming both a hydrogen-bond cross-linkable moiety and a covalent-bond cross-linking moiety) include polyethylene glycol laurylamine (for example, N,N-bis(2-hydroxyethyl)laurylamine), polypropylene glycol laurylamine (for example, N,N-bis(2-methyl-2-hydroxyethyl)laurylamine), polyethylene glycol octylamine (for example, N,N-bis(2-hydroxyethyl)octylamine), polypropylene glycol octylamine (for example, N,N-bis(2-methyl-2-hydroxyethyl)octylamine), polyethylene glycol stearylamine (for example, N,N-bis(2-hydroxyethyl) stearylamine), and polypropylene glycol stearylamine (for example, N,N-bis(2-methyl-2-hydroxyethyl)stearylamine).

The above-described cross-linkage at the covalent-bond cross-linking moiety in the side chain (b) and/or the side chain (c) is preferably one containing at least one structure represented by any one of the following general formulae (4) to (6), and is more preferably one in which G in the formulae contains a tertiary amino bond or an ester bond (note that when a structure shown below contains a hydrogen-bond cross-linkable moiety, the side chain having the structure is used as a side chain (c)).

[Chem. 9]

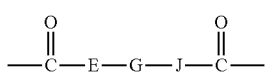

(4)

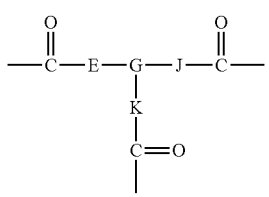

(5)

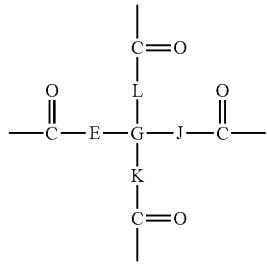

(6)

In the above-described general formulae (4) to (6), E, J, K, and L are each independently a single bond; an oxygen atom, an amino group NR' (where R' is a hydrogen atom or an alkyl group having 1 to 10 carbon atoms), or a sulfur atom; or an organic group optionally containing any of the atoms or groups, and G is a linear-chain, branched-chain, or cyclic hydrocarbon group having 1 to 20 carbon atoms and optionally containing an oxygen atom, a sulfur atom, or a nitrogen atom.

Here, the substituents E, J, K, and L are each independently basically the same as the substituent B in the above-described general formula (1).

In addition, examples of the substituent G include alkylene groups such as a methylene group, an ethylene group, a 1,3-propylene group, a 1,4-butylene group, a 1,5-pentylene group, a 1,6-hexylene group, a 1,7-heptylene group, a 1,8-octylene group, a 1,9-nonylene group, a 1,10-decylene group, a 1,11-undecylene group, and a 1,12-dodecylene group; N,N-diethyldodecylamine-2,2'-diyl, N,N-dipropyldodecylamine-2,2'-diyl, N,N-diethyloctylamine-2,2'-diyl, N,N-dipropyloctylamine-2,2'-diyl, N,N-diethylstearylamine-2,2'-diyl, and N,N-dipropylstearylamine-2,2'-diyl; a vinylene group; divalent alicyclic hydrocarbon groups such as a 1,4-cyclohexene group; divalent aromatic hydrocarbon groups such as a 1,4-phenylene group, a 1,2-phenylene group, a 1,3-phenylene group, and a 1,3-phenylenebis(methylene) group; trivalent hydrocarbon groups such as propane-1,2,3-triyl, butane-1,3,4-triyl, trimethylamine-1,1',1"-triyl, and triethylamine-2,2',2"-triyl; trivalent cyclic hydrocarbons containing an oxygen atom, a sulfur atom, or a nitrogen atom such as an isocyanurate group and a triazine group; tetravalent hydrocarbon groups represented by the following formulae (12) and (13); substituents formed by combining any ones of them; and the like. In addition, the substituents G in these formulae each preferably have a structure of an isocyanurate group (isocyanurate ring) from the viewpoints of achieving high heat resistance and high strength thanks to hydrogen bonds. More specifically, the substituents G in these formulas are preferably groups represented by the following general formula (111) and groups represented by the following general formula (112) from the viewpoints of achieving high heat resistance and high strength thanks to hydrogen bonds.

[Chem. 10]

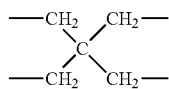

(12)

(13)

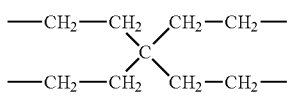

(111)

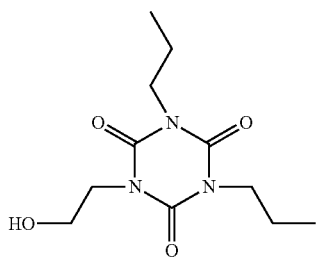

(112)

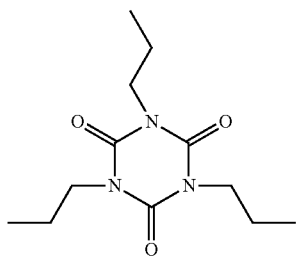

Moreover, the above-described cross-linkage at the covalent-bond cross-linking moiety of the side chain (c) preferably contains at least one structure represented by anyone of the following formulae (7) to (9), which is bonded to the main chain of the above-described elastomeric polymer at the α position or the R position, and more preferably contains at least one structure represented by any one of the following formulae (7) to (9), in which G contains a tertiary amino group (the structures shown in the formulae (7) to (9) contain hydroxy groups and carbonyl groups, and can be considered as structures containing both a hydrogen-bond cross-linkable moiety and a covalent-bond cross-linking moiety, and a side chain having such a structure can function as the side chain (c)).

[Chem. 11]

(7)

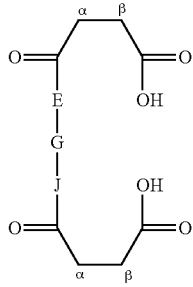

(8)

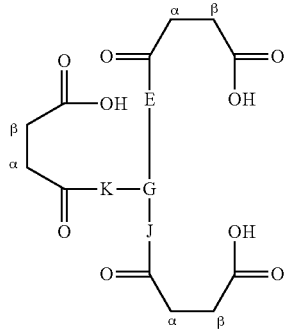

(9)

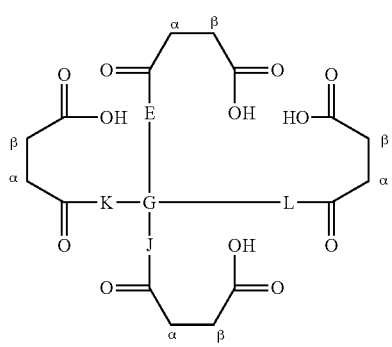

In the formulae (7) to (9), the substituents E, J, K, and L are each independently basically the same as the substituents E, J, K, and L in the above-described formulae (4) to (6), and the substituent G is basically the same as the substituent G in the above-described formula (4) to (6).

In addition, specific preferred examples of the structure represented by any one of the formulae (7) to (9) include structures represented by the following formula (14) to (25):

[Chem. 12]

(14)

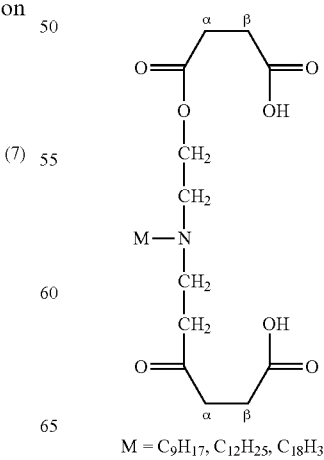

M = $C_9H_{17}$, $C_{12}H_{25}$, $C_{18}H_{37}$

(15)
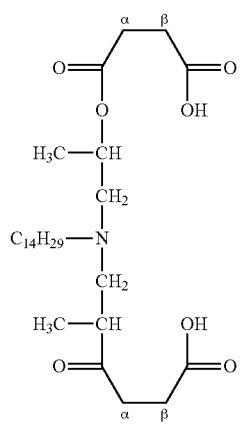
(16)
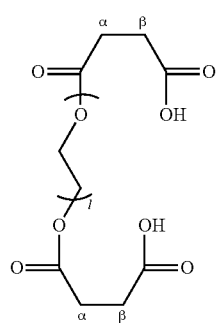
(17)
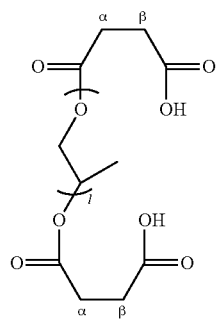
(In the formulae, l represents an integer of 1 or greater)
[Chem. 13]
(18)
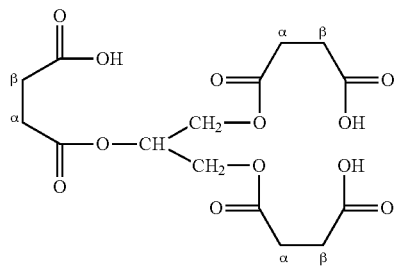
(19)
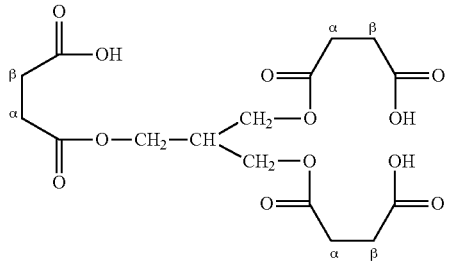
(20)
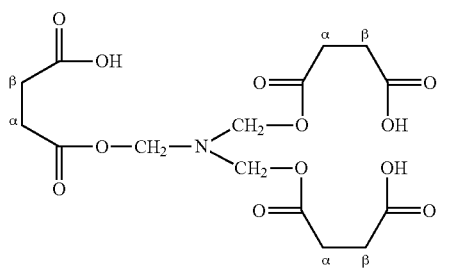
(21)
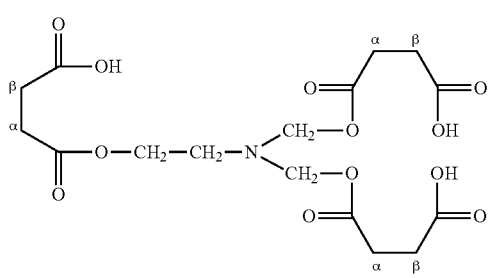
[Chem. 14]
(22)
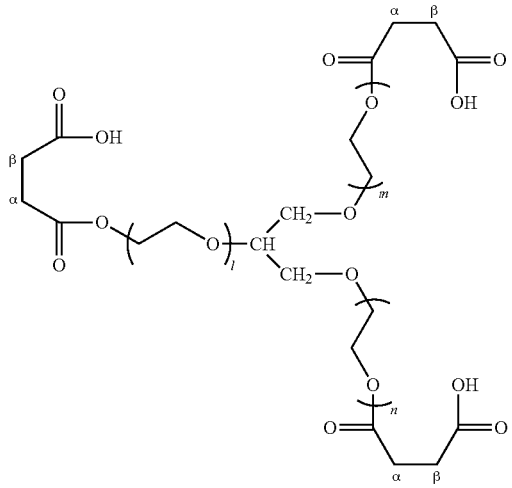

(23)

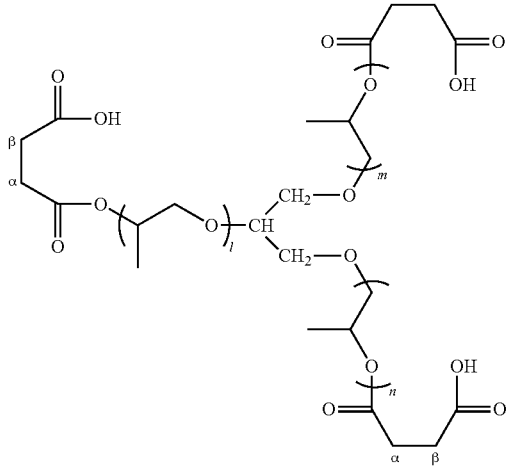

(In the formulae, l, m, and n each independently represent an integer of 1 or greater)

[Chem. 15]

(24)

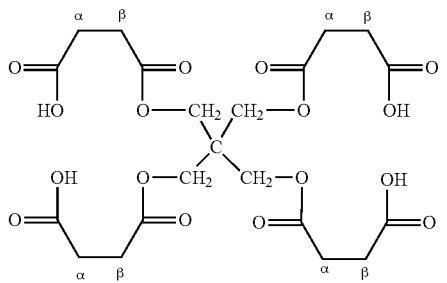

(25)

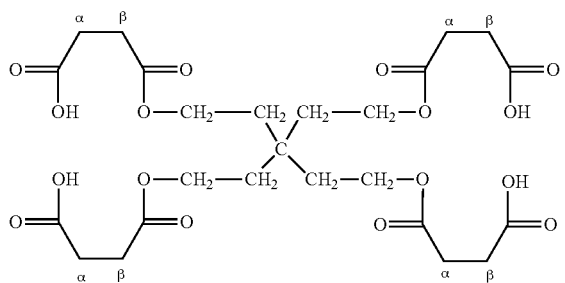

In addition, a cross-linkage at the above-described covalent-bond cross-linking moiety in each of the side chains (b) and (c) is preferably formed by a reaction of a cyclic acid anhydride group with a hydroxy group or an amino group and/or an imino group. For example, when a polymer forming a main chain portion after the reaction has a cyclic acid anhydride group (for example, a maleic anhydride group) as a functional group, the cross-linkage may be formed by a reaction of the cyclic acid anhydride group of the polymer with the compound that forms a covalent-bond cross-linking moiety having a hydroxy group or an amino group and/or an imino group (compound that forms a covalent bond), to form a moiety cross-linked by the covalent bond, thereby cross-linking polymer molecules.

The cross-linkage at the covalent-bond cross-linking moiety of each of the side chains (b) and (c) is more preferably formed by at least one bond selected from the group consisting of amide, ester, lactone, urethane, ether, thiourethane, and thioether.

Hereinabove, the side chain (a'), the side chain (a), the side chain (b), and the side chain (c) are described. The groups (structures) and the like of the side chains in the polymers can be identified by ordinarily used analytic techniques such as NMR and IR spectrometry.

In addition, the elastomeric polymer (A) is an elastomeric polymer having the side chain (a) and having a glass-transition point of 25° C. or below, whereas the elastomeric polymer (B) is an elastomeric polymer containing a hydrogen-bond cross-linkable moiety and a covalent-bond cross-linking moiety in a side chain and having a glass-transition point of 25° C. or below (a polymer having both the side chain (a') and the side chain (b) as side chains, or a polymer containing at least one side chain (c) in a side chain, or the like). As the elastomer component, one of the elastomeric polymers (A) and (B) may be used alone, or a mixture of two or more thereof may be used.

Note that the elastomeric polymer (B) may be either a polymer having both a side chain (a') and a side chain (b), or a polymer having a side chain (c). From the viewpoint that a stronger hydrogen bond is formed, the hydrogen-bond cross-linkable moiety contained in the side chain of the elastomeric polymer (B) is preferably a hydrogen-bond cross-linkable moiety having a carbonyl-containing group and/or a nitrogen-containing heterocycle (more preferably a hydrogen-bond cross-linkable moiety having a carbonyl-containing group and a nitrogen-containing heterocycle).

In addition, from the viewpoint of easy and industrial availability and high level balance between mechanical strength and compression set, at least one elastomer component selected from the group consisting of the elastomeric polymers (A) and (B) is preferably at least one selected from the group consisting of reaction products of a maleic anhydride-modified elastomeric polymer with at least one compound (hereinafter simply referred to as a "compound (X)" in some cases) selected from triazoles optionally having at least one substituent selected from hydroxy groups, thiol groups, and amino groups, pyridines optionally having at least one substituent selected from hydroxy groups, thiol groups, and amino groups, thiadiazoles optionally having at least one substituent selected from hydroxy groups, thiol groups, and amino groups, imidazoles optionally having at least one substituent selected from hydroxy groups, thiol groups, and amino groups, isocyanurates optionally having at least one substituent selected from hydroxy groups, thiol groups, and amino groups, triazines optionally having at least one substituent selected from hydroxy groups, thiol groups, and amino groups, hydantoins optionally having at least one substituent selected from hydroxy groups, thiol groups, and amino groups, tris(hydroxyethyl) isocyanurate, sulfamides, pentaerythritol, 2,4-diamino-6-phenyl-1,3,5-triazine, and polyether polyols. As described above, the elastomeric polymers (A) and (B) are preferably reaction products of the maleic anhydride-modified elastomeric polymer with the compound (X).

A method for producing such an elastomeric polymer (A) or (B) is not particularly limited, and a known method can be employed, as appropriate, by which at least one selected from the group consisting of the side chain (a); the side chain (a') with the side chain (b); and the side chain (c) as described above can be introduced as a side chain of an elastomeric polymer having a glass-transition point of 25° C. or below. For example, as the method for producing the elastomeric polymer (B), it is also possible to employ a method described in Japanese Unexamined Patent Application Publication No. 2006-131663. In addition, to obtain the elastomeric polymer (B) comprising the side chain (a') and the side chain (b) as described above, for example, these side chains may be simultaneously introduced to an elastomeric polymer having a cyclic acid anhydride group (for example, a maleic anhydride group) serving as a functional group in a side chain by using a mixture (mixed raw material) of a compound that forms a covalent-bond cross-linking moiety upon a reaction with the cyclic acid anhydride group (a compound that forms a covalent bond) and a compound that forms a hydrogen-bond cross-linkable moiety upon a reaction with the cyclic acid anhydride group (a compound capable of introducing a nitrogen-containing heterocycle).

In addition, as a method for producing the elastomeric polymers (A) and (B), it is possible to employ, for example, a method in which an elastomeric polymer having a functional group (for example, a cyclic acid anhydride group or the like) in a side chain (for example, preferable ones include maleic anhydride-modified elastomeric polymers) is used, and the elastomeric polymer is reacted with at least one raw material compound (for example, preferable ones include the compound (X)) of a compound that forms a hydrogen-bond cross-linkable moiety upon a reaction with the functional group, and a mixed raw material of a compound that forms a hydrogen-bond cross-linkable moiety upon a reaction with the functional group and a compound that forms a covalent-bond cross-linking moiety upon a reaction with the functional group, to produce an elastomeric polymer having the side chain (a); an elastomeric polymer having the side chain (a') with the side chain (b); and/or an elastomeric polymer having the side chain (c) (the elastomeric polymers (A) and (B)). Note that conditions (temperature condition, atmosphere conditions, or the like) employed for the reaction are not particularly limited, and may be set, as appropriate, according to the types of the functional group and the compound to be reacted with the functional group (compound that forms a hydrogen-bond cross-linkable moiety and/or a compound that forms a covalent-bond cross-linking moiety). Note that the elastomeric polymer (A) may also be produced by polymerization of a monomer having a hydrogen bonding moiety.

The elastomeric polymer having such a functional group (for example, a cyclic acid anhydride group) in a side chain is preferably a polymer that can form a main chain of the above-described elastomeric polymers (A) and (B) and having a functional group in a side chain. Here, the "elastomeric polymer containing a functional group in a side chain" refers to an elastomeric polymer having a functional group (the above-described functional group or the like, for example, a cyclic acid anhydride group or the like) chemically stably bonded (covalently bonded) to an atom forming a main chain, and it is possible to preferably use one obtained by a reaction of an elastomeric polymer (for example, a known natural polymer or synthetic polymer) with a compound capable of introducing a functional group.

In addition, the functional group is preferably a functional group capable of forming at least one bond selected from the group consisting of amide, ester, lactone, urethane, ether, thiourethane, and thioether, among which a cyclic acid anhydride group, a hydroxy group, an amino group, a carboxy group, an isocyanate group, a thiol group, or the like is preferable. The functional group is particularly preferably acyclic acid anhydride group, from the viewpoint that the clay can be dispersed more efficiently in the composition. In addition, the cyclic acid anhydride group is preferably a succinic anhydride group, a maleic anhydride group, a glutaric anhydride group, or a phthalic anhydride group. Especially, a maleic anhydride group is more preferable, from the viewpoint that it can be easily introduced to a side chain of a polymer and can be easily obtained industrially. In addition, when the functional group is a cyclic acid anhydride group, the functional group may be introduced to the elastomeric polymer (for example, a known natural polymer or synthetic polymer) by using, for example, a cyclic acid anhydride such as succinic anhydride, maleic anhydride, glutaric anhydride, phthalic anhydride, and an derivative thereof, as a compound enabling the introduction of the functional group.

Note that the compound that forms a hydrogen-bond cross-linkable moiety upon a reaction with the functional group is not particularly limited, and it is preferable to use the above-described "compound that forms a hydrogen-bond cross-linkable moiety (a compound capable of introducing a nitrogen-containing heterocycle)." In addition, the compound that forms a covalent-bond cross-linking moiety upon a reaction with the functional group is not particularly limited, and it is preferable to use the above-described "compound that forms a covalent-bond cross-linking moiety (compound that forms a covalent bond)." Moreover, as the compound that forms a hydrogen-bond cross-linkable moiety (a compound capable of introducing a nitrogen-containing heterocycle) and the compound that forms a covalent-bond cross-linking moiety (a compound that forms a covalent bond), a compound that forms both a hydrogen-bond cross-linkable moiety and a covalent-bond cross-linking moiety upon a reaction with the functional group (for example, a polyol, polyamine, or polythiol containing a nitrogen-containing heterocycle, or the like) can also be used preferably.

In addition, when a method in which an elastomeric polymer having a side chain in a functional group (for example, cyclic acid anhydride group) is used, and the elastomeric polymer is reacted with at least one raw material compound of a compound that forms a hydrogen-bond cross-linkable moiety upon a reaction with the functional group, and a mixed raw material of a compound that forms a hydrogen-bond cross-linkable moiety upon a reaction with the functional group and a compound that forms a covalent-bond cross-linking moiety upon a reaction with the functional group, to produce the elastomeric polymer (A) having the side chain (a), or the elastomeric polymer (B) containing a hydrogen-bond cross-linkable moiety and a covalent-bond cross-linking moiety in a side chain is employed as a method for producing an elastomer component (elastomeric polymers (A) and (B)), it is possible to employ a method in which, before the reaction of the elastomeric polymer having a functional group in a side chain with the raw material compound, an clay is mixed with the elastomeric polymer having a functional group in a side chain, and then the raw material compound is added, followed by a reaction, to form the composition simultaneously with the preparation of the elastomer component (a method in which a clay is added first).

Note that it is preferable to disperse the organically modified clay at the time of the preparation of the elastomer component by employing the above-described method in which the organically modified clay is added first at the time of the production of the elastomer components (elastomeric polymers (A) and (B)) because the dispersibility of the organically modified clay is further improved to lead to a higher level of heat resistance. In addition, as the method in which the organically modified clay is added first, it is more preferable to employ a method for producing a thermoplastic elastomer composition of the present invention described later.

(Organically Modified Clay)

The organically modified clay according to the present invention preferably usable includes, but is not limited to, clays organically modified by organically modifying agents, for example. The "organically modified clay" is preferably a clay in the state where an organically modifying agent such as a quaternary ammonium salt is introduced between layers (for example, the state where an organically modifying agent is inserted between layers). Note that the method for introducing an organically modifying agent between layers of clay is not particularly limited, and it is possible to appropriately employ a method for introducing an organically modifying agent between layers of clay by, for example, using the positive ion exchanging property possessed by clays such as montmorillonite being a layered mineral. In this way, it is possible to easily obtain an organically modified clay by treating a layered mineral clay with an organically modifying agent such that the organically modifying agent is introduced between layers of clay. Note that such an organically modified clay makes it possible to more easily delaminate layers of clay and to more efficiently disperse single-layered clays in organic solvents and resins.

Clays to be organically modified with an organically modifying agent (clays before organic modification) are not particularly limited, and any publicly known clay can be used. Examples thereof include montmorillonite, saponite, hectorite, beidellite, stevensite, nontronite, vermiculite, halloysite, mica, fluorinated mica, kaolinite, pyrophyllite, smectite, sericite, illite, glauconite, chlorite, talc, zeolite, hydrotalcite, and the like. The clay may be a natural product or a synthetic product.

The organically modifying agent which can be used to organically modify the clay is not particularly limited, and a known organically modifying agent capable of organically modifying a clay can be used, as appropriate. For example, it is possible to appropriately use known organically modifying agents such as hexylammonium ions, octylammonium ions, 2-ethylhexylammonium ions, dodecylammonium ions, laurylammonium ions, octadecylammonium ions, dioctyldimethylammonium ions, trioctylammonium ions, dioctadecyldimethylammonium ions, trioctylammonium ions, dioctadecyldimethylammonium ions, trioctadecylammonium ions, dimethylstearylammonium ions, oleyl bis(2-hydroxylethyl) methylammonium ions, and trimethylstearylbenzylammonium ions.

The organically modifying agent is preferably at least one organically modifying agent selected from ammonium salts represented by the following general formula (I):

$$R_2N^+(CH_3)_2 \cdot X^-  \qquad (I)$$

(in formula (I), R each independently represent at least one selected from alkyl groups and aralkyl groups, and $X^-$ represents a counter anion)
from the viewpoint that it is possible to have 100% modulus, tensile strength at break, and oil resistance in a well balanced manner at a high level.

The alkyl groups which can be selected as R in general formula (I) are preferably ones having 1 to 40 (more preferably 1 to 30 and further preferably 1 to 20) carbon atoms. If the number of carbon atoms exceeds the upper limit, organic modification of clay tends to be difficult because too large a molecule makes it difficult for the molecules of organically modifying agent (ammonium salt) to intrude between layers of clay. In addition, the alkyl groups which can be selected as R in general formula (I) include, for example, methyl, ethyl, propyl, hexyl, oleyl, octyl, decyl, dodecyl, and octadecyl groups (stearyl groups). Among these, methyl and octadecyl groups (stearyl groups) are preferable and octadecyl groups (stearyl groups) are more preferable from the viewpoint that it is possible to have 100% modulus, tensile strength at break, and oil resistance in a well balanced manner at a high level.

In addition, the aralkyl groups which can be selected as R in general formula (I) are preferably ones having 6 to 30 (more preferably 6 to 25 and further preferably 6 to 20) carbon atoms. If the number of carbon atoms exceeds the upper limit, organic modification of clay tends to be difficult because too large a molecule makes it difficult for the molecules of organically modifying agent (ammonium salt) to intrude between layers of clay. The aralkyl groups include a benzyl group, a phenethyl group, a naphthyl methyl group, a fluorenylmethyl group, and the like. Among these, a benzyl group is more preferable from the viewpoint that it is possible to have 100% modulus, tensile strength at break, and oil resistance in a well balanced manner at a high level.

In addition, $X^-$ represents a counter anion. The counter anion it not particularly limited and includes, for example, halide ions such as the chloride ion, the bromide ion, and the iodide ion and borate ions such as borate anions, tetrafluoroborate anions, and hexafluoroborate anions.

In addition, the organically modifying agent is more preferably one containing both an ammonium salt (A) which is represented by general formula (I) described above and in which the two R in formula (I) are both an alkyl group and an ammonium salt (B) in which one of the two R in general formula (I) described above is an alkyl group and the other is an aralkyl group from the viewpoint that it is possible to have 100% modulus, tensile strength at break, and oil resistance in a well balanced manner at a high level. Note that examples of the ammonium salt (A) include dimethyldioctadecylammonium salts, and examples of the ammonium salt (B) include dimethylstearylbenzylammonium salts.

In addition, as the organically modified clay, it is possible to preferably use a clay organically modified with a quaternary ammonium salt from the viewpoint that it is possible to have 100% modulus, tensile strength at break, and oil resistance in a well balanced manner at a high level. Examples of the quaternary ammonium salt of the clay which can be preferably used include, but are not particularly limited to, trimethylstearylammonium salts, salts of oleyl bis(2-hydroxylethyl), methylammonium salts, dimethylstearylbenzylammonium salts, dimethyloctadecylammonium salts, and mixtures of two or more thereof. Note that as the quaternary ammonium salt of an organically modified clay, a dimethylstearylbenzylammonium salt, a dimethyloctadecylammonium salt, or a mixture thereof can be used more preferably, and a mixture of a dimethylstearylbenzylammonium salt and a dimethyloctadecylammonium salt can be used further preferably, from the viewpoint of improvement in tensile strength and heat resistance.

In addition, a commercially available one can be used as the organically modified clay, and, for example, those manufactured by KUNIMINE INDUSTRIES CO., LTD. under the trade name of "Kunfil-D36," "Kunfil-B1," "Kunfil-HY," and the like, as well as those manufactured by HOJUN Co., Ltd. under the trade name of "S-BEN series (C, E, W, WX, N-400, NX, NX80, NZ, NZ70, NE, NEZ, NO12S, and NO12," and "ORGANITE series (D, T), and the like, can be used, as appropriate. Among the commercially available organically modified clays, those manufactured by KUNIMINE INDUSTRIES CO., LTD. under the trade name of "Kunfil-D36" and manufactured by HOJUN Co., Ltd. under the trade name of "S-BEN series WX" can be used preferably. Note that these commercially available organically modified clays are in the state where an organically modifying agent has been introduced between layers of clay.

(Polymer (Z))

The polymer (Z) according to the present invention is a polymer component contained together with the elastomer component. Additionally, the polymer (Z) is a polymer other than the elastomeric polymer (A) and the elastomeric polymer (B) described above. Here, polymers usable as the polymer (Z) may be selected from polymers other than the elastomeric polymers (A) and (B) described above. Examples which can be used as appropriate include, for example, polymers having a glass-transition point of over 25° C. (in this case, a hydrogen-bond cross-linkable moiety and the like may be included) and polymers not containing a side chain and having a glass-transition point of 25° C. or below, as described in the elastomeric polymer (A) and the elastomeric polymer (B).

In addition, the SP value of the polymer (Z) is 9.0 or more, preferably 9.0 to 16.0, and more preferably 10.0 to 15.0. An SP value exceeding the upper limit tends to be result in poor mixture with other resins. On the other hand, an SP value less than the lower limit tends to be result in poor mixture with other resins.

Examples of polymers having an SP value of 9.0 or more includes ethylene-methyl acrylate copolymerization resin (abbreviation: EMA, SP value: 9.1), Polyamide 12 (abbreviation: PA12, SP value: 13), NBR medium (75/25), ethyl methacrylate, polystyrene, propyl acrylate, butyl acrylate, polysulfide rubber (T), methacrylate resin, poly(methyl-methacrylate), propylene, chlorinated rubber, tetrahydrofuran, polyvinyl chloride (PVC), polyvinyl acetate, NBR medium to medium high (70/30), vinyl chloride, methyl-methacrylate, ethyl acrylate, acrylic rubber (ACM), methylene chloride, formaldehyde (oxymethylene) urethane rubber (U), methyl acrylate, vinyl acetate, NBR high (61/39), methacrylonitrile, polyethylene terephthalate (PET), ethylene terephthalate, epoxy resin, acetylcellulose, epoxy resin, phenol resin, dimethylformamide, vinylidene chloride, poly-vinylidene chloride, acrylonitrile, polyvinyl alcohol, vinyl alcohol, poly(hexamethylene adipamide), polyamide (Nylon 66), nitrocellulose (11.8% N), polyacrylonitrile, cellulose, formamide, and acetylcellulose (56% Ac group).

Note that, in the present specification, the "SP value" employed is the value of solubility parameter (unit: cal/cm$^3$) obtained by what is called the Fedors method (for example, the method described in page 147 to page 154 of "Polym. Eng. Sci. Vol. 14, No. 2") (note that as the SP value, it is possible to employ the value described in page VII519 to page VII559 of a book "Polymer Handbook Third Edition" published in 1999). Note that reference to, for example, page 147 to page 154 of "Polym. Eng. Sci. Vol. 14, No. 2 makes it possible to obtain the value of the "cohesive energy for atoms or groups of atoms at 25° C." and the value of the "molar volume for atoms or groups of atoms at 25° C."

Here, regarding the "SP value of the elastomer component," if the elastomer component is a mixture of multiple types of polymers, the "SP value of the elastomer component" employed is the value obtained as follows: The SP values of the polymers contained in the elastomer component are multiplied by the mass ratios of the polymers contained in the elastomer component (content ratio relative to the total amount ([mass of the polymer for which the ratio is to be obtained]/[total amount of the elastomer component])). Then, the obtained values are added up (sum of the obtained values is calculated). For example, consider the case where the elastomer component is a mixture of a polymer (A1) and a polymer (A2). First, the value calculated by multiplying the SP value of the polymer (A1) by the mass ratio of the polymer (A1) and the value calculated by multiplying the SP value of the polymer (A2) by the mass ratio of the polymer (A2) are obtained as a value which is calculated by multiplying the SP values of the polymers contained in the elastomer component by the mass ratios of the polymers contained in the elastomer component. After that, the obtained values are added up (sum of the obtained values is calculated) to obtain the SP value of the elastomer component. To be more specific, it is possible to obtain the SP value of the elastomer component by calculating the following calculation formula:

$$[SP\ value(E)] = [SP(A1) \times \{W(A1)/(W(A1)+W(A2))\}] + [SP(A2) \times \{W(A2)/(W(A1)+W(A2))\}]$$

(in the above calculation formula, the SP value (E) indicates the SP value of the elastomer component, SP(A1) indicates the SP value of the polymer (A1), SP(A2) indicates the SP value of the polymer (A2), W(A1) indicates the mass of the polymer (A1), and W(A2) indicates the mass of the polymer (A2)). In this manner, it is possible to obtain the SP value for the case where the elastomer component is a mixture by multiplying the SP values of the components by the mass ratios of the corresponding components (note that in the case of only one component, the mass ratio is 1), followed by addition thereof.

Here, consider the case where the later-described method for producing a thermoplastic elastomer composition of the present invention is used to prepare the elastomer component in the composition (elastomeric polymer (A) and/or (B)). In this case, it is possible to regard the SP value of the "elastomeric polymer (D) having the cyclic acid anhydride group in the side chain", which is a component to be used in the production, directly as the SP value of the elastomer component. Consider the case where the method for producing a thermoplastic elastomer composition of the present invention is used to prepare the elastomer component (elastomeric polymer (A) and/or (B)). In this case, the elastomeric polymer (D) having the cyclic acid anhydride group in the side chain is used to form a side chain. However, the amount used of the raw material compound (cross-linking agent) utilized in the reaction is in a content ratio of 0.1 to 10 parts by mass relative to 100 parts by mass of the elastomeric polymer (D) having the cyclic acid anhydride group in the side chain, which means that, basically, only a very small amount of raw material compound (reaction agent: cross-linking agent) is used for the reaction to form a cross-linking structure. For this reason, the polarity does not change to a large extent in the polymer obtained after the reaction, and therefore it is unthinkable that the SP value of the polymer might change before and after the reaction. Thus, it can be regarded that the SP value of the elastomer component is a value almost the same as the SP value of the elastomeric polymer (D) before the formation of the side chain. Therefore, in the present patent, the SP value of the elastomer component employed is the SP value of the "elastomeric polymer (D) having the cyclic acid anhydride group in the side chain" before the cross-linking. Note that if the elastomeric polymer (D) is a mixture of multiple types of polymers, the above-described "SP value of the elastomeric polymer (D) having the cyclic acid anhydride group in the side chain" employed is the value obtained as follows: The SP values of the polymers contained as the polymer (D) are multiplied by the mass ratios of the polymers contained as the polymer (D) (content ratio relative to the total amount). Then, the obtained values are added up (sum of the obtained values is calculated). For example, if the elastomeric polymer (D) having the cyclic acid anhydride group in the side chain is a mixture of a polymer (D1) and a polymer (D2), the value employed is obtained by calculating the following calculation formula:

$$[SP\ value(D)] = SP(D1) \times \{W(D1)/(W(D1)+W(D2))\} + SP(D2) \times \{W(D2)/(W(D1)+W(D2))\}$$

(in the above calculation formula, SP value (D) indicates the SP value of the elastomeric polymer (D) having the cyclic acid anhydride group in the side chain, SP(D1) indicates the SP value of the polymer (D1), SP(D2) indicates the SP value of the polymer (D2), W(D1) indicates the mass of the polymer (D1), and W(D2) indicates the mass of the polymer (D2)). In this manner, it is possible to obtain the SP value even for the case where the elastomeric polymer (D) is a mixture of multiple types of polymers by multiplying the SP values of the components by the mass ratios of the corresponding components, followed by addition thereof. Moreover, also in the case where the polymer (Z) is a mixture, similarly, the "SP value of the polymer (Z)" employed is the value obtained as follows: The SP values of the polymers contained as the polymer (Z) are multiplied by the mass ratios of the polymers contained as the polymer (Z) (content ratio relative to the total amount). Then, the obtained values are added up (sum of the obtained values is calculated).

In addition, the polymer (Z) according to the present invention has an SP value greater by 0.5 or more (more preferably 1.0 to 8.0 and further preferably 2.0 to 7.0) than the SP value of the elastomer component. When the difference in SP value ([SP value of the polymer (Z)]−[SP value of the polymer contained as the elastomer component]) is less than 0.5, the increase in polarity is too low to sufficiently improve the oil resistance. In addition, a difference in SP value exceeding the upper limit tends to be result in poor mixture because of too large a difference in polarity.

As described above, in the present invention, depending on the type of polymer contained as the elastomer component, a polymer may be selected as appropriate for use from polymers having an value or 9.0 or more such that the SP value of the polymer (Z) satisfies the conditions (the condition that the SP value is 9.0 or more and the condition that the SP value is a value greater by 0.5 or more than the SP value of the elastomer component). Use of a polymer (Z) satisfying these conditions makes it possible to sufficiently improve the oil resistance of the composition.

In addition, the polymer (Z) according to the present invention preferably has a reactive functional group for the elastomer component. The "reactive functional group" mentioned here refers to one capable of chemically bonding to the main chain or the side chain of the elastomer component or one capable of improving compatibility by interaction such as hydrogen bond. The reactive functional group is preferably at least one of a hydroxyl group, an amino group, an imino group, an ester group, an acid anhydride group, and a carboxy group and more preferably at least one of a hydroxyl group, an amino group, an imino group, an acid anhydride group, and a carboxy group. When a polymer (Z) having the reactive functional group is used, the polymer does not separate to a large extent even in the case of using a polymer (Z) and an elastomer component with a difference in SP value being, for example, 5.0 or more. This allows the compatibility to stay at a sufficiently high level and allows the components to disperse and mix uniformly. Thus, it is possible to obtain a higher level of oil resistance. Examples of polymers having the reactive functional group and an SP value of 9.0 or more include polyamides having an amine at a terminal (for example, nylon (Polyamide 12 (PA12) and the like)), which are polymers having a glass-transition point of over 25° C. These polymers allow the compatibility to stay stably at a sufficiently high level by forming a hydrogen bond using the amine (terminal amine) and e.g. the hydroxyl group or the carbonyl group contained in the side chain of the elastomer component. Moreover, in the case of using a monomer having an acid anhydride group in the production of the elastomer component, it is possible to react the acid anhydride group with the terminal amine of the polyimide in advance. This sufficiently suppresses the creation of a macroscopic phase separation, making it possible to allow the compatibility to stay more stably at a sufficiently high level and to disperse and mix the components sufficiently uniformly even in the case of polymers having significantly different SP values. As described above, it is possible to preferably use a polymer having a glass-transition point of over 25° C. and having at least one reactive functional group of a hydroxyl group, an amino group, an imino group, an ester group, an acid anhydride group, and a carboxy group from the viewpoint that it is possible to allow the polymer (Z) to stay more stably at a sufficiently high level of compatibility.

(Composition)

The thermoplastic elastomer composition of the present invention contains the elastomer component, the organically modified clay, and the polymer (Z).

Note that although it is not exactly clear why the thermoplastic elastomer composition of the present invention can have sufficiently high levels of tensile strength (tensile strength having indices of 100% modulus and tensile strength at break) and excellent oil resistance, the present inventors speculate as follows.

Specifically, first, the elastomer component in the present invention contains an elastomeric polymer containing a side chain having at least a hydrogen-bond cross-linkable moiety (a polymer containing at least one of: the side chain (a); the side chain (a') and the side chain (b); and the side chain (c) in a side chain(s)). When such an elastomeric polymer is used in combination with an organically modified clay, the organically modified clay is efficiently delaminated in the system, so that a clay in the single-layered state is formed. When a clay in the single-layered state is formed in this way, the clay is dispersed in the polymer more uniformly and at a higher level. Then, interactions between the clay dispersed in the system at a high level and hydrogen-bond cross-linkable moieties occur (such as the formation of new hydrogen bonds), so that the elastomer component undergoes plane cross-linking by utilizing the surface of the clay. The formation of the plane cross-linking then makes it possible to suppress the stress concentration at each cross-linking point, so that the elastomer component can express higher tensile strength at break (the tensile strength at the moment at which break occurs) than in the case where the organically modified clay is not contained. Note that use of an organically modified clay as in the present invention makes it possible to obtain a higher level of tensile stress (tensile strength) compared to an ordinary clay (one organically unmodified) because it is possible to increase the ratio of clay present in the single-layered state and to sufficiently disperse the single-layered clay, making it possible to form plane cross-linking as described above at a larger number of points. In addition, the present invention contains a polymer (Z) satisfying the conditions for the SP value as described above. Increase in polarity thanks to such a polymer (Z) makes it possible to reduce the compatibility with low-polarity oils and to sufficiently improve the oil resistance. The present inventors speculate that the present invention described above makes it possible to both improve the tensile strength thanks to the combination of the elastomer component and the organically modified clay and improve the oil resistance thanks to the polymer (Z).

In contrast, in the case of using, as the elastomer component, only a different elastomer component instead of using at least one of the elastomeric polymers (A) and (B) having a hydrogen-bond cross-linkable moiety in a side chain, it is not possible to obtain the effects as described above even when the different elastomer component is used in combination with an organically modified clay. In this respect, the present inventors speculate as follows. Specifically, first, ordinary thermoplastic elastomers can be roughly classified into two types: a type utilizing pseudo-cross-linking based on physical interaction between molecular chains of a polymer (a type in which weak bonds are physically formed by interactions based on intermolecular force of a polymer and the like), and a type in which a rubber is dispersed in a matrix of a thermoplastic resin. Representative ones of thermoplastic elastomers of the type utilizing the pseudo-cross-linking include polymers each containing a soft segment and a hard segment, such as a block polymer and a urethane elastomer. Here, if the thermoplastic elastomer of the type utilizing the pseudo-cross-linking is only blended with a filler such as a clay without introducing a polymer having the aforementioned side chain, the clay hinders interactions at pseudo-cross-linking points (physical interactions between molecular chains of the polymer), which rather results in a decrease in the mechanical strength of the polymer, making the resultant composition unsuitable for practical use as a rubber product. In this way, when a conventional thermoplastic elastomer only containing a thermoplastic elastomer of the type utilizing pseudo-cross-linking is used just in combination with an organically modified clay, the formation of the pseudo-cross-linking is rather hindered in the composition, and the mechanical strength (such as tensile stress) of the composition decreases. Meanwhile, in the case of a thermoplastic elastomer of the type in which a rubber is dispersed in a matrix of a thermoplastic resin, a filler such as a clay is introduced only in the matrix phase, as is apparent from the constitution of the thermoplastic elastomer. In this connection, in the case of a matrix in a thermoplastic resin not having the aforementioned side chain, the matrix does not form interaction with the clay. For this reason, simple introduction of a filler results in a state in which the filler is introduced at high concentration in some portions, while the filler is not introduced at all in other some portions. As a result, a difference in the concentration of the filler causes a difference in the hardness inside the elastomer to decrease the mechanical strength and the like. For this reason, in the case where a polymer having no hydrogen-bond cross-linkable moiety in a side chain is used in a thermoplastic elastomer of the type in which a rubber is dispersed in the matrix of a thermoplastic resin, even when a clay is simply introduced into the thermoplastic elastomer, the clay cannot be dispersed sufficiently and the mechanical strength (such as tensile strength at break) of the composition decreases. In view of these points, the present inventors speculate that when none of the elastomeric polymers (A) and (B) is used in a base elastomer component, the obtained composition cannot always have properties sufficient as an elastomer (rubber), because the elastomer component cannot form interactions with the organically modified clay in the first place and even worse the presence of the clay rather decreases the mechanical strength.

In addition, in the present invention, the amount of the organically modified clay contained is 20 parts by mass or less relative to 100 parts by mass of the elastomer component. Even such a content ratio (sufficiently low ratio) can produce sufficiently high effects in the tensile stress (tensile strength). In this regard, the present inventors speculate that the organically modified clay is dispersed in the composition sufficiently uniformly as described above and thus can form the plane cross-linking sufficiently and that the clay more efficiently changes into the single-layered state thanks to organic modification, making it possible to more efficiently increase the ratio of the clay dispersed as single layers. This makes it possible for a larger number of plane cross-linkages to be formed in the elastomer. Therefore, even a trace amount of the clay contained of 20 parts by mass or less enables the composition to exhibit a sufficiently high level of tensile stress.

Note that, the present inventors speculate that, when an elastomer component containing a covalent-bond cross-linking moiety in a side chain is contained in the present invention (for example, when the elastomeric polymer (B) is contained), the side chains containing the covalent-bond cross-linking moieties make it possible to express a higher level of resistance to compression set. Moreover, when the hydrogen-bond cross-linkable moiety and the covalent-bond cross-linking moiety are present in the elastomer component (such as cases where: the elastomeric polymer (B) is contained, a mixture of the elastomeric polymer (B) with another elastomeric polymer is contained; a mixture of the elastomeric polymer (A) and the elastomeric polymer (B) is contained; and a mixture of the elastomeric polymer (A) with an elastomeric polymer containing the side chain (b) other than the elastomeric polymer (B) is used), the presence of the hydrogen-bond cross-linkable moiety and the covalent-bond cross-linking moiety enables the obtained composition to simultaneously express a higher level of mechanical strength attributed to covalent bonds during use and a higher level of flowability (formability) attributed to cleavage of hydrogen bonds during heating. The present inventors speculate that, by taking advantage of the above, properties required depending on an application can be exhibited, as appropriate, by changing, as appropriate, the constitution according to the type of a side chain. Note that, the above-described elastomeric polymer having a side chain (b) other than the elastomeric polymer (B) can be obtained by a method in which an elastomeric polymer having a functional group (for example, cyclic acid anhydride group) in a side chain is used, and the elastomeric polymer is reacted with a compound that forms a covalent-bond cross-linking moiety upon a reaction with the functional group (compound that forms a covalent bond) to produce the elastomeric polymer having the side chain (b). Note that, also in this case, the above-described "compound that forms a covalent-bond cross-linking moiety (compound that forms a covalent bond)" can be used as the compound that forms a covalent-bond cross-linking moiety (compound that forms a covalent bond).

Hereinabove, the reasons that the foregoing effects of the present invention can be obtained by the thermoplastic elastomer composition of the present invention and the other things have been discussed. Hereinafter, preferred embodiments of the thermoplastic elastomer composition of the present invention (such as a preferable condition of the content ratio of each component) will be further explained.

The thermoplastic elastomer composition of the present invention comprises the elastomer component, the organically modified clay, and the polymer (Z), and the amount of the organically modified clay contained is 20 parts by mass or less relative to 100 parts by mass of the elastomer component. If the amount of the organically modified clay contained exceeds the upper limit, the heat resistance and the tensile strength at break decrease. The amount of the organically modified clay contained in the thermoplastic elastomer composition is more preferably 0.1 to 10 parts by mass, further preferably 0.5 to 5 parts by mass, and particularly preferably 1 to 3 parts by mass relative to 100 parts by mass of the elastomer component. If the amount of the organically modified clay contained is less than the lower limit, the amount of the organically modified clay contained is so small that sufficient effects tend not to be obtained. Meanwhile, if the amount of the organically modified clay contained exceeds the upper limit, the cross-linking is so strong that the elongation and the strength tend to decrease rather, making it difficult to use the thermoplastic elastomer composition for various applications (deteriorating the practicability).

In addition, the organically modified clay is preferably present in the composition as the clay in a single-layer morphology (single-layered clay). The presence of such a clay in the single-layered morphology can be confirmed by observing the surface of the composition under a transmission electron microscope (TEM).

Moreover, regarding the thermoplastic elastomer composition of the present invention, when randomly selected three or more measurement points in a size of 5.63 $\mu m^2$ on the surface of the thermoplastic elastomer composition are observed under a transmission electron microscope (TEM), 50% or more (more preferably 70% or more, further preferably 80 to 100%, and particularly preferably 85 to 100%) of all the organically modified clay based on the number is preferably present as the single-layered clay in all the measurement points. If the ratio of the single-layered clay present is less than the lower limit, the elongation at break and the strength at break tend to be lowered. Note that the ratio (proportion) of such a single-layered clay present can be determined as follows. Specifically, a transmission electron microscope (for example, one manufactured by JEOL Ltd. under the trade name of "JEM-2010") is used; 10 g of the thermoplastic elastomer composition is prepared as a sample; three or more measurement points in a size of 5.63 $\mu m^2$ on the surface of the thermoplastic elastomer composition are each observed; the number of the single-layered clay and the number of the multi-layered organically modified clay are determined in each TEM image obtained by such observation; the ratio (proportion) of the single-layered clay present relative to all the clay is calculated for each of the measurement points (each of the TEM images) based on these numbers to determine the above-described ratio. Note that, in the case of a multi-layered structure before taking the single-layer morphology, the interlayer distances of ordinary organically modified clays are about 20 to 40 angstrom (2 to 4 nm) (note that the interlayer distance of montmorillonite before organic modification is usually about 9.8 angstrom). In addition, when an ordinary organically modified clay is dispersed in an organic solvent and single-layers are formed, the interlayer distance thereof is 50 angstrom (>5 nm) or more. Hence, layers may be determined as single-layers based on the fact that the interlayer distance of layers observed in a TEM image is wider than such an interlayer distance. As described above, layers may be determined to be in a single-layer state, for example, based on the fact that the intervals of the layers are 5 nm or more, and, in some cases, layers may be determined to be in a single-layer state based on the fact that the layers have intervals of several tens of nanometers or more, although it depends on the type of the organically modified clay.

Note that, in a case where the single-layered clay is contained at the above-described proportion (the abundance ratio) in the composition, the clay is contained more dispersedly than in a case where a multi-layered organically modified clay is directly dispersed (this is because the multi-layered organically modified clay is decomposed to form a single-layered clay), and hence the clay can be dispersed in the composition with a higher dispersibility. Thus, if the single-layered organically modified clay is contained at the above-described proportion in the composition, the higher dispersibility than in the case where the multi-layered organically modified clay is present in the composition can be obtained, so that the heat resistance and the tensile strength at break can be enhanced to higher levels. For this reason, it is more preferable the clay in a single-layered state be contained at the above-described proportion, and this causes the organically modified clay to be more dispersed, making it possible to more efficiently improve the heat resistance and the tensile strength at break. In addition, a method for causing the single-layered clay to be contained at the above-described proportion (the abundance ratio) is not particularly limited, and the single-layered clay can be contained at the above-described proportion more efficiently when a thermoplastic elastomer composition is produced by employing the method for producing a thermoplastic elastomer composition of the present invention to be described later.

In addition, the thermoplastic elastomer composition of the present invention is preferably such that when randomly selected three or more measurement points in a size of 5.63 $\mu m^2$ on the surface of the thermoplastic elastomer composition are observed under a transmission electron microscope, 1 to 100 (more preferably 3 to 80, and further preferably 5 to 50) single-layered clays be dispersed per $\mu m^2$ in all the measurement points. If the number of single layers of the clay is less than the lower limit, the amount of the clay is so small that a sufficient effect tends not to be obtained. Note that the number of the single layers of the clay can be determined by obtaining a TEM image by the same method as that for measuring the ratio of presence (proportion) of the single-layered clay.

In the thermoplastic elastomer composition of the present invention, the amount of the polymer (Z) contained (content ratio) is preferably 10 to 700 parts by mass or less, more preferably 30 to 600 parts by mass, further preferably 50 to 500 parts by mass, particularly preferably 80 to 400 parts by mass, and most preferably 100 to 300 parts by mass relative to 100 parts by mass of the elastomer component. If the amount of the polymer (Z) contained is less than the lower limit, it tends to be difficult to sufficiently improve the oil resistance. Meanwhile, if the amount of the polymer (Z) contained exceeds the upper limit, the compression set tends to increase.

Moreover, in the thermoplastic elastomer composition of the present invention, the amount of the polymer (Z) contained is preferably 5 to 60% by mass, more preferably 8 to 50% by mass, and further preferably 10 to 40% by mass relative to the total amount of the thermoplastic elastomer composition. If the amount of the polymer (Z) contained is less than the lower limit, it tends to be difficult to sufficiently improve the oil resistance. Meanwhile, if the amount of the polymer (Z) contained exceeds the upper limit, the compression set tends to increase.

Note that, in the thermoplastic elastomer composition of the present invention, properties depending on an application can be also imparted, as appropriate, according to a type of an elastomer component used. For example, in a thermoplastic elastomer composition containing the elastomeric polymer (A) as the elastomer component, the properties stemming from the side chain (a) can be imparted to the composition, and therefore the elongation at break, tensile strength at break, and flowability, in particular, can be improved. Meanwhile, in a thermoplastic elastomer composition containing the elastomeric polymer (B) as the elastomer component, the properties stemming from the covalent-bond cross-linking moiety in the side chain can be imparted to the composition, and therefore the resistance to compression set, in particular, can be improved. Note that, in a thermoplastic elastomer composition containing the elastomeric polymer (B) as the elastomer component, not only the properties stemming from the covalent-bond cross-linking moiety but also the properties stemming from the hydrogen-bond cross-linkable moiety (the hydrogen-bond cross-linkable moiety described for the side chain (a')) can be imparted to the composition, and therefore it is also possible to more improve the resistance to compression set while maintaining the flowability (formability). Thus, it is possible to even more efficiently exhibit properties desired for an application by changing the type of the side chain, the type of the polymer (B), and so on, as appropriate.

In addition, regarding the thermoplastic elastomer composition of the present invention, the thermoplastic elastomer composition containing the elastomeric polymer (A) as an elastomer component and the thermoplastic elastomer composition containing the elastomeric polymer (B) as an elastomer component may be produced separately, and then mixed with each other to prepare a thermoplastic elastomer composition containing the elastomeric polymers (A) and (B) as elastomer components. In addition, in the present invention, it is only necessary that at least the elastomeric polymers (A) and (B) be contained as the elastomer component. From the viewpoint of utilizing properties of covalent-bond cross-linking moieties more efficiently by causing a covalent-bond cross-linking moiety to be present in the composition, an additional elastomeric polymer having a side chain (b) other than the elastomeric polymer (B) may be mixed for use. For example, when an additional elastomeric polymer having a side chain (b) other than the elastomeric polymer (B) is used in combination in a case where the elastomeric polymer (A) is used as an elastomer component, it is also possible to provide, owing to the side chains contained in the composition, substantially the same properties as those of a thermoplastic elastomer composition utilizing the elastomeric polymer (B) containing a hydrogen-bond cross-linkable moiety and a covalent-bond cross-linking moiety in a side chain. In addition, when the thermoplastic elastomer composition containing the elastomeric polymers (A) and (B) as elastomer components is produced, or when a thermoplastic elastomer composition containing the elastomeric polymer (A) and the additional elastomeric polymer having a side chain (b) other than the elastomeric polymer (B) is produced, desired properties can also be exhibited, as appropriate, by changing, as appropriate, the ratio of these components (for example, the components including the elastomeric polymer (A) and the elastomeric polymer (B)).

In addition, when the thermoplastic elastomer composition of the present invention contains the elastomeric polymers (A) and (B) as elastomer components, the content ratio of the elastomeric polymer (A) to the elastomeric polymer (B) is preferably 1:9 to 9:1, and more preferably 2:8 to 8:2 in terms of the mass ratio ([polymer (A)]:[polymer (B)]). If the content ratio of the polymer (A) is less than the lower limit, the flowability (formability) and the mechanical strength tend to be insufficient. Meanwhile, if the content ratio of the polymer (A) exceeds the upper limit, the resistance to compression set tends to decrease.

Moreover, when the thermoplastic elastomer composition of the present invention contains the elastomeric polymer (A) and further contains, as an additional polymer, an additional elastomeric polymer having a side chain (b) other than the elastomeric polymer (B) (hereinafter, sometimes referred to as "elastomeric polymer (C)") as elastomer components, the content ratio of the elastomeric polymer (A) to the elastomeric polymer (C) is preferably 1:9 to 9:1, and more preferably 2:8 to 8:2 in terms of mass ratio ([elastomeric polymer (A)]:[elastomeric polymer (C)]). If the content ratio of the polymer (A) is less than the lower limit, the flowability (formability) and the mechanical strength tend to be insufficient. Meanwhile, if the content ratio of the polymer (A) exceeds the upper limit, the resistance to compression set tends to decrease.

In addition, regarding the thermoplastic elastomer composition of the present invention, when both the side chain (a') and the side chain (b) are present in the composition, the total amount of the side chain (a') and the total amount of the side chain (b) are preferably 1:9 to 9:1, and more preferably 2:8 to 8:2 based on the mass ratio. If the total amount of the side chain (a') is less than the lower limit, the flowability (formability) and the mechanical strength tend to be insufficient. Meanwhile, if the total amount of the side chain (a') exceeds the upper limit, the resistance to compression set tends to decrease. Note that such a side chain (a') is a concept including the side chain (a). For this reason, also when only the side chain (a) is contained as the side chain (a'), it is preferable that both the side chain (a) and the side chain (b) be present in the composition at the above-described mass ratio.

Moreover, unless the object of the present invention is not impaired, the thermoplastic elastomer composition of the present invention may further contain, as needed, various kinds of additives or the like, such as polymer components other than the elastomer component and the polymer (Z) (hereinafter simply referred to as an "additional polymer"), paraffin oils, reinforcing agents (bulking agents), hydrogen bond reinforcing agents (bulking agents), bulking agents to which amino groups are introduced (hereinafter, simply referred to as "amino group-introduced bulking agent"), amino group-containing compounds other than the amino group-introduced bulking agents, compounds containing metal elements (hereinafter, simply referred to as "metal salts"), maleic anhydride-modified polymers, anti-aging agents, antioxidants, pigments (dyes), plasticizers other than the paraffin oil, thixotropy-imparting agents, ultraviolet absorbers, flame retardants, solvents, surfactants (including leveling agents), dispersing agents, dehydrating agents, corrosion inhibitors, tackiness agents, antistats, and fillers. These additives or the like are not particularly limited, and commonly used ones (publicly known ones) can be used as appropriate. For example, the additional polymers described above, paraffin oils, reinforcing agents, anti-aging agents, antioxidants, pigments (dyes), and plasticizers and the like described below can be used as appropriate.

The above-described additional polymers preferably usable include the elastomeric polymer (B) and an elastomeric polymer having a side chain (b) other than the polymer (Z); an α-olefin-based resin having no chemical-bond cross-linking moiety other than the polymer (Z); and a styrene block copolymer having no chemical-bond cross-linking moiety other than the polymer (Z). Note that the "chemical-bond cross-linking moiety" mentioned here means a moiety in which a cross linkage is formed by a chemical bond such as a hydrogen bond and a covalent bond. Accordingly, "having no chemical-bond cross-linking moiety" mentioned in the present invention means a state where a resin does not have any cross linkage formed by a chemical bond (such as the hydrogen bond and the covalent bond).

As the α-olefin-based resin having no chemical-bond cross-linking moiety other than the polymer (Z) (hereinafter simply referred to as the "α-olefin-based resin having no chemical-bond cross-linking moiety"), preferably used is a resin that neither contains any functional group (for example, a hydroxy group, a carbonyl group, a carboxyl group, a thiol group, an amide group, or an amino group) capable of forming a cross-linking point by chemical bonding, nor contains a bonding moiety in which polymer chains are directly cross-linked (such as a cross-linking moiety by a covalent bond). Moreover, such an α-olefin-based resin having no chemical-bond cross-linking moiety is a polymer that does not have at least any of the aforementioned side chain (a), side chain (a'), side chain (b), side chain (c), and the like.

Then, the "α-olefin-based resin" mentioned herein is an α-olefin homopolymer or an α-olefin copolymer. The "α-olefin" mentioned herein is an alkene containing a carbon-carbon double bond at the α position (alkene containing a carbon-carbon double bond at the terminal: note that such an alkene may be in the form of a linear chain or a branched chain, and preferably has 2 to 20 carbon atoms (more preferably 2 to 10 carbon atoms). Examples thereof include ethylene, propylene, 1-butene, 1-pentene, 1-hexene, 1-heptene, 1-octene, 1-nonene, 1-decene, and the like.

The α-olefin-based resin having no chemical-bond cross-linking moiety may be any polymer of α-olefin having an SP value not satisfying the conditions as the polymer (Z) (ploy-α-olefin: which may be a homopolymer or a copolymer), which is not limited to a particular one. Examples thereof include polyethylene, polypropylene, ethylene-propylene copolymer, ethylene-butene copolymer, propylene-ethylene-butene copolymer, and the like. Among the α-olefin-based resins having no chemical-bond cross-linking moiety, polypropylene, polyethylene, and ethylene-propylene copolymer are preferable from the viewpoint of compatibility with the base elastomer. Incidentally, one of these α-olefin-based resins having no chemical-bond cross-linking moiety may be used alone or two or more thereof may be used in combination.

In the α-olefin-based resin having no chemical-bond cross-linking moiety, the degree of crystallinity is preferably 10% or more, more preferably 10 to 80%, and further preferably 10 to 75%. If the degree of crystallinity is less than the lower limit, the resinous properties are so weak that it tends to be difficult to enhance the levels of mechanical properties and flowability. Meanwhile, if the degree of crystallinity exceeds the upper limit, the resinous properties are so strong that it tends to be difficult to exert the mechanical properties at higher levels in a well-balanced manner. Here, the degree of crystallinity can be obtained in such a way that diffraction peaks are measured by using an X-ray diffraction instrument (for example, one manufactured by Rigaku Corporation under the trade name "MiniFlex 300") as a measurement instrument and an integral ratio between the scattering peaks derived from crystalline and amorphous structures is calculated.

In addition, in the α-olefin-based resin having no chemical-bond cross-linking moiety, the melt flow rate (MFR) at 190° C. under a load of 2.16 kg, which is measured according to JIS K6922-2 (published in 2010), is preferably 40 g/10 min or more. If the melt flow rate (MFR) is less than the lower limit, the α-olefin-based resin tends to have difficulty in improving the flowability even when blended in the composition. Here, the melt flow rate (MFR) is a value measured according to the B method described in JIS K6922-2 (published in 2010) and can be obtained by using, as a melt flow rate measurement instrument, an instrument manufactured by Toyo Seiki Seisaku-sho, Ltd. under the trade name "Melt Indexer G-01". Specifically, 3 g of the α-olefin-based resin is added to the furnace of the instrument, is heated to a temperature of 190° C., and then is left for 5 minutes at 190° C. Thereafter, under the conditions of the temperature kept at 190° C. and a load of 2.16 kg, a mass (g) of the composition is measured, as the melt flow rate, which flows out for 10 minutes from an opening of the tubular orifice member having a diameter of 1 mm and a length of 8 mm, and connected to a lower portion of the furnace (the resin is left for 5 minutes at temperature of 190° C. in the furnace, and then the measurement of the mass of the elastomer flowing out is started after the start of the load application).

Moreover, the weight average molecular weight (Mw) of the α-olefin-based resin having no chemical-bond cross-linking moiety is preferably 10,000 to 2,000,000, both inclusive, more preferably 30,000 to 1,500,000, both inclusive, and further preferably 50,000 to 1,250,000, both inclusive. If the weight average molecular weight is less than the lower limit, the mechanical strength tends to decrease. Meanwhile, if the weight average molecular weight exceeds the upper limit, the compatibility with the elastomer component decreases so much that phase separation tends to easily occur.

In addition, the number average molecular weight (Mn) of the α-olefin-based resin having no chemical-bond cross-linking moiety is preferably 10,000 to 2,000,000, both inclusive, more preferably 30,000 to 1,500,000, both inclusive, and further preferably 50,000 to 1,250,000, both inclusive. If the number average molecular weight is less than the lower limit, the mechanical strength tends to decrease. Meanwhile, if the number average molecular weight exceeds the upper limit, the compatibility with the elastomer component tends to decrease so much that phase separation tends to easily occur.

In addition, the polydispersity index (Mw/Mn) of the α-olefin-based resin having no chemical-bond cross-linking moiety is preferably 100 or less, and more preferably 1.5 to 50. If the value of the polydispersity index (Mw/Mn) is less than the lower limit, the flowability tends to decrease. Meanwhile, if the value exceeds the upper limit, the compatibility with the elastomer component tends to decrease.

The aforementioned weight average molecular weight (Mw), number average molecular weight (Mn) and polydispersity index (Mw/Mn) of the α-olefin-based resin can be determined by what is termed gel permeation chromatography (GPC). Then, "Prominence GPC system" manufactured by Shimadzu Corporation can be used for a specific instrument and conditions for measuring such molecular weights and so on.

The glass-transition point of the α-olefin-based resin having no chemical-bond cross-linking moiety is preferably −150 to 5° C., and more preferably −125 to 0° C. If the glass transition point is less than the lower limit, the melting point is so low that the heat resistance tends to decrease. Meanwhile, if the glass transition point exceeds the upper limit, the rubber elasticity after blend into the elastomer component tends to decrease. The "glass transition point" mentioned herein is a glass transition point measured by differential scanning calorimetry (DSC) as described above. In such DSC measurement, it is preferable to set the rate of temperature rise at 10° C./min.

A method for producing the α-olefin-based resin having no chemical-bond cross-linking moiety is not particularly limited, but any known method can be employed as appropriate. As such an α-olefin-based resin, a commercially available product may be used, and examples thereof usable as appropriate include ones manufactured by Mitsui Chemicals, Inc. under the trade name "TAFMER"; manufactured by Japan Polyethylene Corporation under the trade names "NOVATEC HD", "NOVATEC LD", "NOVATEC LL", and "KERNEL"; manufactured by Prime Polymer Co., Ltd. under the trade names "HI-NEX", "NEO-ZEX", "ULTZEX", "Evolue", "Prime Polypro", "POLY FINE", and "MOSTRON L"; and PP manufactured by SunAllomer Ltd.; and the like.

If the thermoplastic elastomer composition of the present invention further contains the α-olefin-based resin having no chemical-bond cross-linking moiety, the amount of the contained α-olefin-based resin having no chemical-bond cross-linking moiety (content ratio) is preferably 800 parts by mass or less, more preferably 5 to 700 parts by mass, further preferably 10 to 600 parts by mass, particularly preferably 25 to 500 parts by mass, and most preferably 50 to 400 parts by mass relative to 100 parts by mass of the elastomer component. If the amount of the contained α-olefin-based resin having no chemical-bond cross-linking moiety is less than the lower limit, the flowability tends to decrease. Meanwhile, if the amount of the α-olefin-based resin contained exceeds the upper limit, the compression set tends to decrease.

Moreover, if the thermoplastic elastomer composition of the present invention further contains the α-olefin-based resin having no chemical-bond cross-linking moiety, the amount of the contained α-olefin-based resin having no chemical-bond cross-linking moiety is preferably 1 to 90% by mass, more preferably 3 to 80% by mass, and further preferably 5 to 70% by mass relative to the total amount of the composition. If the amount of the contained α-olefin-based resin having no chemical-bond cross-linking moiety is less than the lower limit, the flowability tends to decrease. Meanwhile, if the amount of the α-olefin-based resin contained exceeds the upper limit, the compression set tends to decrease.

In addition, as the additional polymer, a styrene block copolymer having no chemical-bond cross-linking moiety other than the polymer (Z) is preferable from the viewpoint that the component does not interfere with the cross-linking reaction of the base elastomer. In this connection, the present inventors speculate as follows. Specifically, such a styrene block copolymer, when used, basically does not interfere with the cross-linking structure of the base elastomeric polymer (the above-mentioned elastomer component) or the cross-linking reaction during production, and thus does not damage the physical properties peculiar to the structure of the base elastomer cross-linked. Hence, it is possible to sufficiently maintain the properties stemming from the elastomer component and to reflect (impart) the excellent mechanical properties stemming from the styrene block copolymer (in particular, the tensile properties, compression set, and so on) to the thermoplastic elastomer composition of the present invention, so that the composition can have the higher levels of properties.

The styrene block copolymer which is a component preferably used in the thermoplastic elastomer composition of the present invention is one having an SP value not satisfying the conditions for the polymer (Z) and having no chemical-bond cross-linking moiety. The expression "having no chemical-bond cross-linking moiety" mentioned herein has the same meaning as that described for the α-olefin-based resin. Accordingly, as the styrene block copolymer having no chemical-bond cross-linking moiety, preferably used is a copolymer that neither contains any functional group (for example, a hydroxy group, a carbonyl group, a carboxyl group, a thiol group, an amide group, or an amino group) capable of forming a cross-linking point by chemical bonding, nor contains a bonding moiety with which polymer chains are directly cross-linked (such as a cross-linking moiety by a covalent bond). Moreover, such a styrene block copolymer having no chemical-bond cross-linking moiety other than the polymer (Z) is a polymer that does not have at least any of the aforementioned side chain (a), side chain (a'), side chain (b), side chain (c), and the like.

Then, the "styrene block copolymer" mentioned herein may be a polymer having a styrene block structure in any moiety. In general, the styrene block copolymer has a styrene block structure. Moieties of the styrene block structures are flocculated to form physically cross-linking points (physically pseudo-cross-linking points) at normal temperature, and the physically pseudo-cross-linking points decompose when heated. Based on these properties, the styrene block copolymer is usable as a thermoplastic substance having rubber-like properties (such as elasticity) at normal temperature.

From the viewpoint that the rubber elasticity and thermoplasticity can be both achieved, preferable copolymers as the styrene block copolymer having no chemical-bond cross-linking moiety other than the polymer (Z) (hereinafter simply referred to as the "styrene block copolymer having no chemical-bond cross-linking moiety" in some cases) include a styrene-isoprene-styrene block copolymer (SIS), a styrene-ethylene-propylene-styrene block copolymer (SEPS), styrene-ethylene-ethylene-propylene-styrene block copolymer (SEEPS), a styrene-butadiene-styrene block copolymer (SBS), a styrene-ethylene-butylene-styrene block copolymer (SEBS), a styrene-isoprene-butadiene-styrene block copolymer (SIBS), and products thereof generated by addition of hydrogen (so-called hydrogenated products). Among them, SEBS and SEEPS are more preferable. One of these styrene block copolymers may be used alone, or two or more thereof may be used in combination.

Then, as the styrene block copolymer having no chemical-bond cross-linking moiety, a styrene block copolymer is preferable in which the styrene content is 20 to 40% by mass (more preferably, 25 to 37% by mass). If the styrene content is less than the lower limit, the thermoplasticity tends to decrease due to a decrease in the styrene block component. Meanwhile, if the styrene content exceeds the upper limit, the rubber elasticity tends to decrease due to a decrease in the olefin component. Here, the styrene content in the styrene block styrene block copolymer can be measured by a method in accordance with the IR method described in JIS K6239 (published in 2007).

Moreover, the weight average molecular weight (Mw) of the styrene block copolymer having no chemical-bond cross-linking moiety is preferably 200,000 to 700,000, both inclusive, more preferably 300,000 to 600,000, both inclusive, and further preferably 350,000 to 550,000, both inclusive. If the weight average molecular weight is less than the lower limit, the heat resistance tends to decrease. Meanwhile, if the weight average molecular weight exceeds the upper limit, the compatibility with the elastomeric polymer tends to decrease.

Further, the number average molecular weight (Mn) of the styrene block copolymer having no chemical-bond cross-linking moiety is preferably 100,000 to 600,000, both inclusive, more preferably 150,000 to 550,000, both inclusive, and further preferably 200,000 to 500,000, both inclusive. If the number average molecular weight is less than the lower limit, the heat resistance tends to decrease. Meanwhile if the number average molecular weight exceeds the upper limit, the compatibility with the elastomeric polymer (the aforementioned elastomer component) tends to decrease.

In addition, the polydispersity index (Mw/Mn) of the styrene block copolymer having no chemical-bond cross-linking moiety is preferably 5 or less, and more preferably 1 to 3. Here, these weight average molecular weight (Mw), number average molecular weight (Mn) and polydispersity index (Mw/Mn) can be determined by what is termed gel permeation chromatography (GPC). Then, "Prominence GPC system" manufactured by Shimadzu Corporation can be used for a specific instrument and conditions for measuring such molecular weights and so on.

Further, the glass-transition point of the styrene block copolymer having no chemical-bond cross-linking moiety is preferably −80 to −40° C., and more preferably −70 to −50. If the glass-transition point is less than the lower limit, the melting point is so low that the heat resistance tends to decrease. Meanwhile if the glass-transition point exceeds the upper limit, the rubber elasticity tends to decrease. Here, the "glass-transition point" mentioned herein is a glass transition point measured by differential scanning calorimetry (DSC) as described above. In such DSC measurement, it is preferable to set the rate of temperature rise at 10° C./min.

A method for producing the styrene block copolymer having no chemical-bond cross-linking moiety is not particularly limited, but any known method can be employed as appropriate. As such a styrene block copolymer, a commercially available product may be used, and it is possible to use, as appropriate, any of copolymers: manufactured by Kraton Corporation under the trade names of "G1633", "G1640", "G1641", "G1642", "G1643", "G1645", "G1650", "G1651", "G1652", "G1654", "G1657", and "G1660"; manufactured by KURARAY CO., LTD. under the trade names of "S4055", "S4077", "S4099", "S8006", "S4044", "S8006", "S4033", "S8004", "S8007", and "S8076"; manufactured by Asahi Kasei Corporation under the trade names of "Tuftec H1041", "Tuftec N504", "Tuftec H1272", "Tuftec M1911", "Tuftec M1913", and "Tuftec MP10"; and manufactured by ARONKASEI CO., LTD. under the trade names of "AR-710", "AR-720", "AR-731", "AR-741", "AR-750", "AR-760", "AR-770", "AR-781", and "AR-791"; and the like, for example.

Then, when the thermoplastic elastomer composition of the present invention further contains the styrene block copolymer having no chemical-bond cross-linking moiety, the amount of the contained styrene block copolymer having no chemical-bond cross-linking moiety (content ratio) is preferably 10 to 400 or less parts by mass, more preferably 15 to 350 parts by mass, further preferably 20 to 300 parts by mass, and particularly preferably 30 to 250 parts by mass relative to 100 parts by mass of the elastomer component. If the amount of the contained styrene block copolymer having no chemical-bond cross-linking moiety is less than the lower limit, the amount of the contained styrene block copolymer having no chemical-bond cross-linking moiety is so small that the sufficient effects tend not to be obtained particularly in the flowability and the processability. Meanwhile, if the amount of the styrene block copolymer contained exceeds the upper limit, the properties peculiar to the base structure of the cross-linked elastomer (the aforementioned properties stemming from the elastomer component) tend to be weak.

Moreover, when the thermoplastic elastomer composition of the present invention further contains the styrene block copolymer having no chemical-bond cross-linking moiety, the amount of the contained styrene block copolymer having no chemical-bond cross-linking moiety is preferably 5 to 60% by mass, more preferably 7 to 45% by mass, and further preferably 10 to 30% by mass relative to the total amount of the thermoplastic elastomer composition. If the amount of the contained styrene block copolymer having no chemical-bond cross-linking moiety is less than the lower limit, the amount of the styrene block copolymer contained is so small that the sufficient effects tend not to be obtained particularly in the flowability and the processability. Meanwhile, if the amount of the styrene block copolymer contained exceeds the upper limit, the properties peculiar to the base structure of the cross-linked elastomer (the aforementioned properties stemming from the elastomer component) tend to be weak.

In the thermoplastic elastomer composition of the present invention, as the additional polymer, it is possible to use as appropriate other types of polymers having an SP value not satisfying the conditions as the polymer (Z) in addition to, for example, the α-olefin-based resin having no chemical-bond cross-linking moiety and the styrene block copolymer having no chemical-bond cross-linking moiety. Examples of other types of polymers include polytetrafluoroethylene (PTFE), polyisobutylene, poly(methyl methacrylate), poly(stearyl methacrylate), poly(butyl methacrylate), poly(propyl methacrylate), fluororubber, silicone rubber (MQ), polypropylene oxide, polydimethylsiloxane, butyl rubber (IIR), polyvinyl chloride, natural rubber (NR), polyisoprene (IR: isoprene rubber), polybutadiene (BR: butadiene rubber), styrene-butadiene rubber (SBR), and polystyrene.

From the viewpoint that the flowability can be more improved without deteriorating the various physical properties, the paraffin oil can preferably be used as an additive component (another component: an additive) further contained in the thermoplastic elastomer composition of the present invention. Note that, in the case of using the paraffin oil in combination with the styrene block polymer described above, it is possible to cause the block polymer to absorb the oil component, so that processability improvement (flowability enhancement) by the oil addition, and enhancement in the mechanical properties by the addition of the styrene-based block polymer can be both achieved at sufficiently high levels. This leads to higher levels of production processability such as extrusion processability and injection moldability while more sufficiently maintaining the mechanical properties and the heat resistance. Moreover, in the case of using the paraffin oil, the thermoplastic elastomer composition tends to achieve excellent extrusion processability such that, when the composition heated is extruded from an orifice (such for example as an orifice having an opening with a diameter of 1 mm), for example, a cord-like composition extruded from the opening of the orifice has a shape (strand shape) sufficiently uniform in thickness and has a surface without any fluff. Such a paraffin oil is not particularly limited, but any known paraffin oil may be used as appropriate.

Then, when such a paraffin oil is measured by correlation ring analysis (n-d-M ring analysis) according to ASTM D3238-85 to obtain a percentage of the number of paraffin's carbon atoms to the total number of carbon atoms (paraffin part: $C_p$), a percentage of the number of naphthene's carbon atoms to the total number of carbon atoms (naphthene part: $C_N$), and a percentage of the number of aromatic carbon atoms to the total number of carbon atoms (aromatic part: $C_A$), it is preferable that the paraffin oil have 60% or more as the percentage ($C_p$) of the number of paraffin's carbon atoms to the total number of carbon atoms.

Moreover, in the paraffin oil, a kinematic viscosity at 40° C. measured according to JIS K 2283 (published in 2000) is preferably 50 mm²/s to 700 mm²/s, more preferably 150 to 600 mm²/s, and further preferably 300 to 500 mm²/s. If the kinematic viscosity (v) is less than the lower limit, oil bleeding tends to occur. Meanwhile, if the kinematic viscosity (v) exceeds the upper limit, sufficient flowability tends not to be imparted. As the kinematic viscosity of the paraffin oil, a value is employed which is measured under a temperature condition of 40° C. according to JIS K 2283 (published in 2000). For example, a value may be employed which is automatically measured under a temperature condition of 40° C. by using a Cannon-Fenske Viscometer (for example, one manufactured by SIBATA SCIENTIFIC TECHNOLOGY LTD. under the trade name "SO series") according to JIS K 2283 (published in 2000).

Further, in the paraffin oil, an aniline point measured by a U-tube method according to JIS K 2256 (published in 2013) is preferably 80° C. to 145° C., more preferably 100 to 145° C., and further preferably 105 to 145° C. As the aniline point of the paraffin oil, a value is employed which is measured by the U-tube method according to JIS K 2256 (published in 2013). For example, a value may be employed which is measured by using, for example, an aniline point tester (for example, one manufactured by Tanaka Scientific Limited. under the trade name "aap-6") according to JIS K 2256 (published in 2013).

Then, as the paraffin oil, any commercially available paraffin oil can be used as appropriate. Examples thereof usable as appropriate include oils manufactured by JX Nippon Oil & Energy (new company name "JXTG Nippon Oil & Energy Corporation") under the trade names of "Super Oil M Series P200", "Super Oil M Series P400", and "Super Oil M Series P500S"; oils manufactured by Idemitsu Kosan Co., Ltd. under the trade names of "Diana Process Oil PW90", "Diana Process Oil PW150", and "Diana Process Oil PW380"; oils manufactured by JAPAN SUN OIL COMPANY, LTD. under the trade names of "SUNPAR series" (110, 115, 120, 130, 150, 2100, 2280, and so on); oils manufactured by Exxon Mobil Corporation under the trade names of "Gargoyle Arctic series (1010, 1022, 1032, 1046, 1068, 1100, and so on)"; and the like.

When the paraffin oil is further contained in the thermoplastic elastomer composition of the present invention, the amount of the paraffin oil contained is preferably 10 to 600 parts by mass, more preferably 50 to 550 parts by mass, further preferably 75 to 500 parts by mass, and particularly preferably 100 to 400 parts by mass relative to 100 parts by mass of the elastomer composition. If the amount of the paraffin oil contained is less than the lower limit, the amount of the paraffin oil contained is so small that effects obtained by adding the paraffin oil (effects of improving the flowability and the processability in particular) do not necessarily tend to be sufficient. Meanwhile, if the amount of the paraffin oil contained exceeds the upper limit, bleeding of the paraffin oil tends to be induced easily.

When the paraffin oil is further contained in the thermoplastic elastomer composition of the present invention, the amount of the paraffin oil contained is preferably 20 to 60% by mass, more preferably 25 to 55% by mass, and further preferably 35 to 55% by mass relative to the total amount of the thermoplastic elastomer composition. If the amount of the paraffin oil contained is less than the lower limit, the amount of the paraffin oil contained is so small that sufficient effects in the flowability and the processability, in particular, tend not to be obtained. Meanwhile, if the amount of the paraffin oil contained exceeds the upper limit, bleeding of the paraffin oil tends to be induced easily.

Moreover, from the viewpoints of improvements in the flow ability and the mechanical properties, it is preferable to contain a combination of the α-olefin-based resin having no chemical-bond cross-linking moiety, the paraffin oil, and the styrene block copolymer having no chemical-bond cross-linking moiety as the thermoplastic elastomer composition of the present invention. In short, the thermoplastic elastomer composition of the present invention more preferably comprises the elastomer component, the organically modified clay, the polymer (Z), the α-olefin-based resin having no chemical-bond cross-linking moiety, the paraffin oil, and the styrene block copolymer having no chemical-bond cross-linking moiety.

Comprising the elastomer component, the organically modified clay, polymer (Z), the α-olefin-based resin, the paraffin oil, and the styrene block copolymer as described above, the thermoplastic elastomer composition tends to be capable of exerting the higher levels of properties such as heat resistance, tensile strength at break, and further resistance to compression set in a well-balanced manner. Although it is not exactly clear why such effects can be achieved, the present inventors speculate as follows. Specifically, first, when the paraffin oil and the styrene block copolymer are used in combination, the paraffin oil is sufficiently uniformly dispersed in the system containing the styrene block copolymer because of sufficiently high compatibility between them. Moreover, since the styrene block copolymer and the α-olefin-based resin have high compatibility therebetween, they are uniformly dispersed in the system. Moreover, in the system containing the styrene block copolymer and the α-olefin-based resin, the elastomer component has high compatibility with both of them. Accordingly, the elastomer component is also sufficiently uniformly dispersed in the composition. Since the elastomer component and the organically modified clay interact with each other to form plane cross-linking as described above, the clay is also present in a state sufficiently dispersed with the dispersion of the elastomer component. Thus, when the elastomer component, the organically modified clay, the α-olefin-based resin, the paraffin oil, and the styrene block copolymer are contained, all the components are contained in the states sufficiently dispersed. For this reason, the state of the elastomer component which strongly influences the properties of the thermoplastic elastomer composition is that the elastomer component is sufficiently dispersed while having interaction with the organically modified clay (forming strong bonds by plane cross-linking), which makes it possible to exert the higher levels of mechanical strength and heat resistance in a well-balanced manner. Further, in such a system, because of the state of interacting with the organically modified clay as described above (state where a strong bond is formed due to plane cross-linking), the elastomer component and the organically modified clay are sufficiently dispersed in the system. Thus, as the elastomer component disperses, the polymer (Z), which strongly influences the oil resistance of the thermoplastic elastomer composition, is also sufficiently dispersed, resulting in a higher level of oil resistance. Furthermore, in such a system, it is also possible to achieve a higher level of flowability (the flowability under heating) thanks to the α-olefin-based resin. Still further, the styrene block copolymer enables adjustment of the mechanical strength depending on the amount of the styrene block copolymer added, and thus enables the thermoplastic elastomer composition to be adjusted to have desired mechanical physical properties. Therefore, the present inventors speculate that in the system containing the elastomer component, the organically modified clay, polymer (Z), the α-olefin-based resin, the paraffin oil, and the styrene block copolymer, it is possible to obtain the effects of exerting the higher levels of properties such as the oil resistance, the tensile strength, and the resistance to compression set in a well-balanced manner.

Meanwhile, examples of the reinforcing agents (bulking agents) which can be further contained in the thermoplastic elastomer composition of the present invention include carbon black, silica, calcium carbonate, and the like. As the silica, wet-process silica is preferably used.

In addition, as the anti-aging agents, for example, hindered phenol-based compounds, aliphatic and aromatic hindered amine-based compounds, and other compounds can be used, as appropriate. In addition, as the antioxidants, for example, butylhydroxytoluene (BHT), butylhydroxyanisole (BHA), and the like can be used, as appropriate. Meanwhile, as the pigments, for example, inorganic pigments such as titanium dioxide, zinc oxide, ultramarine, red iron oxide, lithopone, lead, cadmium, iron, cobalt, aluminum, hydrochloric acid salts, and sulfuric acid salts; organic pigments such as azo pigments and copper phthalocyanine pigments; and the like can be used as appropriate. Meanwhile, as the plasticizers, for example, derivatives of benzoic acid, phthalic acid, trimellitic acid, pyromellitic acid, adipic acid, sebacic acid, fumaric acid, maleic acid, itaconic acid, citric acid, and the like, as well as polyester, polyether, or epoxy-based plasticizers, and the like can be used as appropriate. As the plasticizers (softening agents), plasticizers usable for the thermoplastic elastomer from the viewpoint of further improving the flowability can be used as appropriate, and oils can be used, for example. Note that, as the additives and the like, those listed as examples in Japanese Unexamined Patent Application Publication No. 2006-131663 may also be used, as appropriate.

Note that when the thermoplastic elastomer composition of the present invention contains additional components (for example, the above-described additives or the like) other than the elastomer component, the organically modified clay, the polymer (Z), the α-olefin-based resin having no chemical-bond cross-linking moiety, the paraffin oil, and the styrene block copolymer having no chemical-bond cross-linking moiety, the amounts of the additional components contained are not particularly limited. Regarding each of a polymer and a reinforcing material (bulking agent), the amount is preferably 400 parts by mass or less, and more preferably 20 to 300 parts by mass relative to 100 parts by mass of the elastomer component. If the amount of the additional component contained is less than the lower limit, the effect of the use of the additional component tends not to be expressed sufficiently. Meanwhile, if the amount of the additional component contained exceeds the upper limit, the effect of the elastomer serving as a substrate tends to be less influential, so that physical properties tend to deteriorate, although it depends on the type of the component used.

When the above-described additional components are the other additives (when the above-described additional components are other than the polymer and the reinforcing material (bulking agent)), the amount of each additional component contained is preferably 20 parts by mass or less, and more preferably 0.1 to 10 parts by mass relative to 100 parts by mass of the elastomer component. If the amount of the additional component contained is less than the lower limit, the effect by the use of the additional component tends not to be expressed sufficiently. Meanwhile, if the amount of the additional component contained exceeds the upper limit, the additional component adversely affects the reaction of the elastomer serving as a substrate, so that the physical properties tend to deteriorate rather.

When the thermoplastic elastomer composition of the present invention is heated (for example, heated to 100 to 250° C.), dissociation or the like of hydrogen bonds formed at the hydrogen-bond cross-linkable moieties and other cross-linking structures (such as physical cross-linkages in the case where a styrene block copolymer is contained) occurs, so that the thermoplastic elastomer composition softens to provide flowability. This is presumably because the heating weakens the interaction (interaction mainly by hydrogen bonds) created between side chains intermolecularly or intramolecularly. Note that an elastomer component containing at least a hydrogen-bond cross-linkable moiety in a side chain is contained in the present invention. Owing to the above feature and so on, when the thermoplastic elastomer composition is left after the flowability is provided by the heating, the dissociated hydrogen bonds again form the bonds to harden the thermoplastic elastomer composition. Hence, it is also possible to cause the thermoplastic elastomer composition to express recyclability more efficiently depending on the constitution.

Further, in the thermoplastic elastomer composition of the present invention, the melt flow rate (MFR) measured at 230° C. under a load of 10 kg according to JIS K6922-2 (published in 2010) is preferably 2 g/10 min or more, more preferably 4 g/10 min or more, and more preferably 8 g/10 min or more. If the melt flow rate (MFR) is less than the lower limit, there is a tendency that the sufficient processability cannot be always expressed. Here, the melt flow rate (MFR) is a value measured according to the B method described in JIS K6922-2 (published in 2010) and can be obtained by using, as a melt flow rate measurement instrument, an instrument manufactured by Toyo Seiki Seisakusho, Ltd. under the trade name "Melt Indexer G-01". Specifically, 3 g of the thermoplastic elastomer composition is added to the furnace of the instrument, is heated to a temperature of 230° C., and then is left for 5 minutes at 230° C. Thereafter, under the conditions of the temperature kept at 230° C. and a load of 10 kg, a mass (g) of the elastomer is measured, as the melt flow rate, which flows out for 10 minutes from an opening of the tubular orifice member having a diameter of 1 mm and a length of 8 mm, and connected to a lower portion of the furnace (the composition is left for 5 minutes at temperature of 230° C. in the furnace, and then the measurement of the mass of the elastomer flowing out is started after the start of the load application).

Further, in the thermoplastic elastomer composition of the present invention, a 5% weight loss temperature is preferably 320° C. or above, and more preferably 325° C. or above. If the 5% weight loss temperature is less than the lower limit, the heat resistance tends to be poor. Here, the 5% weight loss temperature can be obtained by: preparing 10 mg of a thermoplastic elastomer composition as a measurement sample; using a thermogravimetric analyzer (TGA) as a measurement instrument to heat the thermoplastic elastomer composition at a rate of temperature rise of 10° C./min; and measuring a temperature at which the weight loss reaches 5% of the initial weight (10 mg).

The thermoplastic elastomer composition of the present invention can be used for, for example, various rubber applications by utilizing the rubber elasticity. The use of the thermoplastic elastomer composition of the present invention as a hot-melt adhesive or an additive contained in a hot-melt adhesive is preferable, because the heat resistance and the recyclability can be improved. The thermoplastic elastomer composition of the present invention can be used preferably for applications such as automotive rubber components, hoses, belts, sheets, antivibration rubbers, rollers, lining, rubber-lined cloth, sealing materials, gloves, fenders, rubbers for medical applications (syringe gaskets, tubes, catheters), gaskets (for home appliances and for architectural applications), asphalt modifiers, hot-melt adhesives, boots, grips, toys, shoes, sandals, keypads, gears, PET bottle cap liners, and the like.

Specific examples of the above-described automotive rubber components include tire portions such as tread, carcass, sidewall, inner-liner, under-tread, and belt portions of tires; radiator grilles, side molding, garnishes (pillar, rear, and cowl top), aero parts (airdams and spoilers), wheel covers, weather strips, cowbelt grilles, air outlet louvers, air scoops, hood bulges, parts of ventilation ports, barrier parts (overfenders, side-seal panels, molding (window, hood, and door belt)), marks in the exterior; parts for interiors and window frames such as weather strips for doors, lights, and wipers, glass runs, and glass run channels; air duct hoses, radiator hoses, and brake hoses; parts for lubricating oil systems such as crankshaft seals, valve stem seals, head cover gaskets, A/T oil cooler hoses, transmission oil seals, P/S hoses, and P/S oil seals; parts for fuel systems such as fuel hoses, emission control hoses, inlet filler hoses, and diaphragms; antivibration parts such as engine mounts and in-tank pump mounts; boots such as CVJ boots and rack and pinion boots; air conditioning parts such as A/C hoses and A/C seals; parts for belts such as timing belts and belts for auxiliaries; sealers such as windshield sealers, vinyl plastisol sealers, anaerobic sealers, body sealers, and spot weld sealers; and the like.

In addition, when the thermoplastic elastomer composition of the present invention is contained as a rubber modifier, for example, an anti-flowing agent in a resin or rubber that undergoes cold flow at room temperature, the flow during extrusion and cold flow can be prevented.

The thermoplastic elastomer composition of the present invention can have a higher level of heat resistance and also exhibit a higher level of tensile property based on tensile strength at break. Note that it is possible to cause the thermoplastic elastomer composition to exhibit properties required depending on an application (for example, properties such as a self-repairing property) as appropriate, by changing the constitution as appropriate. Thus, properties required depending on an application of the thermoplastic elastomer composition can be exhibited as appropriate in a well-balanced manner by changing the constitution as appropriate. Hence, in a case of using a thermoplastic elastomer composition for any of the above-described various applications, it is preferable to use the thermoplastic elastomer composition with the types (constitution) of components in the composition changed as appropriate in consideration of the properties required depending on the application.

Hereinabove, the thermoplastic elastomer composition of the present invention is described. Next, a method for producing a thermoplastic elastomer composition of the present invention is described below, which can be preferably used as a method for producing the above-described thermoplastic elastomer composition of the present invention.

[Method for Producing Thermoplastic Elastomer Composition]

A method for producing a thermoplastic elastomer composition of the present invention comprises:

a first step of obtaining a mixture by mixing together an elastomeric polymer (D) having a cyclic acid anhydride group in a side chain,
an organically modified clay, and
a polymer (Z), an SP value of which is 9.0 or more, and is greater by 0.5 or more than an SP value of the elastomeric polymer (D); and
a second step of adding, to the mixture, at least one raw material compound of a compound (I) that forms a hydrogen-bond cross-linkable moiety upon a reaction with the cyclic acid anhydride group, and a mixed raw material of the compound (I) with a compound (II) that forms a covalent-bond cross-linking moiety upon a reaction with the cyclic acid anhydride group in a ratio of 0.1 to 10 parts by mass relative to 100 parts by mass of the elastomeric polymer (D) having the cyclic acid anhydride group in the side chain, to allow a reaction to proceed between the elastomeric polymer (D) and the raw material compound, thereby obtaining the thermoplastic elastomer composition, wherein
the thermoplastic elastomer composition obtained in the second step is a composition comprising:
  at least one elastomer component selected from the group consisting of elastomeric polymers (A) each of which has a side chain containing a hydrogen-bond cross-linkable moiety having a carbonyl-containing group and/or a nitrogen-containing heterocycle and has a glass-transition point of 25° C. or below, and elastomeric polymers (B) each of which contains a hydrogen-bond cross-linkable moiety and a covalent-bond cross-linking moiety in a side chain and has a glass-transition point of 25° C. or below;
  the organically modified clay, a content ratio of which is 20 parts by mass or less relative to 100 parts by mass of the elastomer component; and
  the polymer (Z) which is a polymer other than the elastomeric polymers (A) and (B), and an SP value of which is 9.0 or more and is greater by 0.5 or more than an SP value of the elastomer component, and
in the first step, the elastomeric polymer (D), the organically modified clay, and the polymer (Z) are mixed by using the organically modified clay at such a ratio that the amount of the organically modified clay contained in the thermoplastic elastomer composition is 20 parts by mass or less relative to 100 parts by mass of the elastomer component. The first step and the second step are described separately below.

(First Step)

The first step is a step of obtaining a mixture by mixing together an elastomeric polymer (D) having a cyclic acid anhydride group in a side chain, the organically modified clay, and the polymer (Z).

Here, the "elastomeric polymer (D) having a cyclic acid anhydride group in a side chain" refers to an elastomeric polymer in which a cyclic acid anhydride group is chemically stably bonded (covalently bonded) to an atom forming the main chain of the polymer. For example, it is preferable to use a product obtained by a reaction of a polymer that can form a main chain portion of the elastomeric polymer (A) or (B) with a compound capable of introducing a cyclic acid anhydride group.

Note that the polymer that can form a main chain portion is not particularly limited, as long as the polymer is generally a natural polymer or synthetic polymer having a glass-transition point of room temperature (25° C.) or lower (as long as the polymer is a so-called elastomer).

Examples of the polymers that can form the main chain portions of the elastomeric polymers (A) and (B) include diene-based rubbers such as natural rubber (NR), isoprene rubber (IR), butadiene rubber (BR), 1,2-butadiene rubber, styrene-butadiene rubber (SBR), acrylonitrile-butadiene rubber (NBR), chloroprene rubber (CR), butyl rubber (IIR), and ethylene-propylene-diene rubber (EPDM), and hydrogenated products thereof; olefin-based rubbers such as ethylene-propylene rubber (EPM), ethylene-acrylic rubber (AEM), ethylene-butene rubber (EBM), chlorosulfonated polyethylene, acrylic rubber, fluororubber, polyethylene rubber, and polypropylene rubber; epichlorohydrin rubber; polysulfide rubber; silicone rubber; urethane rubber; and the like.

In addition, the polymer that can form the main chain portion of the elastomeric polymer (A) or (B) may also be an elastomeric polymer containing a resin component, and examples thereof include optionally hydrogenated polystyrene-based elastomeric polymers (for example, SBS, SIS, SEBS, and the like), polyolefin-based elastomeric polymers, polyvinyl chloride-based elastomeric polymers, polyurethane-based elastomeric polymers, polyester-based elastomeric polymers, polyamide-based elastomeric polymers, and the like.

Moreover, the polymer that can form the main chain portion of the elastomeric polymer (A) or (B) preferably comprises at least one selected from diene-based rubbers, hydrogenated products of diene-based rubbers, olefin-based rubbers, optionally hydrogenated polystyrene-based elastomeric polymers, polyolefin-based elastomeric polymers, polyvinyl chloride-based elastomeric polymers, polyurethane-based elastomeric polymers, polyester-based elastomeric polymers, and polyamide-based elastomeric polymers. In addition, the polymer is preferably a diene-based rubber from the viewpoints of the ease of introduction of a maleic anhydride group preferred as the cyclic acid anhydride group, and the like, and is preferably an olefin-based rubber from the viewpoint of anti-ageing properties.

Meanwhile, examples of the compound capable of introducing a cyclic acid anhydride group include cyclic acid anhydrides such as succinic anhydride, maleic anhydride, glutaric anhydride, phthalic anhydride, and derivatives thereof.

In addition, the cyclic acid anhydride group of the elastomeric polymer having a cyclic acid anhydride group in a side chain used in the first step is preferably a succinic anhydride group, a maleic anhydride group, a glutaric anhydride group, or a phthalic anhydride group. Especially, a maleic anhydride group is more preferable, from the viewpoints that the raw material has high reactivity and further the raw material is industrially readily available.

Moreover, the elastomeric polymer having a cyclic acid anhydride group in a side chain used in the first step may be produced by a commonly used method, for example, by a method of graft polymerization of a cyclic acid anhydride onto a polymer that can form the main chain portion of the elastomeric polymer (A) or (B) under commonly employed conditions, for example, by stirring under heating or the like. In addition, it is also possible to use a commercially available product as the elastomeric polymer having a cyclic acid anhydride group in a side chain used in the first step.

Examples of commercially available products of the elastomeric polymer having a cyclic acid anhydride group in a side chain include maleic anhydride-modified isoprene rubbers such as LIR-403 (manufactured by KURARAY CO., LTD.) and LIR-410A (prototype provided by KURARAY CO., LTD.); modified isoprene rubbers such as LIR-410 (manufactured by KURARAY CO., LTD.); carboxy-modified nitrile rubbers such as Krynac 110, 221, and 231 (manufactured by Polysar Rubber Corporation); carboxy-modified polybutenes such as CPIB (manufactured by Nippon Petrochemicals Co., Ltd.) and HRPIB (prototype provided by the laboratory of Nippon Petrochemicals Co., Ltd.); maleic anhydride-modified ethylene-propylene rubbers such as Nucrel (manufactured by DUPONT-MITSUI POLYCHEMICALS CO., LTD), Yukaron (manufactured by Mitsubishi Chemical Corporation), TAFMER M (for example, MP0610 (manufactured by Mitsui Chemicals, Inc.), and MP0620 (manufactured by Mitsui Chemicals, Inc.)); maleic anhydride-modified ethylene-butene rubbers such as TAFMER M (for example, MA8510, MH7010, MH7020 (manufactured by Mitsui Chemicals, Inc.), MH5010, MH5020 (manufactured by Mitsui Chemicals, Inc.), and MH5040 (manufactured by Mitsui Chemicals, Inc.)); maleic anhydride-modified polyethylenes such as Adtex series (maleic anhydride-modified EVA), ethylene-methyl acrylate-maleic anhydride copolymers (manufactured by Japan Polyolefins Co., Ltd.), HPR series (maleic anhydride-modified EEA, maleic anhydride-modified EVA (manufactured by DuPont-Mitsui Polyolefin)), Bondfast series (maleic anhydride-modified EMA (manufactured by Sumitomo Chemical Company, Limited)), Dumilan series (maleic anhydride-modified EVOH (manufactured by Takeda Pharmaceutical Company Limited)), Bondine (ethylene-acrylic acid ester-maleic anhydride ternary copolymer (manufactured by ATOFINA)), Tuftec (maleic anhydride-modified SEBS, M1943 (manufactured by Asahi Kasei Corporation)), Kraton (maleic anhydride-modified SEBS, FG1901, FG1924 (manufactured by Kraton Polymers)), Tufprene (maleic anhydride-modified SBS, 912 (manufactured by Asahi Kasei Corporation)), Septon (maleic anhydride-modified SEPS (manufactured by KURARAY CO., LTD.)), Rexpearl (maleic anhydride-modified EVA, ET-182G, 224M, 234M (manufactured by Japan Polyolefins Co., Ltd.)), and Auroren (maleic anhydride-modified EVA, 200S, 250S (manufactured by NIPPON PAPER Chemicals CO., LTD.)); maleic anhydride-modified polypropylenes such as ADMER (for example, QB550, LF128 (manufactured by Mitsui Chemicals, Inc.)); and the like.

In addition, the elastomeric polymer having a cyclic acid anhydride group in a side chain is preferably a maleic anhydride-modified elastomeric polymer, and among them, more preferably a maleic anhydride-modified ethylene-propylene rubber, a maleic anhydride-modified ethylene-butene rubber, or an ethylene-methyl acrylate-maleic anhydride copolymer from the viewpoints of high molecular weight and high strength. Additionally, the elastomeric polymer having a cyclic acid anhydride group in a side chain may be used singly or in combination of two or more kinds.

Moreover, the organically modified clay used in the first step is the same as the organically modified clay described for the above-described thermoplastic elastomer composition of the present invention (the preferable organically modified clays are also the same).

In addition, the polymer (Z) used in the first step is a polymer, the SP value of which is 9.0 or more, and is greater by 0.5 or more than the SP value of the elastomeric polymer (D). Moreover, as the polymer (Z), it is necessary to use polymers other than the elastomeric polymers (A) and (B).

In the present invention, the elastomeric polymer (D) is reacted with a raw material compound to be described later to form an elastomer component (elastomeric polymer (A) and/or (B)) in the thermoplastic elastomer composition being the final product (target product). The main chain moiety of the elastomeric polymer (D) directly becomes a main chain moiety of a polymer contained as the elastomer component. Here, in the case of forming a side chain using the "elastomeric polymer (D) having the cyclic acid anhydride group in the side chain" as in the present invention, the raw material compound (cross-linking agent) is used in a ratio of 0.1 to 10 parts by mass relative to 100 parts by mass of the elastomeric polymer (D), which means that, basically, the raw material compound (reaction agent: cross-linking agent) is in a small amount and that the side chain formed does not greatly affect the SP value (basically, the SP value does not change even when the side chain is formed). For this reason, the SP value of the polymer (elastomeric polymer (A) and/or (B)) obtained after the formation reaction of a side chain can basically be considered as a value almost the same as the SP value of the "elastomeric polymer (D) having the cyclic acid anhydride group in the side chain." Therefore, in the present patent, the SP value of the elastomer component employed is the SP value of the "elastomeric polymer (D) having the cyclic acid anhydride group in the side chain" before cross-linking. Note that the way of obtaining the SP value of the "elastomeric polymer (D) having the cyclic acid anhydride group in the side chain" is as described above. Even in the case of using the polymer (D) as a mixture of multiple types of polymers, the raw material compound (reaction agent: cross-linking agent) used to form a side chain is basically in a small amount, which means that the side chain formed does not greatly affect the SP value of the obtained elastomer component (mixture of polymers). Thus, the SP value is maintained and the SP value of the elastomer component formed is considered as a value almost the same as the SP value of the "elastomeric polymer (D) having the cyclic acid anhydride group in the side chain." Therefore, in the present patent, the SP value of the elastomer component employed is the SP value of the "elastomeric polymer (D) having the cyclic acid anhydride group in the side chain" before cross-linking. Thus, in the final product, the polymer (Z) is one which has an SP value of 9.0 or more and which has an SP value greater by 0.5 or more than the SP value of the elastomer component (at least one selected from the group consisting of the elastomeric polymers (A) and (B)). Hence, the polymer (Z) used in the first step is the same as the polymer (Z) (preferable conditions thereof are also the same) described in the thermoplastic elastomer composition of the present invention. As the polymer (Z), suitable polymers may be selected for use as appropriate from polymers other than the elastomeric polymers (A) and (B) such that the conditions described above (the condition of an SP value of 9.0 or more and the condition of an SP value greater by 0.5 or more than the SP value of the elastomeric polymer (D)) are satisfied in relation to the SP value of the elastomeric polymer (D).

Then, in the first step, the elastomeric polymer (D) having a cyclic acid anhydride group in a side chain, the organically modified clay, and the polymer (Z) are mixed together to obtain the mixture. In this mixture preparation step, an order of addition of the elastomeric polymer (D) having a cyclic acid anhydride group in a side chain, the organically modified clay, and the polymer (Z) is not limited to a particular order. However, from the viewpoint of more improving the dispersibility of the organically modified clay, it is preferable to prepare a mixture precursor containing the polymer (D) and the polymer (Z), and there after to add the clay to the precursor.

In addition, in adding the organically modified clay to obtain the mixture, it is preferable to plasticize the elastomeric polymer (D) having a cyclic acid anhydride group in a side chain in advance and thereafter to add the organically modified clay so that the organically modified clay can be sufficiently dispersed, and it is more preferable to plasticize the mixture precursor and thereafter to add the organically modified clay thereto.

A method for plasticizing an elastomeric polymer (D) having a cyclic acid anhydride group in a side chain or the mixture precursor is not limited to a particular one, and for example it is possible to employ, as appropriate, a method of mastication using rolls, a kneader, an extruder, an all-purpose mixer, or the like at temperature which allows these to be plasticized (for example, about 100 to 250° C.), or the like. The conditions such as temperature for plasticizing the elastomeric polymer (D) having a cyclic acid anhydride group in a side chain or the mixture precursor are not particularly limited, and may be set, as appropriate, according to the type of a component contained (for example, the type of the elastomeric polymer (D) having a cyclic acid anhydride group in a side chain) and the like.

Moreover, in the mixture preparation step, the elastomeric polymer (D) having a cyclic acid anhydride group in a side chain, the organically modified clay, and the polymer (Z) are preferably mixed by using the organically modified clay at such a ratio that the amount of the organically modified clay contained in the finally obtained thermoplastic elastomer composition is 20 parts by mass or less (more preferably 0.1 to 10 parts by mass, further preferably 0.5 to 5 parts by mass, and particularly preferably 1 to 3 parts by mass) relative to 100 parts by mass of the elastomer component. If the amount of the organically modified clay contained exceeds the upper limit, the cross-linking is so strong that the elongation and the strength tend to decrease rather. Meanwhile, if the amount of the organically modified clay contained is less than the lower limit, the amount of the organically modified clay is so small that the effects obtained by the use of the organically modified clay tend to decrease.

In addition, the amount of the organically modified clay contained in the mixture is preferably 20 parts by mass or less, more preferably 0.5 to 5 parts by mass, and further preferably 1 to 3 parts by mass, relative to 100 parts by mass of the elastomeric polymer (D) having a cyclic acid anhydride group in a side chain. If the content is less than the lower limit, the amount of the organically modified clay is so small that the effect obtained by using the organically modified clay tends to be lowered. Meanwhile, if the content exceeds the upper limit, the cross-linking is so strong that the elongation and the strength tend to be lowered rather. Note that when the organically modified clay is used at such a content, the amount of the organically modified clay contained in the finally obtained thermoplastic elastomer composition takes a value within the above-described range.

Moreover, the amount of the organically modified clay used for forming such a mixture is preferably such that the organically modified clay be contained at such a ratio that the amount of the organically modified clay is 0.01 g to 2.0 g (more preferably 0.02 to 1.0 g) per millimole of the cyclic acid anhydride group in the elastomeric polymer (D) having a cyclic acid anhydride group in a side chain. If the ratio of the organically modified clay to the acid anhydride group is less than the lower limit, the amount is so small that the effect tends to be lowered. Meanwhile, if the ratio exceeds the upper limit, the cross-linking is so strong that the elongation and the strength tend to be lowered rather. Note that when the organically modified clay is contained within such a range of ratio, the organically modified clay introduced into the mixture is efficiently decomposed, so that the single-layered clay tends to be produced efficiently, and the dispersibility of the clay tends to be higher.

Still further in the mixture preparation step, the elastomeric polymer (D) having a cyclic acid anhydride group in a side chain, the clay, and the polymer (Z) are preferably mixed by using the polymer (Z) at such a ratio that the amount of the polymer (Z) contained in the finally obtained thermoplastic elastomer composition is 10 to 700 parts by mass (more preferably 30 to 600 parts by mass, further preferably 50 to 500 parts by mass, particularly preferably 80 to 400 parts by mass, and most preferably 100 to 300 parts by mass) relative to 100 parts by mass of the elastomer component. If the amount of the polymer (Z) contained exceeds the upper limit, the compression set tends to increase. Meanwhile, if the amount of the polymer (Z) contained is less than the lower limit, it tends to be difficult to sufficiently improve the oil resistance.

Plus, the amount of the polymer (Z) contained in the mixture is preferably 10 to 700 parts by mass (more preferably 30 to 600 parts by mass, further preferably 50 to 500 parts by mass, particularly preferably 80 to 400 parts by mass, and most preferably 100 to 300 parts by mass) relative to 100 parts by mass of the elastomeric polymer (D) having the cyclic acid anhydride group in the side chain. If the amount of the polymer (Z) contained is less than the lower limit, it tends to be difficult to sufficiently improve the oil resistance. Meanwhile, if the amount of the polymer (Z) contained exceeds the upper limit, the compression set tends to increase.

A mixing method for obtaining the mixture is not limited to a particular one, but any publicly known method or the like can be employed as appropriate. For example, it is possible to employ a method of mixing with rolls, a kneader, an extruder, an all-purpose mixer, or the like.

In addition, from the viewpoint of further increasing the flowability and the mechanical strength, the mixture may further contain an α-olefin-based resin having no chemical-bond cross-linking moiety other than the polymer (Z), a paraffin oil, a styrene block copolymer having no chemical-bond cross-linking moiety other than the polymer (Z), and the like. The α-olefin-based resin having no chemical-bond cross-linking moiety, the paraffin oil, and the styrene block copolymer having no chemical-bond cross-linking moiety are the same as the α-olefin-based resin having no chemical-bond cross-linking moiety, the paraffin oil, and the styrene block copolymer having no chemical-bond cross-linking moiety described for the thermoplastic elastomer composition of the present invention (the preferable ones are also the same).

When the mixture further contains the α-olefin-based resin having no chemical-bond cross-linking moiety and/or the paraffin oil and/or the styrene block copolymer having no chemical-bond cross-linking moiety, an order of addition of the elastomeric polymer (D) having a cyclic acid anhydride group in a side chain, the organically modified clay, the polymer (Z), and an additive component such as the α-olefin-based resin having no chemical-bond cross-linking moiety and/or the paraffin oil and/or the styrene block copolymer having no chemical-bond cross-linking moiety is not limited to a particular order. However, from the viewpoint of more improving the dispersibility of the organically modified clay, it is preferable to prepare a mixture precursor containing the elastomeric polymer (D) having a cyclic acid anhydride group in a side chain, the polymer (Z), and the additive component (the α-olefin-based resin and/or the paraffin oil and/or the styrene block copolymer having no chemical-bond cross-linking moiety), and thereafter to add the organically modified clay to the precursor.

When the α-olefin-based resin (α-olefin-based resin having no chemical-bond cross-linking moiety) is contained in the mixture, the amount of the α-olefin-based resin contained is preferably 800 parts by mass or less (more preferably 5 to 700 parts by mass, further preferably 10 to 600 parts by mass, particularly preferably 25 to 500 parts by mass, and most preferably 50 to 400 parts by mass) relative to 100 parts by mass of the elastomer component. If the amount of the α-olefin-based resin contained exceeds the upper limit, the mechanical properties (the tensile strength at break and the compression set) tend to decrease. Meanwhile, if the amount of the α-olefin-based resin contained is less than the lower limit, the flowability tends to decrease. Note that the amount of the α-olefin-based resin contained in the mixture is preferably 800 parts by mass or less (more preferably 5 to 700 parts by mass, further preferably 10 to 600 parts by mass, particularly preferably 25 to 500 parts by mass, and most preferably 35 to 400 parts by mass) relative to 100 parts by mass of the elastomeric polymer (D) having the cyclic acid anhydride group in the side chain. If the amount contained is less than the lower limit, the mechanical properties (the tensile strength at break and the compression set) tend to decrease. Meanwhile, if the amount contained is less than the lower limit, the flowability tends to decrease.

When the paraffin oil is contained in the mixture, the amount of the paraffin oil contained is preferably 600 parts by mass or less, more preferably 10 to 600 parts by mass, further preferably 50 to 550 parts by mass, particularly preferably 75 to 500 parts by mass, and most preferably 100 to 400 parts by mass relative to 100 parts by mass of the elastomer component. Moreover, when the styrene block copolymer having no chemical-bond cross-linking moiety is contained in the mixture, the amount contained is preferably 600 parts by mass or less, more preferably 10 to 600 parts by mass, further preferably 15 to 550 parts by mass, particularly preferably 20 to 500 parts by mass, and most preferably 30 to 400 parts by mass relative to 100 parts by mass of the elastomer component.

Furthermore, unless the object of the present invention is not impaired, the mixture may further contain, depending on an application or the like of the finally obtained thermoplastic elastomer composition, an additional component(s) such as: polymers besides the elastomer component, the polymer (Z), the α-olefin-based resin and the styrene block copolymer; and various kinds of additives including reinforcing agents (bulking agents), bulking agents to which amino groups are introduced (hereinafter, simply referred to as "amino group-introduced bulking agent"), amino group-containing compounds other than the amino group-introduced bulking agents, compounds containing metal elements (hereinafter, simply referred to as "metal salts"), maleic anhydride-modified polymers, anti-aging agents, antioxidants, pigments (dyes), plasticizers, thixotropy-imparting agents, ultraviolet absorbers, flame retardants, solvents, surfactants (including leveling agents), dispersing agents, dehydrating agents, corrosion inhibitors, tackiness agents, antistats, fillers, and the like. When the mixture contains such an additional component, the component can be contained as appropriate in the finally obtained thermoplastic elastomer composition. Here, these additives and the like are not particularly limited, and commonly used ones (known ones) can be used, as appropriate. Then, as these additives and the like, those described above for the thermoplastic elastomer composition of the present invention may be used as appropriate.

Moreover, when an additional component is a polymer or a reinforcing agent (bulking agent), an amount of the additional component contained is preferably 500 parts by mass or less and more preferably 20 to 400 parts by mass relative to 100 parts by mass of the elastomer component. If the amount of the additional component contained is less than the lower limit, the effects obtained by the use of the additional component tend not to be expressed sufficiently. Meanwhile, if the amount of the additional component contained exceeds the upper limit, the effects of the elastomer serving as a substrate tend to be less influential, so that physical properties tend to deteriorate, although it depends on the type of the component used.

Meanwhile, when the additional components are the other additives (when the additional components are other than the polymers and reinforcing materials (bulking agents)), the amount of the additional components contained is preferably 20 parts by mass or less, and more preferably 0.1 to 10 parts by mass relative to 100 parts by mass of the elastomer component. If the amount of the additional components contained is less than the lower limit, the effect of the use of the additional components tends to be expressed insufficiently. Meanwhile, if the amount of the additional components contained exceeds the upper limit, the reaction of the elastomer serving as the substrate is adversely affected, so that physical properties tend to be lowered rather.

(Second Step)

The second step is a step of adding, to the mixture, at least one raw material compound of a compound (I) that forms a hydrogen-bond cross-linkable moiety upon a reaction with the cyclic acid anhydride group, and a mixed raw material of the compound (I) with a compound (II) that forms a covalent-bond cross-linking moiety upon a reaction with the cyclic acid anhydride group in a ratio of 0.1 to 10 parts by mass relative to 100 parts by mass of the elastomeric polymer (D) having the cyclic acid anhydride group in the side chain, to allow a reaction to proceed between the polymer and the raw material compound, thereby obtaining the thermoplastic elastomer composition.

As the compound (I) that forms a hydrogen-bond cross-linkable moiety upon a reaction with the cyclic acid anhydride group, the same compound as the compound that forms a hydrogen-bond cross-linkable moiety (the compound capable of introducing a nitrogen-containing heterocycle) described for the above-described thermoplastic elastomer composition of the present invention can be used preferably. For example, the compound (I) may be the nitrogen-containing heterocycle described for the above-described thermoplastic elastomer composition of the present invention itself, or may be a compound in which a substituent (for example, a hydroxy group, a thiol group, an amino group, or the like) that reacts with a cyclic acid anhydride group of maleic anhydride or the like is bonded to the above-described nitrogen-containing heterocycle (a nitrogen-containing heterocycle having the above-described substituent). Note that, as the compound (I), a compound that forms both a hydrogen-bond cross-linkable moiety and a covalent-bond cross-linking moiety (a compound capable of simultaneously introducing both a hydrogen-bond cross-linkable moiety and a covalent-bond cross-linking moiety) may be used (note that a side chain having both a hydrogen-bond cross-linkable moiety and a covalent-bond cross-linking moiety can be considered as a preferred mode of the side chain having a hydrogen-bond cross-linkable moiety).

In addition, the compound (I) is not particularly limited, and it is possible to select and use, as appropriate, a preferred compound among the above-described compounds (I) according to the type of the side chain (the side chain (a) or the side chain (a')) in the target polymer. The compound (I) is preferably triazole, pyridine, thiadiazole, imidazole, isocyanurate, triazine, and hydantoins optionally having at least one substituent selected from hydroxy groups, thiol groups, and amino groups, and 2,4-diamino-6-phenyl-1,3,5-triazine, more preferably triazole, pyridine, thiadiazole, imidazole, isocyanurate, triazine, and hydantoin having the above-described substituent, and 2,4-diamino-6-phenyl-1,3,5-triazine, further preferably triazole, isocyanurate, and triazine having the above-described substituent, and 2,4-diamino-6-phenyl-1,3,5-triazine, and particularly preferably triazole having the above-described substituent from the viewpoint that a higher reactivity can be obtained. Note that examples of the triazole, pyridine, thiadiazole, imidazole, and hydantoin optionally having the substituents include 4H-3-amino-1,2,4-triazole, aminopyridine, aminoimidazole, aminotriazine, aminoisocyanurate, hydroxypyridine, hydroxyethyl isocyanurate, and the like.

Meanwhile, as the compound (II) that forms a covalent-bond cross-linking moiety upon a reaction with the cyclic acid anhydride group, a compound which is the same as the "compound that forms a covalent-bond cross-linking moiety (the compound that forms a covalent bond)" described for the above-described thermoplastic elastomer composition of the present invention can be used preferably (compounds preferred as the compound (II) are also the same). In addition, as the compound (II), a compound that forms both a hydrogen-bond cross-linkable moiety and a covalent-bond cross-linking moiety (a compound capable of simultaneously introducing both a hydrogen-bond cross-linkable moiety and a covalent-bond cross-linking moiety) may also be used (note that a side chain having both a hydrogen-bond cross-linkable moiety and a covalent-bond cross-linking moiety can be considered as a preferred mode of the side chain having a covalent-bond cross-linking moiety).

The compound (II) is preferably tris(hydroxyethyl) isocyanurate, sulfamide, pentaerythritol, 2,4-diamino-6-phenyl-1,3,5-triazine, or polyether polyol, more preferably tris(hydroxyethyl) isocyanurate or sulfamide, and further preferably pentaerythritol, 2,4-diamino-6-phenyl-1,3,5-triazine, or tris(hydroxyethyl) isocyanurate, from the viewpoint of resistance to compression set.

Then, as the compound (I) and/or (II), it is preferable to use a compound having at least one substituent among hydroxy groups, thiol groups, amino groups, and imino groups from the viewpoint of introducing a hydrogen-bond cross-linkable moiety. Moreover, as the compound (I) and/or (II), it is preferable to use a compound that forms both of a hydrogen-bond cross-linkable moiety and a covalent-bond cross-linking moiety by reacting with the cyclic acid anhydride group (a compound that can introduce both of a hydrogen-bond cross-linkable moiety and a covalent-bond cross-linking moiety at the same time), because both of the hydrogen-bond cross-linkable moiety and the covalent-bond cross-linking moiety can be introduced more efficiently to the composition. As the compound that forms both of a hydrogen-bond cross-linkable moiety and a covalent-bond cross-linking moiety, the aforementioned heterocycle-containing polyol, heterocycle-containing polyamine, and heterocycle-containing polythiol can be preferably used, and 2,4-diamino-6-phenyl-1,3,5-triazine and tris(hydroxyethyl) isocyanurate are particularly preferable among them.

In addition, regarding the amount of the raw material compound (the compound (I) and/or the compound (II)) added (the total amount of the compound (I) and/or the compound (II): when only one compound is used, the amount of the one compound) is 0.1 to 10 parts by mass, more preferably 0.3 to 7 parts by mass, and further preferably 0.5 to 5.0 parts by mass, relative to 100 parts by mass of the polymer (an elastomeric polymer having a cyclic acid anhydride group in a side chain) in the mixture. If the amount of the compound (I) and the compound (II) added (the amount based on parts by mass) is less than the lower limit, the amount is so small that the cross-linking density does not increase, and desired physical properties tend not to be expressed. Meanwhile, if the amount exceeds the upper limit, the amount is so large that many branches tends to be formed, and the cross-linking density tends to be lowered. Note that if the amount exceeds the upper limit, the SP value tends to vary in the obtained elastomer component and the elastomeric polymer (D).

In addition, the amount of the raw material compound (the compound (I) and/or the compound (II)) added (the total amount of the compound (I) and/or the compound (II): when only one compound is used, the amount of the one compound) is not particularly limited. In a case where active hydrogen of an amine, an alcohol, or the like is contained in the compound, the amount of the compound (I) and the compound (II) is such that the resulting amount of the active hydrogen of an amine, an alcohol, or the like in the compound is preferably 20 to 250% by mole, more preferably 50 to 150% by mole, and further preferably 80 to 120% by mole relative to 100% by mole of the cyclic acid anhydride group. If the amount added is less than the lower limit, the amount of the side chain introduced is reduced, making it difficult to obtain a sufficiently high level of cross-linking density, so that physical properties such as tensile strength tend to be lowered. Meanwhile, if the amount added exceeds the upper limit, the amount of the compound used is so large that many branches tends to be formed, and the cross-linking density tends to be rather lowered.

When both the compound (I) and the compound (II) are used, the order of addition of the compound (I) and the compound (II) is not particularly limited, and either one may be added first. In addition, when both the compound (I) and the compound (II) are used, the compound (I) may be reacted with part of the cyclic acid anhydride groups in the elastomeric polymer having a cyclic acid anhydride group in a side chain. This also makes it possible to form a covalent-bond cross-linking moiety by a reaction of unreacted cyclic acid anhydride groups (cyclic acid anhydride groups not reacted) with the compound (II). Herein, the "part" is preferably 1% by mole or more and 50% by mole of less relative to 100% by mole of the cyclic acid anhydride group. Within this range, the effect of the introduction of the group derived from the compound (I) (for example, a nitrogen-containing heterocycle or the like) tends to be sufficiently expressed in the obtained elastomeric polymer (B), and the recyclability thereof tends to be further improved. Note that the compound (II) is preferably reacted with the cyclic acid anhydride group such that the cross-linkages formed by the covalent bonds can be in a suitable number (for example, 1 to 3 in one molecule).

When the polymer is reacted with the raw material compound (compound (I) and/or compound (II)), the cyclic acid anhydride group of the polymer undergoes ring-opening, so that the cyclic acid anhydride group and the raw material compound (the compound (I) and/or compound (II)) are chemically bonded to each other. A temperature condition for the reaction (ring-opening of the cyclic acid anhydride group) of the polymer with the raw material compound (the compound (I) and/or compound (II)) is not particularly limited, and may be adjusted to a temperature at which the compound and the cyclic acid anhydride group can react with each other according to the types of the compound and the cyclic acid anhydride group. The temperature condition is preferably 100 to 250° C., and more preferably 120 to 230° C., from the viewpoint that the reaction is allowed to proceed in a moment by softening.

Such a reaction results in the formation of at least a hydrogen-bond cross-linkable moiety at a site where the compound (I) has reacted with the cyclic acid anhydride group. Hence, it is possible to cause a side chain of the polymer to contain a hydrogen-bond cross-linkable moiety (a moiety having a carbonyl-containing group and/or a nitrogen-containing heterocycle, more preferably a moiety having a carbonyl-containing group and a nitrogen-containing heterocycle). The side chain formed (introduced) by the reaction can be one containing the structure represented by the above-described formula (2) or (3).

In addition, at a site where the compound (II) has reacted with a cyclic acid anhydride group during the reaction, at least a covalent-bond cross-linking moiety is formed. Hence, a side chain of the polymer can be one containing a covalent-bonding cross-linking portion (a side chain (b) or a side chain (c)). Thus, side chains formed by such a reaction can be those containing the structures represented by the above-described formulae (7) to (9).

Note that groups (structures) of side chains in such polymers, specifically, unreacted cyclic acid anhydride groups, the structures represented by the above-described formulae (2), (3), and (7) to (9), and the like can be identified by ordinarily used analytic techniques such as NMR or IR spectroscopy.

Through the reaction as mentioned above, it is possible to obtain a compound comprising:

at least one elastomer component selected from the group consisting of elastomeric polymers (A) each of which has a side chain (a) containing a hydrogen-bond cross-linkable moiety having a carbonyl-containing group and/or a nitrogen-containing heterocycle and has a glass-transition point of 25° C. or below, and elastomeric polymers (B) each of which contains a hydrogen-bond cross-linkable moiety and a covalent-bond cross-linking moiety in a side chain and has a glass-transition point of 25° C. or below;

an organically modified clay, a content ratio of which is 20 parts by mass or less relative to 100 parts by mass of the elastomer component; and a polymer (Z) which is a polymer other than the elastomeric polymers (A) and (B), and an SP value of which is 9.0 or more and is greater by 0.5 or more than an SP value of the elastomer component.

Note that the elastomeric polymer (A) and the elastomeric polymer (B) in the thermoplastic elastomer composition thus obtained are the same as the elastomeric polymer (A) and the elastomeric polymer (B) described above for the thermoplastic elastomer composition of the present invention, except that the side chain (a), the side chain (a'), the side chain (b), and the side chain (c) in the polymers are each derived from a reaction with a cyclic acid anhydride group (for example, such as a side chain containing the structure represented by any of the above-described formulae (2), (3), and (7) to (9)). Additionally, the reaction between the elastomeric polymer (D) having the cyclic acid anhydride group in the side chain and the raw material compound is a reaction to form a side chain. The main chain moieties greatly affecting the SP value before and after the reaction are basically the same, and since the raw material compound used in the formation of the side chain is in a small amount, the side chain does not greatly affect the SP value. For these reasons and the like, the SP value of the elastomer component (elastomeric polymer (A) and/or the elastomeric polymer (B)) obtained after the reaction is considered almost the same as the SP value of the elastomeric polymer (D). Therefore, in the present patent, the SP value of the elastomer component (elastomeric polymer (A) and/or the elastomeric polymer (B)) employed is the SP value of the "elastomeric polymer (D) having the cyclic acid anhydride group in the side chain" before cross-linking. Hence, the polymer used in the first step, which satisfies the conditions of "an SP value of which is 9.0 or more, and is greater by 0.5 or more than an SP value of the elastomeric polymer (D)," is a polymer which satisfies the conditions of "an SP value of which is 9.0 or more, and is greater by 0.5 or more than an SP value of the elastomer component" in the final product.

In addition, in the present invention, from the viewpoint of easy availability and high reactivity, the elastomeric polymer having a cyclic acid anhydride group in a side chain is preferably a maleic anhydride-modified elastomeric polymer, the raw material compound is preferably at least one compound selected from triazoles optionally having at least one substituent selected from hydroxy groups, thiol groups, and amino groups, pyridines optionally having at least one substituent selected from hydroxy groups, thiol groups, and amino groups, thiadiazoles optionally having at least one substituent selected from hydroxy groups, thiol groups, and amino groups, imidazoles optionally having at least one substituent selected from hydroxy groups, thiol groups, and amino groups, isocyanurates optionally having at least one substituent selected from hydroxy groups, thiol groups, and amino groups, triazines optionally having at least one substituent selected from hydroxy groups, thiol groups, and amino groups, hydantoins optionally having at least one substituent selected from hydroxy groups, thiol groups, and amino groups, tris(hydroxyethyl) isocyanurate, sulfamides, pentaerythritol, 2,4-diamino-6-phenyl-1,3,5-triazine, and polyether polyols, and the elastomer component is preferably at least one selected from the group consisting of reaction products of the maleic anhydride-modified elastomeric polymer with the raw material compound. To be more specific, in the present invention, the elastomeric polymer having a cyclic acid anhydride group in a side chain (the elastomeric polymer (D)) is preferably a maleic anhydride-modified elastomeric polymer, and the elastomer component is preferably at least one selected from the group consisting of reaction products of the maleic anhydride-modified elastomeric polymer with at least one compound (the raw material compound) selected from triazoles optionally having at least one substituent selected from hydroxy groups, thiol groups, and amino groups, pyridines optionally having at least one substituent selected from hydroxy groups, thiol groups, and amino groups, thiadiazoles optionally having at least one substituent selected from hydroxy groups, thiol groups, and amino groups, imidazoles optionally having at least one substituent selected from hydroxy groups, thiol groups, and amino groups, isocyanurates optionally having at least one substituent selected from hydroxy groups, thiol groups, and amino groups, triazines optionally having at least one substituent selected from hydroxy groups, thiol groups, and amino groups, hydantoins optionally having at least one substituent selected from hydroxy groups, thiol groups, and amino groups, tris(hydroxyethyl) isocyanurate, sulfamides, pentaerythritol, 2,4-diamino-6-phenyl-1,3,5-triazine, and polyether polyols.

Note that, according to the present invention, it is possible to efficiently produce a thermoplastic elastomer composition capable of having sufficiently high levels of tensile strength and excellent oil resistance. Although it is not exactly clear why such effects are achieved by the present invention, the present inventors speculate as follows. Specifically, first, in the present invention, the thermoplastic elastomer composition is produced by modifying the elastomeric polymer (D) having a cyclic acid anhydride group in a side chain (hereinafter, sometimes referred to as "acid anhydride-containing polymer"). By dispersing the organically modified clay in the acid anhydride polymer in advance by mixing the organically modified clay with the acid anhydride polymer as described above, the acid anhydride groups and the organically modified clay interact with each other to facilitate the delamination of layers of the organically modified clay. Especially in the organically modified clay, the organic material such as an ammonium salt present between layers more efficiently interacts with the acid anhydride. Hence, the organically modified clay causes delamination of the layers more easily. In addition, after the organically modified clay is dispersed, the raw material compound (which can function as a cross-linking agent that forms cross linkages, and which is hereinafter sometimes referred to as a "cross-linking agent") is added. Consequently, the cross-linking agent reacts with acid anhydride groups, and at least hydrogen-bond cross-linkable moieties (for example, carboxylic acid groups, or the like) are generated in the system. For this reason, interaction of hydrogen bonds with the organically modified clay is caused, and the organically modified clay is further dispersed in the elastomer. The present inventors speculate that, for this reason, the organically modified clay is sufficiently dispersed in the thermoplastic elastomer composition obtained by the present invention, and the organically modified clay interacts with the hydrogen-bond cross-linkable moieties to form plane cross-linking moieties uniformly, so that the sufficient tensile properties can be obtained. Moreover, in the present invention, the obtained thermoplastic elastomer composition contains the polymer (Z) together with the organically modified clay and the elastomer component. The present inventors speculate that since the polymer (Z) is high in polarity, the polymer (Z) can exhibit high oil resistance stemming from a low compatibility with low-polarity oils. Furthermore, since the polymer (Z) reacts or interacts with the elastomeric polymer (D) in the composition, the polymer (Z) is dispersed at a sufficiently high level, making it possible to exhibit sufficiently high levels of the effects obtained by adding the polymer (Z). The present inventors speculate that, for this reason, the present invention makes it possible for the obtained thermoplastic elastomer composition to have sufficiently high levels of oil resistance and tensile strength.

In addition, as described above, the thermoplastic elastomer composition obtained by the present invention can be such that a single-layered clay is contained in the composition. Moreover, the thus obtained thermoplastic elastomer composition can also be such that, when randomly selected three or more measurement points in a size of 5.63 µm$^2$ on a surface of the thermoplastic elastomer composition are observed under a transmission electron microscope (TEM), 50% or more (more preferably 70% or more, further preferably 80 to 100%, and particularly preferably 85 to 100%) of all the organically modified clay based on the number is present as the single-layered clay in all the measurement points. If the ratio of such a single-layered clay present is less than the lower limit, the elongation at break and the strength at break tend to be lowered.

Note that the method for producing a thermoplastic elastomer composition of the present invention makes it possible to more efficiently adjust the ratio of the clay (single-layered clay) present in the single-layer morphology in the thermoplastic elastomer composition to the above-described preferred ratio. Regarding this point, the present inventors speculate that the organically modified clay interacts with cyclic acid anhydride groups in the above-described first step, making it possible to more efficiently delaminate layers of the organically modified clay having the multi-layered structure, and in turn making it possible to disperse (finely disperse) the organically modified clay in the single-layer state, so that the clay in the single-layer morphology (single-layered clay) is present at a higher ratio in the composition, which makes it possible for the composition to contain the single-layered clay at the above-described preferred ratio. Note that the presence of the clay in such a single-layered morphology can be confirmed by observing the surface of the obtained composition under a transmission electron microscope (TEM).

In addition, in the present invention, it is also possible to, for example, separately produce a thermoplastic elastomer composition containing an elastomeric polymer (A) as an elastomer component and a thermoplastic elastomer composition containing an elastomeric polymer (B) as an elastomer component, followed by mixing to prepare an thermoplastic elastomer composition containing the elastomeric polymers (A) and (B) as elastomer components. Meanwhile, when a thermoplastic elastomer composition containing a combination of the elastomeric polymers (A) and (B) as elastomer components is produced, it is also possible to cause a desired property to be exhibited by changing the ratio of the elastomeric polymer (A) and the elastomeric polymer (B), as appropriate, to change, as appropriate, the ratio between the hydrogen-bond cross-linkable moieties and the covalent-bond cross-linking moieties present in the composition and the like.

The thus obtained thermoplastic elastomer composition can be preferably used for, for example, various rubber applications by utilizing its rubber elasticity, and, for example, can be used preferably for applications such as hot-melt adhesives, or additives added thereto, automotive rubber components, hoses, belts, sheets, antivibration rubbers, rollers, linings, rubber-lined cloth, sealing materials, gloves, fenders, rubbers for medical applications (syringe gaskets, tubes, catheters), gaskets (for home appliances and for architectural applications), asphalt modifiers, hot-melt adhesives, boots, grips, toys, shoes, sandals, keypads, gears, PET bottle cap liners, rubber parts for printers, sealing materials, paints and coating materials, and print inks.

In the above, a description has been given of the method for producing a thermoplastic elastomer composition of the present invention, which is a method preferably usable as the method for producing a thermoplastic elastomer composition of the present invention. However, a method for producing a thermoplastic elastomer composition of the present invention is not limited to the above-described method for producing a thermoplastic elastomer composition of the present invention, and additional methods may be employed as appropriate. Examples of the additional methods which may be employed as appropriate include a method for obtaining a thermoplastic elastomer composition by simultaneously adding the elastomeric polymer (D), the polymer (Z), the raw material compound, and the organically modified clay to form a mixture, followed by reaction of the elastomeric polymer (D) with the raw material compound and a method in which a mixture of the elastomeric polymer (D), the polymer (Z), and the raw material compound is formed to form an elastomer component by reacting the elastomeric polymer (D) and the raw material compound in the mixture, followed by addition of an organically modified clay in the mixture containing the elastomer component. Note that from the viewpoint of the ratio of the single-layered clay present in the thermoplastic elastomer composition, it is preferable to employ the above-described method for producing a thermoplastic elastomer composition of the present invention.

[Elastomer Molded Body]

The elastomer molded body of the present invention is one formed by molding the thermoplastic elastomer composition of the present invention (molded body of the thermoplastic elastomer composition of the present invention). The elastomer molded body of the present invention may be one formed by molding the thermoplastic elastomer composition of the present invention and may be, depending on the usage, a molded body itself of the thermoplastic elastomer composition formed by molding the thermoplastic elastomer composition of the present invention alone or one formed by molding the thermoplastic elastomer composition of the present invention into a structure appropriately combined with additional members (one containing additional members), for example. As described above, the elastomer molded body of the present invention may be one formed by molding the thermoplastic elastomer composition of the present invention and may be a structure containing additional members, with its shape, embodiment, and the like not particularly limited. Note that the additional members are not particularly limited, and depending on the usage and necessity, publicly known materials (members) used for the usage can be used as appropriate.

In addition, examples of the shape of the elastomer molded body of the present invention include a sheet shape, a plate shape, a pipe shape, a tube shape, a cylindrical shape, an elliptical shape, a strand shape, a filament shape, a net shape, a shape as a cover (for example, the shape as the cover in the case of use for covering an electric wire), and the like. Methods for molding a thermoplastic elastomer composition of the present invention are not particularly limited, and it is possible to appropriately employ publicly known methods for molding elastomers (for example, extrusion molding, injection molding, blow molding, injection blow molding, extrusion blow molding, inflation molding, stamping molding, compression molding, and bead molding). In addition, examples of these molding methods which can be employed include a method in which the thermoplastic elastomer composition of the present invention is introduced into a mold conforming to the desired shape to carry out heat molding while appropriately pressing. As described above, the elastomer molded body of the present invention can be obtained by molding the thermoplastic elastomer composition with a publicly known elastomer molding method appropriately employed.

Such an elastomer molded body of the present invention is preferably a molded body for use in any application selected from the group consisting of civil engineering and building materials, industrial parts, electric and electronic components, and daily necessities. For use in these applications, as described above, the elastomer molded body of the present invention may be in a form appropriately combined with additional members and the like. In addition, examples of these applications (the civil engineering and building materials, the industrial parts, the electric and electronic components, and the daily necessities) include, but are not limited to, various types of gaskets and sheets for civil engineering and construction, gap filling materials (for example, joint materials), sealing materials for buildings, sealing materials for pipe joints, building sash sealing materials, piping protection materials, wiring protection materials, heat insulating materials, packing materials, cushioning materials, automotive parts (for example, the automotive rubber components described earlier, automotive interior and exterior parts, constant velocity joint boots, weather strips, dampers, wiper blades, insulating covers, hood seal rubbers, body panels, side shields, packing materials (for automobiles: for example, packing for automotive engines), and the like), parts for agricultural machines, agricultural materials, conveyor belts, contact rubber sheets, electrical insulators, housings and internal parts of various electronic equipments, wire covering materials, connectors, caps, plugs, sports and leisure goods (swimming fins, underwater glasses, golf club grips, baseball bat grips, and the like), footwear (shoe soles, sandals, and the like), and miscellaneous goods (packaging materials, garden hoses, antiskid tapes for stairs, cleaning tools, cosmetic supplies, and the like).

Among these, the elastomer molded body of the present invention is more preferably a molded body for use in one application selected from the group consisting of automotive parts, gap filling materials, sealing materials for buildings, sealing materials for pipe joints, piping protection materials, wiring protection materials, heat insulating materials, packing materials, cushioning materials, electrical insulating materials, contact rubber sheets, sports and leisure articles, and miscellaneous goods. In addition, the elastomer molded body of the present invention is more preferably used in one application selected from the group consisting of packing for automotive engines, constant velocity joint boots, weather strips, dampers, wiper blades, insulating covers, and hood seal rubbers.

EXAMPLES

Hereinafter, the present invention is described more specifically on the basis of Examples and Comparative Examples; however, the present invention is not limited to Examples below.

First, methods for evaluating properties of thermoplastic elastomer compositions obtained in Examples and Comparative Examples are described.

<JIS-A Hardness>

Each of the sheets of the thermoplastic elastomer compositions obtained in Examples and Comparative Examples (thickness of 2 mm, height of 150 mm, width of 150 mm) was used to measure the JIS-A hardness according to JIS K6253 (published in 2012).

<Measurement of Tensile Strength at Break ($T_B$)>

Each of the sheets of the thermoplastic elastomer compositions obtained in Examples and Comparative Examples (thickness of 2 mm, height of 150 mm, width of 150 mm) was used to punch out a No. 3 dumbbell-shaped test piece, carry out a tensile test at a rate of tension of 500 mm/min according to JIS K6251 (published in 2010), and to measure the tensile strength at break ($T_B$) [unit: MPa] at room temperature (25° C.).

<Measurement of 100% Modulus>

Each of the sheets of the thermoplastic elastomer compositions obtained in Examples and Comparative Examples (thickness of 2 mm, height of 150 mm, width of 150 mm) was used to punch out a No. 3 dumbbell-shaped test piece, carry out a tensile test at a rate of tension of 500 mm/min according to JIS K6251 (published in 2010), and to measure the 100% modulus (M100) [MPa] at room temperature (25° C.).

<Measurement of Swelling Degree with Respect to Hexane>

The swelling degree of the thermoplastic elastomer compositions obtained in Examples, Comparative Examples, and the like with respect to hexane was measured as follows: each of the sheets of the thermoplastic elastomer compositions obtained in Examples, Comparative Examples, and the like (thickness of 2 mm, height of 150 mm, width of 150 mm) was used to fabricate a test piece having a height of 40 mm, a width of 5 mm, and a thickness of 2 mm and then to measure the volume (volume before swelling) of the test piece using a density meter (trade name "SD-200L" manufactured by Alfa Millage). After that, under the condition of room temperature (25° C.), test piece was immersed in hexane for 1 hour and taken out for measurement of the volume (volume after swelling) of the swollen test piece after immersion in hexane using a density meter. Then, based on the volume before and after swelling (before and after immersion in hexane) of the test piece, the following calculation formula (I):

$$[\text{swelling degree (\%)}] = \{([\text{volume after swelling}]/[\text{volume before swelling}]) \times 100\} - 100 \quad (I)$$

was calculated to obtain the swelling degree with respect to hexane. Note that the lower the swelling degree, the higher the oil resistance.

<Measurement of Swelling Degree with Respect to Oil (JIS #3 Oil)>

Regarding the swelling degree of the thermoplastic elastomer compositions obtained in Examples, Comparative Examples, and the like with respect to an oil (JIS #3 oil), except that the oil (JIS #3 oil) was used instead of hexane and that immersion time in the oil was changed from 1 hour to 24 hours (the test piece was immersed in the oil (JIS #3 oil) for 24 hours), the same method as the method described in the measurement of the swelling degree with respect to hexane was employed to obtain the volume of the test piece before and after swelling (before and after immersion in oil) for calculation of the above formula (I). Thus, the swelling degree with respect to the oil (JIS #3 oil) was obtained.

<Heat Resistance Temperature>

Each of the sheets of the thermoplastic elastomer compositions obtained in Examples 10 to 15 and Comparative Examples 3 to 8 (thickness of 2 mm, height of 150 mm, width of 150 mm) was used to punch out a test piece having a width of 5 mm, a height of 20 mm, and a thickness of 2 mm. A DMA measurement apparatus (trade name "Rheogel-E 4000" manufactured by UBM Co., Ltd.) was used, and the test piece was set in the apparatus such that distortion occurred in the height direction of the test piece (direction of the side along which the length of the test piece is 20 mm) at the time of measurement. Distortion was applied to the test piece under the distortion measurement conditions of measurement interval: 2° C., measurement frequency: 10 Hz, measurement mode: tension mode, and dynamic amplitude: 2% while raising temperature at a rate of temperature rise of 2° C./min from 50 to 200° C. In this way, the temperature of the inflection point at which the storage elastic modulus (E' [unit: Pa]) of the test piece (sheet) decreased was obtained as the heat resistance temperature.

Example 1

First, 200 g of a styrene block copolymer (a styrene-ethylene-butylene-styrene block copolymer (SEBS): manufactured by Kraton Corporation under the trade name of "G1633U", molecular weight: 400,000 to 500,000, and styrene content: 30% by mass) was placed into a pressure kneader, 400 g of a paraffin oil (manufactured by JX Nippon Oil & Energy (new company name "JXTG Nippon Oil & Energy Corporation") under the trade name of "Super Oil M Series P500S", kinematic viscosity: 472 $mm^2/s$, Cp value: 68.7%, aniline point: 123° C.) was dropwise added to the pressure kneader during kneading under the condition of 200° C., and thereby the styrene-ethylene-butylene-styrene block copolymer and the paraffin oil were mixed together for 1 minute. Thereafter, 100 g of a maleic anhydride-modified ethylene-butene copolymer (maleic EBM (MEBM): manufactured by Mitsui Chemicals, Inc. under the trade name of "TAFMER MH5040", crystallinity: 4%, SP value: 8.0), 100 g of Polyamide 12 (trade name "UBESTA Polyamide 12" manufactured by Ube Industries, Ltd., SP value: 13.0, difference in SP value between Polyamide 12 and MEBM (absolute value): 5.0), 75 g of an α-olefin-based resin, that is, an ethylene propylene copolymer (EPM: trade name "TAFMER DF7350" manufactured by Mitsui Chemicals, Inc., degree of crystallinity: 10%, MFR: 35 g/10 min (2.16 kg, 190° C.), Mw: 100,000, SP value: 7.9, difference in SP value between EPM and MEBM (absolute value): 0.1), and 0.879 g of an anti-aging agent (manufactured by ADEKA Corporation under the trade name of "AO-50") were further added to the pressure kneader, followed by kneading for 2 minutes at temperature of 180° C. to obtain a first mixture (a mixture containing the maleic EBM and Polyamide 12 (corresponding to the polymer (Z))). Here, the first mixture was plasticized in the kneading step. Subsequently, 0.1 g of an organically modified clay (manufactured by HOJUN Co., Ltd. under the trade name of "S-BEN WX", types of ammonium salt as an organically modifying agent: dimethyldioctadecylammonium and dimethylstearylbenzylammonium (two types in total)) was further added to the first mixture in the pressure kneader, followed by kneading for 4 minutes at 180° C. to obtain a second mixture. Next, 2.62 g of tris(hydroxyethyl) isocyanurate (manufactured by NISSEI CORPORATION under the trade name of "TANAC P") was added to the second mixture in the pressure kneader, followed by mixing for 8 minutes at 180° C. to prepare the thermoplastic elastomer composition.

Note that, from the results of the infrared spectroscopic analysis of the raw material compound used, it can be understood that maleic anhydride groups in the maleic anhydride-modified ethylene-butene copolymer reacted with tris(hydroxyethyl) isocyanurate to form an elastomeric polymer mainly having a side chain containing the structure represented by the following formula (28) (hereinafter, simply referred to as "side chain (iii)" in some cases), among a side chain containing the structure represented by the following formula (26) (hereinafter, simply referred to as "side chain (i)" in some cases), a side chain containing the structure represented by the following formula (27) (hereinafter, simply referred to as "side chain (ii)" in some cases), and the side chain (iii) in the composition (note that, considering the stoichiometry based on the raw materials used, it is obvious that the side chain (iii) was mainly formed among the side chains (i) to (iii), but the side chain (i) and/or the side chain (ii) may be formed depending on the position of the side chain in the polymer or the like. Hereinbelow, an elastomeric polymer in which the main type of the side chain formed by the reaction can be considered to be the side chain (iii) on the basis of the raw materials used is sometimes simply referred to as an "elastomeric polymer mainly having a side chain (iii)"). In addition, it was found that the elastomeric polymer had a glass-transition point of 25° C. or below, which was attributable to the main chain made of an ethylene-butene copolymer (ethylene and butene). Moreover, the SP value of the elastomeric polymer can be regarded 8.0 from the types of raw materials used (maleic anhydride-modified ethylene-butene copolymer).

[Chem. 16]

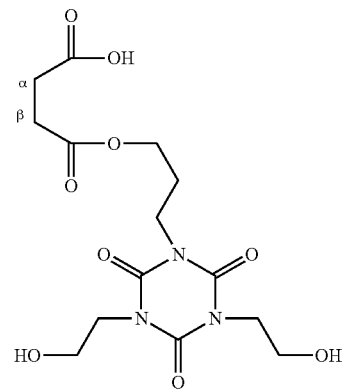

(26)

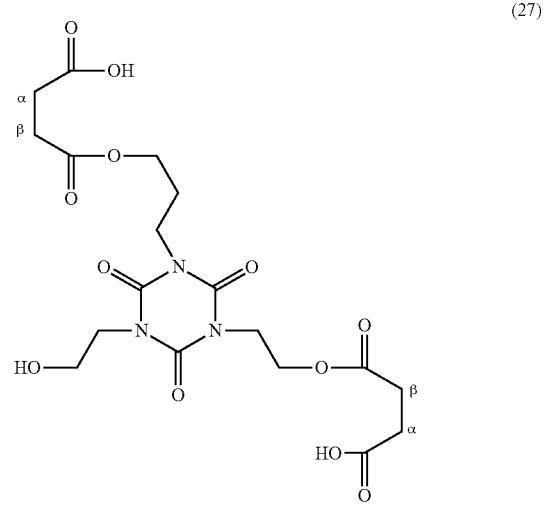

(27)

-continued

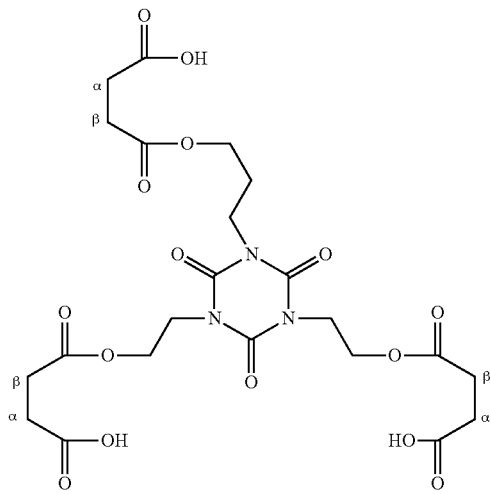

(28)

[in the formulae (26) to (28), the carbons indicated by α and β indicate that the carbon at either position (the α position or the β position) is bonded to the main chain of the elastomeric polymer]

The sheet of the thermoplastic elastomer composition (thickness of 2 mm, height of 150 mm, width of 150 mm) was obtained as follows: 42 g of the thermoplastic elastomeric composition obtained as above was introduced in a sheet-molding mold (thickness of 2 mm, height of 150 mm, width of 150 mm) heated at 200° C. (preheat) for 3 minutes, compression-molded at 16 MPa for 5 minutes under the condition of 200° C., and then cooled at 16 MPa for 2 minutes by water cooling press. Table 1 presents property evaluation results of the thus-obtained thermoplastic elastomer composition.

Example 2

The thermoplastic elastomer composition and a sheet thereof were obtained in the same manner as Example 1 except that the amount of the anti-aging agent (manufactured by ADEKA Corporation under the trade name of "AO-50") used was changed from 0.879 g to 0.979 g and that the amount of the Polyamide 12 (trade name "UBESTA Polyamide 12" manufactured by Ube Industries, Ltd., SP value: 9.1) used was changed from 100 g to 200 g. Table 1 presents property evaluation results of the thus-obtained thermoplastic elastomer composition.

Example 3

The thermoplastic elastomer composition and a sheet thereof were obtained in the same manner as Example 1 except that the amount of the anti-aging agent (manufactured by ADEKA Corporation under the trade name of "AO-50") used was changed from 0.879 g to 1.079 g and that the amount of the Polyamide 12 (trade name "UBESTA Polyamide 12" manufactured by Ube Industries, Ltd., SP value: 13.0) used was changed from 100 g to 300 g. Table 1 presents property evaluation results of the thus-obtained thermoplastic elastomer composition.

Example 4

The thermoplastic elastomer composition and a sheet thereof were obtained in the same manner as Example 1 except that the α-olefin-based resin, that is, the ethylene propylene copolymer (EPM, SP value: 7.9) was not used, that the amount of the anti-aging agent (manufactured by ADEKA Corporation under the trade name of "AO-50") used was changed from 0.879 g to 0.803 g, and moreover that 100 g of an ethylene-methyl acrylate-maleic anhydride copolymer (EMA: trade name "ET350X" manufactured by Japan Polyethylene Corporation, SP value: 9.1, difference in SP value between EMA and MEBM (absolute value): 1.1) was used instead of using 100 g of the Polyamide 12 (SP value: 13.0). Table 1 presents property evaluation results of the thus-obtained thermoplastic elastomer composition.

Example 5

The thermoplastic elastomer composition and a sheet thereof were obtained in the same manner as Example 1 except that the α-olefin-based resin, that is, the ethylene propylene copolymer (EPM, SP value: 7.9) was not used, that the amount of the anti-aging agent (manufactured by ADEKA Corporation under the trade name of "AO-50") used was changed from 0.879 g to 0.903 g, and moreover that 200 g of an ethylene-methyl acrylate copolymer (EMA: trade name "ET350X" manufactured by Japan Polyolefins Co., Ltd., SP value: 9.1, difference in SP value between EMA and MEBM (absolute value): 1.1) was used instead of using 100 g of the Polyamide 12 (SP value: 13.0). Table 1 presents property evaluation results of the thus-obtained thermoplastic elastomer composition.

Example 6

The thermoplastic elastomer composition and a sheet thereof were obtained in the same manner as Example 1 except that the type of the organically modified clay was changed from the trade name "S-BEN WX (types of ammonium salt as an organically modifying agent: dimethyldioctadecylammonium and dimethylstearylbenzylammonium (two types in total))" manufactured by HOJUN Co., Ltd. to the trade name "S-BEN NO12S (types of ammonium salt as an organically modifying agent: oleyl bis(2-hydroxyethyl) methylammonium (one type in total))" manufactured by HOJUN Co., Ltd. (the amount used was 0.1 g, the same as above) and that the amount of the Polyamide 12 (trade name "UBESTA Polyamide 12" manufactured by Ube Industries, Ltd., SP value: 13.0) used was changed from 100 g to 300 g. Table 1 presents property evaluation results of the thus-obtained thermoplastic elastomer composition.

Example 7

The thermoplastic elastomer composition and a sheet thereof were obtained in the same manner as Example 1 except that the α-olefin-based resin, that is, the ethylene propylene copolymer (EPM, SP value: 7.9) was not used and that the amount of the Polyamide 12 (trade name "UBESTA Polyamide 12" manufactured by Ube Industries, Ltd., SP value: 9.1) used was changed from 100 g to 200 g. Table 1 presents property evaluation results of the thus-obtained thermoplastic elastomer composition.

Example 8

The thermoplastic elastomer composition and a sheet thereof were obtained in the same manner as Example 1 except that the α-olefin-based resin, that is, the ethylene propylene copolymer (EPM, SP value: 7.9) was not used, that the amount of the anti-aging agent (manufactured by ADEKA Corporation under the trade name of "AO-50") used was changed from 0.879 g to 0.979 g, and moreover that the amount of the Polyamide 12 (trade name "UBESTA Polyamide 12" manufactured by Ube Industries, Ltd., SP value: 9.1) used was changed from 100 g to 300 g. Table 1 presents property evaluation results of the thus-obtained thermoplastic elastomer composition.

Example 9

The thermoplastic elastomer composition and a sheet thereof were obtained in the same manner as Example 1 except that the amount of the anti-aging agent (manufactured by ADEKA Corporation under the trade name of "AO-50") used was changed from 0.879 g to 0.979 g and that the type of the paraffin oil was changed from the trade name "Super Oil M Series P500S" manufactured by JX Nippon Oil & Energy (new company name "JXTG Nippon Oil & Energy Corporation") to the trade name "Diana Process Oil PW380" manufactured by Idemitsu Kosan Co., Ltd. (the amount used was 400 g, the same as above). Table 1 presents property evaluation results of the thus-obtained thermoplastic elastomer composition. Note that for the paraffin oil (trade name "Diana Process Oil PW380" manufactured by Idemitsu Kosan Co., Ltd.), the kinetic viscosity was 380 mm$^2$/s, the Cp value was 68.0%, and the aniline point: 143° C.

Comparative Example 1

The thermoplastic elastomer composition and a sheet thereof were obtained in the same manner as Example 1 except that the amount of the anti-aging agent (manufactured by ADEKA Corporation under the trade name of "AO-50") used was changed from 0.879 g to 0.779 g and that an organically unmodified clay (trade name "KUNIPIA F" manufactured by KUNIMINE INDUSTRIES Co., Ltd.) was directly used instead of an organically modified clay (the amount used was 0.1 g, the same as above). Table 1 presents property evaluation results of the thus-obtained thermoplastic elastomer composition.

Comparative Example 2

The thermoplastic elastomer composition and a sheet thereof were obtained in the same manner as Example 1 except that the amount of the anti-aging agent (manufactured by ADEKA Corporation under the trade name of "AO-50") was changed from 0.879 g to 0.779 g and that the Polyamide 12 (SP value: 13.0) was not used. Table 1 presents property evaluation results of the thus-obtained thermoplastic elastomer composition.

TABLE 1

| | | Ex. 1 | Ex. 2 | Ex. 3 | Ex. 4 | Ex. 5 | Ex. 6 |
|---|---|---|---|---|---|---|---|
| Type of Raw Material Compound* (Unit: g) | Maleic Anhydride-Modified Ethylene-Butene Copolymer (MEBM, SP Value: 8.0) | 100 | 100 | 100 | 100 | 100 | 100 |
| | Organically Modified Clay (Type of Organically Modifying Agent: dimethyldioctadecylammonium, dimethylstearylbenzylammonium) | 0.1 | 0.1 | 0.1 | 0.1 | 0.1 | — |
| | Organically Modified Clay (Type of Organically Modifying Agent; Oleyl Bis(2-Hydroxyethyl) Methylammonium) | — | — | — | — | — | 0.1 |
| | Clay (Organically Unmodified) | — | — | — | — | — | — |
| | Tris(Hydroxyethyl) Isocyanurate | 2.62 | 2.62 | 2.62 | 2.62 | 2.62 | 2.62 |
| | Anti-Aging Agent | 0.879 | 0.979 | 1.079 | 0.803 | 0.903 | 0.879 |
| | Styrene Block Copolymer (SEBS, SP Value: 8.5) | 200 | 200 | 200 | 200 | 200 | 200 |
| | Paraffin Oil (Trade Name "Super Oil M Series P500S" Manufactured by JX Nippon Oil & Energy) | 400 | 400 | 400 | 400 | 400 | 400 |
| | Paraffin Oil (Trade Name "Diana Process Oil PW380" Manufactured by Idemitsu Kosan Co., Ltd.) | — | — | — | — | — | — |
| Polymer Having SP Value of 9.0 or More | Ethylene-Propylene Copolymer (EPM, SP Value: 7.9) | 75 | 75 | 75 | — | — | 75 |
| | Ethylene-Methyl Acrylate Copolymer (EMA, SP Value: 9.1) | — | — | — | 100 | 200 | — |
| | Polyamide 12 (Nylon, SP Value: 13.0) | 100 | 200 | 300 | — | — | 300 |
| Properties of Composition | Total Amount of Composition (g) | 878.599 | 978.699 | 1078.799 | 803.523 | 903.623 | 1078.599 |
| | JIS-A Hardness | 27 | 35 | 49 | 26 | 32 | 49 |
| | 100% Modulus (Unit: MPa) | 0.62 | 1.04 | 2.09 | 0.46 | 0.56 | 1.99 |
| | Tensile Strength at Break (Unit: MPa) | 2.92 | 2.83 | 3.26 | 3.75 | 2.76 | 3.11 |
| | Swelling Degree (Unit: %, Measurement Conditions: Hexane, Room Temperature, 1 Hour) | 144 | 125 | 92 | 144 | 139 | 102 |
| | Swelling Degree (Unit: %, Measurement Conditions: JIS #3 Oil, Room Temperature, 24 Hours) | 70.5 | 59.6 | 49.8 | 66.7 | 61.5 | 53.5 |

| | | Ex. 7 | Ex. 8 | Ex. 9 | Comp. Ex. 1 | Comp. Ex. 2 |
|---|---|---|---|---|---|---|
| Type of Raw Material Compound* (Unit: g) | Maleic Anhydride-Modified Ethylene-Butene Copolymer (MEBM, SP Value: 8.0) | 100 | 100 | 100 | 100 | 100 |
| | Organically Modified Clay (Type of Organically Modifying Agent: dimethyldioctadecylammonium, dimethylstearylbenzylammonium) | 0.1 | 0.1 | 0.1 | — | 0.1 |
| | Organically Modified Clay (Type of Organically Modifying Agent; Oleyl Bis(2-Hydroxyethyl) Methylammonium) | — | — | — | — | — |

TABLE 1-continued

|  |  |  |  |  |  |  |
|---|---|---|---|---|---|---|
|  | Clay (Organically Unmodified) | — | — | — | 0.1 | — |
|  | Tris(Hydroxyethyl) Isocyanurate | 2.62 | 2.62 | 2.62 | 2.62 | 2.62 |
|  | Anti-Aging Agent | 0.879 | 0.979 | 0.979 | 0.779 | 0.779 |
|  | Styrene Block Copolymer (SEBS, SP Value: 8.5) | 200 | 200 | 200 | 200 | 200 |
|  | Paraffin Oil (Trade Name "Super Oil M Series P500S" Manufactured by JX Nippon Oil & Energy) | 400 | 400 | — | 400 | 400 |
|  | Paraffin Oil (Trade Name "Diana Process Oil PW380" Manufactured by Idemitsu Kosan Co., Ltd.) | — | — | 400 | — | — |
|  | Ethylene-Propylene Copolymer (EPM, SP Value: 7.9) | — | — | 75 | 75 | 75 |
| Polymer Having SP Value of 9.0 or More | Ethylene-Methyl Acrylate Copolymer (EMA, SP Value: 9.1) | — | — | — | — | — |
|  | Polyamide 12 (Nylon, SP Value: 13.0) | 200 | 300 | 300 | 100 | — |
|  | Total Amount of Composition (g) | 903.599 | 1003.699 | 1078.699 | 878.499 | 778.499 |
| Properties of Composition | JIS-A Hardness | 37 | 51 | 49 | 27 | 21 |
|  | 100% Modulus (Unit: MPa) | 1.24 | 2.17 | 2.00 | 0.42 | 0.42 |
|  | Tensile Strength at Break (Unit: MPa) | 2.89 | 3.31 | 3.15 | 2.32 | 2.55 |
|  | Swelling Degree (Unit: %, Measurement Conditions: Hexane, Room Temperature, 1 Hour) | 105 | 78 | 94 | 165 | 160 |
|  | Swelling Degree (Unit: %, Measurement Conditions: JIS #3 Oil, Room Temperature, 24 Hours) | 51.0 | 42.0 | 52.3 | 85.3 | 79.0 |

In the table, * indicates that the symbol "—" is 0 g (not used as a raw material compound).

[Property Evaluation of Thermoplastic Elastomer Compositions (Examples 1 to 9 and Comparative Examples 1 and 2)]

As is apparent from the results presented in Table 1, in each of the compositions (Examples 1 to 9) containing an organically modified clay and a polymer (Polyamide 12 (nylon)) having an SP value of 13.0 (this SP value is greater by 5.0 than the SP value of MEBM) or a polymer (EMA) having an SP value of 9.1 (this SP value is grater by 1.1 than the SP value of MEBM) together with an elastomeric polymer (reaction product of a maleic anhydride-modified ethylene-butene copolymer (SP value is 8.0) with tris(hydroxyethyl) isocyanurate: an elastomeric polymer mainly having the side chain (iii)), it was demonstrated that the 100% modulus was a value of 0.46 or more, meaning that the 100% modulus was a value higher than the case where an organically unmodified clay was used instead of an organically modified clay (Comparative Example 1: 100% modulus was 0.42) and the case where a polymer having an SP value of 9.0 or more was not used (Comparative Example 2: 100% modulus was 0.42). Note that when a comparison is made between Example 5 and Example 7, these compositions differ in the type of the polymer having an SP value of 9.0 or more, the SP value being greater by 0.5 or more than the SP value of the base elastomeric polymer (note that the change in the amount of the anti-aging agent used is only a slight difference, which is considered not to greatly affect the properties of the composition), but it was demonstrated that the 100% modulus was a higher value in the case of using a polymer (Polyamide 12 (nylon)) having an SP value of 13.0 (Example 7) than in the case of using a polymer (EMA) having an SP value of 9.1 (Example 5). In addition, from the results of Examples 1 to 3, Examples 4 and 5, and Examples 7 and 8, it was also demonstrated that the 100% modulus took a higher value with the increasing amount used of the polymer, the SP value of which is 9.0 or more, and is greater by 0.5 or more than the SP value of the elastomeric polymer. Moreover, when a comparison is made between Example 3 and Example 6, these compositions differ in the type of the organically modified clay (note that the change in the amount of the anti-aging agent used is only a slight difference, which is considered not to greatly affect the properties of the composition), but it was demonstrated that the 100% modulus took a higher value in the case (Example 3) of using a clay organically modified by an organically modifying agent (dimethyldioctadecylammonium, dimethylstearylbenzylammonium) made up of a dimethyl type ammonium salt than in the case (Example 6) of using an organically modifying agent (oleyl bis(2-hydroxyethyl) methylammonium) made up of other ammonium salt.

In addition, in each of the compositions (Examples 1 to 9) containing an organically modified clay and a polymer (Polyamide 12 (nylon)) having an SP value of 13.0 (this SP value is greater by 5.0 than the SP value of MEBM) or a polymer (EMA) having an SP value of 9.1 (this SP value is grater by 1.1 than the SP value of MEBM) together with an elastomeric polymer (reaction product of a maleic anhydride-modified ethylene-butene copolymer (SP value is 8.0) with tris(hydroxyethyl) isocyanurate), it was demonstrated that the tensile strength at break was a value of 2.76 or more, meaning that the tensile strength at break was a value higher than the case where an organically unmodified clay was used instead of an organically modified clay (Comparative Example 1: tensile strength at break was 2.32) and the case where a polymer having an SP value of 9.0 or more was not used (Comparative Example 2: tensile strength at break was 2.55).

From the above results, it was confirmed that the level of the tensile strength having indices of 100% modulus and tensile strength at break became higher in the case (Examples 1 to 9) of using a combination of an organically modified clay and a polymer, the SP value of which is 9.0 or more, and is greater by 0.5 or more than the SP value of the elastomeric polymer together with the elastomeric polymer (reaction product of a maleic anhydride-modified ethylene-butene copolymer (SP value is 8.0) with tris(hydroxyethyl) isocyanurate).

In addition, in the compositions (Examples 1 to 9) containing an organically modified clay and a polymer (Polyamide 12 (nylon)) having an SP value of 13.0 (this SP value is greater by 5.0 than the SP value of MEBM) or a polymer (EMA) having an SP value of 9.1 (this SP value is grater by 1.1 than the SP value of MEBM) together with the elastomeric polymer (reaction product of a maleic anhydride-modified ethylene-butene copolymer (SP value is 8.0) with tris(hydroxyethyl) isocyanurate), it was confirmed that both the swelling degree with respect to hexane and the swelling degree with respect to the oil (JIS #3 oil) took lower values compared to the case of using an organically unmodified clay instead of an organically modified clay (Comparative Example 1) and to the case of not using a polymer having an SP value of 9.0 or more (Comparative Example 2). From the above results, it was confirmed that the oil resistance having indices of the swelling degree with respect to hexane and the swelling degree with respect to the oil (JIS #3 oil) was better in the case (Examples 1 to 9) of using a combination of an organically modified clay and a polymer, the SP value of which is 9.0 or more, and is greater by 0.5 or more than the SP value of the elastomeric polymer together with the base elastomeric polymer (reaction product of a maleic anhydride-modified ethylene-butene copolymer (SP value is 8.0) with tris(hydroxyethyl) isocyanurate). Note that from the relationship between the results of Examples 1 to 3, Examples 4 and 5, and Examples 7 and 8 and the amount used of the polymer, the SP value of which is 9.0 or more, and is greater by 0.5 or more than the SP value of the elastomeric polymer (hereinafter sometimes referred to simply as the "polymer having an SP value of 9.0 or more"), it was demonstrated that the oil resistance was more improved (the swelling degree was more reduced) with the increasing amount used of the polymer having an SP value of 9.0 or more.

From the above results, it was confirmed that the thermoplastic elastomer compositions of the present invention (Examples 1 to 9) had sufficiently high levels of tensile strength and sufficiently high levels of oil resistance.

Example 10

The thermoplastic elastomer composition and a sheet thereof were obtained in the same manner as Example 1 except that the α-olefin-based resin, that is, the ethylene propylene copolymer (EPM, SP value: 7.9) was not used, that 1.02 g of pentaerythritol (manufactured by Tokyo Chemical Industry Co., Ltd.) was used instead of using 2.62 g of tris(hydroxyethyl) isocyanurate, that the amount of the anti-aging agent (manufactured by ADEKA Corporation under the trade name of "AO-50") used was changed from 0.879 g to 4.00 g, that the amount of the styrene block copolymer used was changed from 200 g to 300 g, that 600 g of the trade name "YU-8J" manufactured by SK-OIL was used as the paraffin oil instead of using 400 g of the trade name "Super Oil M Series P500S" manufactured by JX Nippon Oil & Energy (new company name "JXTG Nippon Oil & Energy Corporation"), and that the amount of Polyamide 12 used was changed from 100 g to 300 g. Table 2 presents property evaluation results of the thus-obtained thermoplastic elastomer composition.

Comparative Example 3

The thermoplastic elastomer composition and a sheet thereof were obtained in the same manner as Example 10 except that 300 g of an α-olefin-based resin, that is, polyethylene (high-density polyethylene (HDPE): trade name "HJ590N" manufactured by Japan Polyethylene Corporation, SP value: 7.9) was used instead of using 300 g of Polyamide 12. Table 2 presents property evaluation results of the thus-obtained thermoplastic elastomer composition.

Example 11

The thermoplastic elastomer composition and a sheet thereof were obtained in the same manner as Example 10 except that the type of the organically modified clay was changed from the trade name "S-BEN WX" manufactured by HOJUN Co., Ltd. to the trade name "S-BEN NO12S" manufactured by HOJUN Co., Ltd. (the amount used was 0.1 g, the same as above), that the amount of the anti-aging agent (manufactured by ADEKA Corporation under the trade name of "AO-50") used was changed from 4.00 g to 4.81 g, and that the amount of the Polyamide 12 used was changed from 300 g to 600 g. Table 2 presents property evaluation results of the thus-obtained thermoplastic elastomer composition.

Comparative Example 4

The thermoplastic elastomer composition and a sheet thereof were obtained in the same manner as Example 11 except that 600 g of an α-olefin-based resin, that is, polyethylene (high-density polyethylene (HDPE): trade name "HJ590N" manufactured by Japan Polyethylene Corporation, SP value: 7.9) was used instead of using 600 g of Polyamide 12. Table 2 presents property evaluation results of the thus-obtained thermoplastic elastomer composition.

Example 12

The thermoplastic elastomer composition and a sheet thereof were obtained in the same manner as Example 1 except that the α-olefin-based resin, that is, the ethylene propylene copolymer (EPM, SP value: 7.9) was not used, that 2.82 g of 2,4-diamino-6-phenyl-1,3,5-triazine (manufactured by Tokyo Chemical Industry Co., Ltd.) was used instead of using 2.62 g of tris(hydroxyethyl) isocyanurate, that the amount of the anti-aging agent (manufactured by ADEKA Corporation under the trade name of "AO-50") used was changed from 0.879 g to 4.00 g, that the amount of the styrene block copolymer used was changed from 100 g to 300 g, that 600 g of the trade name "YU-8J" manufactured by SK-OIL was used as the paraffin oil instead of using 400 g of the trade name "Super Oil M Series P500S" manufactured by JX Nippon Oil & Energy (new company name "JXTG Nippon Oil & Energy Corporation"), and that the amount of Polyamide 12 used was changed from 100 g to 300 g. Table 2 presents property evaluation results of the thus-obtained thermoplastic elastomer composition.

Comparative Example 5

The thermoplastic elastomer composition and a sheet thereof were obtained in the same manner as Example 12 except that 300 g of an α-olefin-based resin, that is, polyethylene (high-density polyethylene (HDPE): trade name "HJ590N" manufactured by Japan Polyethylene Corporation, SP value: 7.9) was used instead of using 300 g of Polyamide 12. Table 2 presents property evaluation results of the thus-obtained thermoplastic elastomer composition.

Example 13

The thermoplastic elastomer composition and a sheet thereof were obtained in the same manner as Example 12 except that the type of the organically modified clay was changed from the trade name "S-BEN WX" manufactured by HOJUN Co., Ltd. to the trade name "S-BEN NO12S" manufactured by HOJUN Co., Ltd. (the amount used was 0.1 g, the same as above), that the amount of the anti-aging agent (manufactured by ADEKA Corporation under the trade name of "AO-50") used was changed from 4.00 g to 4.81 g, and that the amount of the Polyamide 12 used was changed from 300 g to 600 g. Table 2 presents property evaluation results of the thus-obtained thermoplastic elastomer composition.

Comparative Example 6

The thermoplastic elastomer composition and a sheet thereof were obtained in the same manner as Example 13 except that 600 g of an α-olefin-based resin, that is, polyethylene (high-density polyethylene (HDPE): trade name "HJ590N" manufactured by Japan Polyethylene Corporation, SP value: 7.9) was used instead of using 600 g of Polyamide 12. Table 2 presents property evaluation results of the thus-obtained thermoplastic elastomer composition.

Example 14

The thermoplastic elastomer composition and a sheet thereof were obtained in the same manner as Example 1 except that the α-olefin-based resin, that is, the ethylene propylene copolymer (EPM, SP value: 7.9) was not used, that the amount of the anti-aging agent (manufactured by ADEKA Corporation under the trade name of "AO-50") used was changed from 0.879 g to 4.00 g, that the amount of the styrene block copolymer used was changed from 200 g to 300 g, that 600 g of the trade name "YU-8J" manufactured by SK-OIL was used as the paraffin oil instead of using 400 g of the trade name "Super Oil M Series P500S" manufactured by JX Nippon Oil & Energy (new company name "JXTG Nippon Oil & Energy Corporation"), and that the amount of Polyamide 12 used was changed from 100 g to 300 g. Table 2 presents property evaluation results of the thus-obtained thermoplastic elastomer composition.

Comparative Example 7

The thermoplastic elastomer composition and a sheet thereof were obtained in the same manner as Example 14 except that 300 g of an α-olefin-based resin, that is, polyethylene (high-density polyethylene (HDPE): trade name "HJ590N" manufactured by Japan Polyethylene Corporation, SP value: 7.9) was used instead of using 300 g of Polyamide 12. Table 2 presents property evaluation results of the thus-obtained thermoplastic elastomer composition.

Example 15

The thermoplastic elastomer composition and a sheet thereof were obtained in the same manner as Example 14 except that the type of the organically modified clay was changed from the trade name "S-BEN WX" manufactured by HOJUN Co., Ltd. to the trade name "S-BEN N012S" manufactured by HOJUN Co., Ltd. (the amount used was 0.1 g, the same as above), that the amount of the anti-aging agent (manufactured by ADEKA Corporation under the trade name of "AO-50") used was changed from 4.00 g to 4.81 g, and that the amount of the Polyamide 12 used was changed from 300 g to 600 g. Table 2 presents property evaluation results of the thus-obtained thermoplastic elastomer composition.

Comparative Example 8

The thermoplastic elastomer composition and a sheet thereof were obtained in the same manner as Example 14 except that 300 g of an α-olefin-based resin, that is, polyethylene (high-density polyethylene (HDPE): trade name "HJ590N" manufactured by Japan Polyethylene Corporation, SP value: 7.9) was used instead of using 300 g of Polyamide 12. Table 2 presents property evaluation results of the thus-obtained thermoplastic elastomer composition.

TABLE 2

|  |  | Ex. 10 | Comp. Ex. 3 | Ex. 11 | Comp. Ex. 4 | Ex. 12 | Comp. Ex. 5 |
|---|---|---|---|---|---|---|---|
| Type of Raw Material Compound* (Unit: g) | Maleic Anhydride-Modified Ethylene-Butene Copolymer (MEBM, SP Value: 8.0) | 100 | 100 | 100 | 100 | 100 | 100 |
|  | Organically Modified Clay (Type of Organically Modifying Agent: dimethyldioctadecylammonium, dimethylstearylbenzylammonium) | 0.1 | 0.1 | — | — | 0.1 | 0.1 |
|  | Organically Modified Clay (Type of Organically Modifying Agent: Oleyl Bis(2-Hydroxylethyl) Methylammonium) | — | — | 0.1 | 0.1 | — | — |
|  | Tris(Hydroxyethyl) Isocyanurate | — | — | — | — | — | — |
|  | Pentaerythritol | 1.02 | 1.02 | 1.02 | 1.02 | — | — |
|  | 2,4-Diamino-6-Phenyl-1,3,5-Triazine | — | — | — | — | 2.82 | 2.82 |
|  | Anti-Aging Agent | 4.00 | 4.00 | 4.81 | 4.81 | 4.00 | 4.00 |
|  | Styrene Block Copolymer (SEBS, SP Value: 8.5) | 300 | 300 | 300 | 300 | 300 | 300 |
|  | Paraffin Oil (Trade Name "YU-8J" Manufactured by SK-OIL) | 600 | 600 | 600 | 600 | 600 | 600 |
|  | Polyethylene (PE, SP Value: 7.9, Trade Name "HJ590N" Manufactured by Japan Polyethylene Corporation) | — | 300 | — | 600 | — | 300 |
|  | Polymer Having SP Value of 9.0 or More — Polyamide 12 (Nylon, SP Value: 13.0) | 300 | — | 600 | — | 300 | — |
| Properties of Composition | Total Amount of Composition (g) | 1305.12 | 1305.12 | 1605.93 | 1605.93 | 1306.92 | 1306.92 |
|  | JIS-A Hardness | 32 | 32 | 81 | 82 | 30 | 32 |
|  | 100% Modulus (Unit: MPa) | 1.00 | 0.91 | 5.49 | 2.14 | 1.02 | 0.93 |
|  | Tensile Strength at Break (Unit: MPa) | 2.51 | 2.24 | 6.01 | 5.66 | 2.68 | 2.31 |
|  | Heat Resistance Temperature (° C.) | 181 | 120 | 180 | 120 | 181 | 119 |
|  | Swelling Degree (Unit: %, Measurement Conditions: Hexane, Room Temperature, 1 Hour) | 112 | 129 | 78 | 188 | 106 | 128 |
|  | Swelling Degree (Unit: %, Measurement Conditions: JIS #3 Oil, Room Temperature, 24 Hours) | 66 | 68 | 43 | 93 | 59 | 68 |

TABLE 2-continued

| | | Ex. 13 | Comp. Ex. 6 | Ex. 14 | Comp. Ex. 7 | Ex. 15 | Comp. Ex. 8 |
|---|---|---|---|---|---|---|---|
| Type of Raw Material Compound* (Unit: g) | Maleic Anhydride-Modified Ethylene-Butene Copolymer (MEBM, SP Value: 8.0) | 100 | 100 | 100 | 100 | 100 | 100 |
| | Organically Modified Clay (Type of Organically Modifying Agent: dimethyldioctadecylammonium, dimethylstearylbenzylammonium) | — | — | 0.1 | 0.1 | — | — |
| | Organically Modified Clay (Type of Organically Modifying Agent: Oleyl Bis(2-Hydroxylethyl) Methylammonium) | 0.1 | 0.1 | — | — | 0.1 | 0.1 |
| | Tris(Hydroxyethyl) Isocyanurate | — | — | 2.62 | 2.62 | 2.62 | 2.62 |
| | Pentaerythritol | — | — | — | — | — | — |
| | 2,4-Diamino-6-Phenyl-1,3,5-Triazine | 2.82 | 2.82 | — | — | — | — |
| | Anti-Aging Agent | 4.81 | 4.81 | 4.00 | 4.00 | 4.81 | 4.81 |
| | Styrene Block Copolymer (SEBS, SP Value: 8.5) | 300 | 300 | 300 | 300 | 300 | 300 |
| | Paraffin Oil (Trade Name "YU-8J" Manufactured by SK-OIL) | 600 | 600 | 600 | 600 | 600 | 600 |
| | Polyethylene (PE, SP Value: 7.9, Trade Name "HJ590N" Manufactured by Japan Polyethylene Corporation) | — | 600 | — | 300 | — | 600 |
| | Polymer Having SP Value of 9.0 or More — Polyamide 12 (Nylon, SP Value: 13.0) | 600 | — | 300 | — | 600 | — |
| Properties of Composition | Total Amount of Composition (g) | 1607.73 | 1607.73 | 1306.72 | 1306.72 | 1607.53 | 1607.53 |
| | JIS-A Hardness | 81 | 82 | 31 | 33 | 82 | 83 |
| | 100% Modulus (Unit: MPa) | 5.55 | 2.21 | 1.09 | 0.95 | 5.68 | 2.26 |
| | Tensile Strength at Break (Unit: MPa) | 6.15 | 5.77 | 2.78 | 2.36 | 6.21 | 5.81 |
| | Heat Resistance Temperature (° C.) | 178 | 121 | 180 | 121 | 179 | 120 |
| | Swelling Degree (Unit: %, Measurement Conditions: Hexane, Room Temperature, 1 Hour) | 77 | 181 | 102 | 125 | 75 | 178 |
| | Swelling Degree (Unit: %, Measurement Conditions: JIS #3 Oil, Room Temperature, 24 Hours) | 40 | 95 | 57 | 65 | 38 | 92 |

In the table, * indicates that the symbol "—" is 0 g (not used as a raw material compound).

Property Evaluation of Thermoplastic Elastomer Compositions (Examples 10 to 15 and Comparative Examples 3 to 8)

As is apparent from the results presented in Table 2, when comparing the composition containing the polymer (Polyamide 12) having an SP value of 13.0 with the composition containing the polymer (polyethylene) having an SP value of 7.9 instead of the polymer (Polyamide 12) having an SP value of 13.0 between an example and a comparative example having the same compositions except these polymers and having the same total amounts of the compositions (between Example 10 and Comparative Example 3, between Example 11 and Comparative Example 4, between Example 12 and Comparative Example 5, between Example 13 and Comparative Example 6, between Example 14 and Comparative Example 7, between Example 15 and Comparative Example 8), it was confirmed that the composition containing the polymer (Polyamide 12) having an SP value of 13.0 (Examples) provided higher values of 100% modulus and tensile strength at break and lower values of the swelling degree with respect to hexane and the swelling degree with respect to the oil (JIS #3 oil). From the above results, it was demonstrated that the level of the tensile strength having indices of 100% modulus and tensile strength at break became higher and the oil resistance having indices of the swelling degree with respect to hexane and the swelling degree with respect to the oil (JIS #3 oil) was more improved (the swelling degree was more reduced) in the case (Examples 10 to 15) of using a combination of an organically modified clay and a polymer having an SP value of 9.0 or more, the SP value being greater by 0.5 or more than the SP value of the elastomeric polymer together with an elastomeric polymer (reaction product of a maleic anhydride-modified ethylene-butene copolymer (SP value is 8.0) and pentaerythritol, 2,4-diamino-6-phenyl-1,3,5-triazine, or tris (hydroxyethyl) isocyanurate). As described above, it was confirmed that the thermoplastic elastomer compositions obtained in Examples 10 to 15 and the molded bodies (sheets) thereof had higher levels of tensile strength and higher levels of oil resistance.

Note that when comparing the composition containing the polymer (Polyamide 12) having an SP value of 13.0 (Examples 10 to 15) and the composition containing the polymer (polyethylene) having an SP value of 7.9 instead of the polymer (Polyamide 12) having an SP value of 13.0 (Comparative Examples 3 to 8) from the viewpoint of heat resistance temperature, it was demonstrated that the heat resistance temperature was higher in the composition containing the polymer (Polyamide 12) having an SP value of 13.0 (Examples 10 to 15) together with the elastomeric polymer (reaction product of a maleic anhydride-modified ethylene-butene copolymer (SP value is 8.0) and pentaerythritol, 2,4-diamino-6-phenyl-1,3,5-triazine, or tris(hydroxyethyl) isocyanurate) and that a higher level of heat resistance was also obtained thanks to the thermoplastic elastomer compositions of the present invention containing a polymer, the SP value of which is 9.0 or more, and is greater by 0.5 or more than the SP value of the elastomeric polymer.

INDUSTRIAL APPLICABILITY

As has been described above, according to the present invention, it is possible to provide a thermoplastic elastomer composition which can have sufficiently high levels of tensile strength and excellent oil resistance, and a method for producing the same. Moreover, the present invention makes it possible to provide an elastomer molded body which is formed by molding the thermoplastic elastomer composition.

Thus, the thermoplastic elastomer compositions of the present invention can exert various properties as described above in a well-balanced manner, and therefore can be used as materials and the like to produce various rubber components in the fields of, for example, electrical and electronic instruments, home appliances, chemicals, pharmaceuticals, glass, earth materials, steels, nonferrous metals, machineries, precision equipment, cosmetics, textiles, mining, pulp, paper, construction/civil engineering/building, foods/beverages, general consumer goods/services, transportation equipment, construction machines, electrical equipment, facilities (industrial facilities, air conditioners, hot water supplies, energy farms), metals, media, information, communication devices, lighting devices, displays, agriculture, fishery, forestry, marine industry, agribusiness, biotechnologies, nanotechnologies, and the like (more specifically, products and the like for use in applications such as automobile-related products, hoses, belts, seats, anti-vibration rubbers, rollers, linings, rubber-coated fabrics, sealing materials, gloves, fenders, rubbers for medical use (syringe gaskets, tubes, catheters), gaskets (for home appliances, for construction), asphalt modifiers, hot melt adhesives, boots, grips, toys, shoes, sandals, keypads, gears, PET bottle cap liners, rubber parts for printers, sealing materials, paints and coating materials, print inks, and so on).

The invention claimed is:

1. A thermoplastic elastomer composition comprising:
at least one elastomer component selected from the group consisting of elastomeric polymers (A) each of which has a side chain containing a hydrogen-bond cross-linkable moiety having a carbonyl-containing group and/or a nitrogen-containing heterocycle and has a glass-transition point of 25° C. or below, and elastomeric polymers (B) each of which contains a hydrogen-bond cross-linkable moiety and a covalent-bond cross-linking moiety in a side chain and has a glass-transition point of 25° C. or below;
an organically modified clay, a content ratio of which is 20 parts by mass or less relative to 100 parts by mass of the elastomer component; and
a polymer (Z) which is a polymer other than the elastomeric polymers (A) and (B), comprising a polyamide having an amine group at a terminal and having an SP value of which is 9.0 or more and is greater by 0.5 or more than an SP value of the elastomer component.

2. The thermoplastic elastomer composition according to claim 1, wherein the SP value of the polymer (Z) is 9.0 to 16.0.

3. The thermoplastic elastomer composition according to claim 1, wherein the polymer (Z) has a reactive functional group for the elastomer component.

4. The thermoplastic elastomer composition according to claim 3, wherein the reactive functional group is at least one of a hydroxyl group, an amino group, an imino group, an ester group, an acid anhydride group, and a carboxy group.

5. The thermoplastic elastomer composition according to claim 1, wherein a main chain of the polymer contained as the elastomer component is at least one selected from diene-based rubbers, hydrogenated products of diene-based rubbers, olefin-based rubbers, optionally hydrogenated polystyrene-based elastomeric polymers, polyolefin-based elastomeric polymers, polyvinyl chloride-based elastomeric polymers, polyurethane-based elastomeric polymers, polyester-based elastomeric polymers, and polyamide-based elastomeric polymers.

6. The thermoplastic elastomer composition according to claim 1, wherein the elastomer component is at least one selected from the group consisting of reaction products of a maleic anhydride-modified elastomeric polymer with at least one compound selected from triazoles optionally having at least one substituent selected from hydroxy groups, thiol groups, and amino groups, pyridines optionally having at least one substituent selected from hydroxy groups, thiol groups, and amino groups, thiadiazoles optionally having at least one substituent selected from hydroxy groups, thiol groups, and amino groups, imidazoles optionally having at least one substituent selected from hydroxy groups, thiol groups, and amino groups, isocyanurates optionally having at least one substituent selected from hydroxy groups, thiol groups, and amino groups, triazines optionally having at least one substituent selected from hydroxy groups, thiol groups, and amino groups, hydantoins optionally having at least one substituent selected from hydroxy groups, thiol groups, and amino groups, tris(hydroxyethyl) isocyanurate, sulfamides, pentaerythritol, 2,4-diamino-6-phenyl-1,3,5-triazine, and polyether polyols.

7. A method for producing a thermoplastic elastomer composition comprising:
a first step of obtaining a mixture by mixing together
an elastomeric polymer (D) having a cyclic acid anhydride group in a side chain,
an organically modified clay, and
a polymer (Z), an SP value of which is 9.0 or more, and is greater by 0.5 or more than an SP value of the elastomeric polymer (D); and
a second step of adding, to the mixture, at least one raw material compound of a compound (I) that forms a hydrogen-bond cross-linkable moiety upon a reaction with the cyclic acid anhydride group, and a mixed raw material of the compound (I) with a compound (II) that forms a covalent-bond cross-linking moiety upon a reaction with the cyclic acid anhydride group in a ratio of 0.1 to 10 parts by mass relative to 100 parts by mass of the elastomeric polymer (D) having the cyclic acid anhydride group in the side chain, to allow a reaction to proceed between the elastomeric polymer (D) and the raw material compound, thereby obtaining the thermoplastic elastomer composition, wherein
the thermoplastic elastomer composition obtained in the second step is a composition comprising:
at least one elastomer component selected from the group consisting of elastomeric polymers (A) each of which has a side chain containing a hydrogen-bond cross-linkable moiety having a carbonyl-containing group and/or a nitrogen-containing heterocycle and has a glass-transition point of 25° C. or below, and elastomeric polymers (B) each of which contains a hydrogen-bond cross-linkable moiety and a covalent-bond cross-linking moiety in a side chain and has a glass-transition point of 25° C. or below;
the organically modified clay, a content ratio of which is 20 parts by mass or less relative to 100 parts by mass of the elastomer component; and
the polymer (Z) which is a polymer other than the elastomeric polymers (A) and (B), comprises a polyamide having an amine group at a terminal, and has an SP value of which is 9.0 or more and is greater by 0.5 or more than an SP value of the elastomer component, and
in the first step, the elastomeric polymer (D), the organically modified clay, and the polymer (Z) are mixed by using the organically modified clay at such a ratio that the amount of the organically modified clay contained in the thermoplastic elastomer composition is 20 parts by mass or less relative to 100 parts by mass of the elastomer component.

8. The method for producing a thermoplastic elastomer composition according to claim 7, wherein
the elastomeric polymer (D) is a maleic anhydride-modified elastomeric polymer, and
the elastomer component is at least one selected from the group consisting of reaction products of the maleic anhydride-modified elastomeric polymer with at least one compound selected from triazoles optionally having at least one substituent selected from hydroxy groups, thiol groups, and amino groups, pyridines optionally having at least one substituent selected from hydroxy groups, thiol groups, and amino groups, thiadiazoles optionally having at least one substituent selected from hydroxy groups, thiol groups, and amino groups, imidazoles optionally having at least one substituent selected from hydroxy groups, thiol groups, and amino groups, isocyanurates optionally having at least one substituent selected from hydroxy groups, thiol groups, and amino groups, triazines optionally having at least one substituent selected from hydroxy groups, thiol groups, and amino groups, hydantoins optionally having at least one substituent selected from hydroxy groups, thiol groups, and amino groups, tris (hydroxyethyl) isocyanurate, sulfamides, pentaerythritol, 2,4-diamino-6-phenyl-1,3,5-triazine, and polyether polyols.

9. An elastomer molded body which is formed by molding the thermoplastic elastomer composition according to claim 1.

10. The elastomer molded body according to claim 9, wherein the elastomer molded body is a molded body for use in any application selected from the group consisting of civil engineering and building materials, industrial parts, electric and electronic components, and daily necessities.

11. The elastomer molded body according to claim 9, wherein the elastomer molded body is a molded body for use in one application selected from the group consisting of automotive parts, gap filling materials, sealing materials for buildings, sealing materials for pipe joints, piping protection materials, wiring protection materials, heat insulating materials, packing materials, cushioning materials, electrical insulating materials, contact rubber sheets, sports and leisure articles, and miscellaneous goods.

12. The elastomer molded body according to claim 9, wherein the elastomer molded body is a molded body for use in one application selected from the group consisting of packing for automotive engines, constant velocity joint boots, weather strips, dampers, wiper blades, insulating covers, and hood seal rubbers.

13. The thermoplastic elastomer composition according to claim 1, wherein a main chain of the polymer contained as the elastomer component is an olefin-based rubber.

14. The thermoplastic elastomer composition according to claim 1, wherein a main chain of the polymer contained as the elastomer component is an ethylene-butene rubber.

15. The method for producing the thermoplastic elastomer composition according to claim 7, wherein a main chain of the polymer contained as the elastomer component is an olefin-based rubber.

16. The method for producing the thermoplastic elastomer composition according to claim 7, wherein a main chain of the polymer contained as the elastomer component is an ethylene-butene rubber.

* * * * *